United States Patent
Ashida et al.

(10) Patent No.: US 9,727,762 B2
(45) Date of Patent: Aug. 8, 2017

(54) WIRELESS COMMUNICATION MODULE, WIRELESS COMMUNICATION SYSTEM, AND COMMUNICATION METHOD

(71) Applicant: FUJITSU LIMITED, Kawasaki-shi, Kanagawa (JP)

(72) Inventors: Hiroshi Ashida, Fujisawa (JP); Yoji Ohashi, Fucyu (JP)

(73) Assignee: FUJITSU LIMITED, Kawasaki (JP)

( * ) Notice: Subject to any disclaimer, the term of this patent is extended or adjusted under 35 U.S.C. 154(b) by 432 days.

(21) Appl. No.: 14/462,455

(22) Filed: Aug. 18, 2014

(65) Prior Publication Data

US 2015/0054626 A1    Feb. 26, 2015

(30) Foreign Application Priority Data

Aug. 22, 2013 (JP) ................... 2013-172236
Jul. 1, 2014 (JP) ................... 2014-135768

(51) Int. Cl.
*G06K 7/00* (2006.01)
*G06K 7/10* (2006.01)
(Continued)

(52) U.S. Cl.
CPC ..... *G06K 7/10168* (2013.01); *G06K 7/10316* (2013.01); *H01Q 1/2216* (2013.01);
(Continued)

(58) Field of Classification Search
CPC ............. G06K 7/10079; G06K 7/0008; G06K 7/10316; G06K 7/10297; G06K 7/10168;
(Continued)

(56) References Cited

U.S. PATENT DOCUMENTS 9,208,362 B1* 12/2015 Fink .................. H04W 4/008
2002/0183882 A1* 12/2002 Dearing ............. G06K 7/10336
700/115
(Continued)

FOREIGN PATENT DOCUMENTS

JP    11-261286 A    9/1999
JP    2004-140194 A    5/2004
(Continued)

OTHER PUBLICATIONS

Taguchi Mitsuo et al., "Analysis of Dead Zone of RFID System", 2006 IEEE Antennas and Proopagation Society International Symposium, Albuquerque, 558.8, pp. 4759-4762, Jul. 2006.
(Continued)

*Primary Examiner* — Thomas Alunkal
(74) *Attorney, Agent, or Firm* — Arent Fox LLP

(57) ABSTRACT

A wireless communication module includes an antenna on a first conductive wall among the conductive walls enclosing a closed space; a tag reader connected with the antenna to read an RFID tag in the closed space; and a reflective part having a thin film or plate shape between the first and second conductive walls facing each other. The reflective part partitions the closed space into first and second spaces. The antenna radiates a radio wave that is reflected by the reflective part to become a first reflected wave in the first space. The radio wave also transmits through the reflective part, reflected by the second conductive wall, and transmits through the reflective part to become a second reflected wave in the first space. The position of the reflective part is determined so that the first and second reflected waves are canceled by each other.

17 Claims, 38 Drawing Sheets

(51) Int. Cl.
*H01Q 1/22* (2006.01)
*H01Q 1/52* (2006.01)

(52) U.S. Cl.
CPC ........... *H01Q 1/52* (2013.01); *G06K 7/10178* (2013.01); *G06K 7/10366* (2013.01)

(58) Field of Classification Search
CPC ........... G06K 7/10178; G06K 7/10336; G06K 19/07771; H01Q 1/2216; H01Q 1/52
See application file for complete search history.

(56) References Cited

U.S. PATENT DOCUMENTS

| | | | | |
|---|---|---|---|---|
| 2006/0055552 A1* | 3/2006 | Chung | .................... | B60R 25/00 340/686.1 |
| 2007/0063914 A1 | 3/2007 | Becker | | |
| 2007/0108296 A1* | 5/2007 | Konopka | ........... | G06K 7/10178 235/492 |
| 2008/0150691 A1* | 6/2008 | Knadle | ................ | G06K 7/0008 340/10.1 |
| 2008/0224829 A1* | 9/2008 | Kuramoto | ............ | H04B 5/0062 340/10.5 |
| 2009/0079543 A1* | 3/2009 | Nonaka | ................ | G06K 7/0008 340/10.1 |
| 2010/0073251 A1* | 3/2010 | Mizushina | ............. | H01Q 1/007 343/818 |
| 2010/0109841 A1* | 5/2010 | Yamada | ............. | G06K 7/10178 340/10.1 |
| 2011/0115584 A1 | 5/2011 | Kiji | | |

FOREIGN PATENT DOCUMENTS

| | | |
|---|---|---|
| JP | 2009-509416 A | 3/2009 |
| JP | 2009-076620 A | 4/2009 |
| JP | 2009-105865 A | 5/2009 |
| JP | 2010-081018 A | 4/2010 |
| JP | 2011-109414 A | 6/2011 |
| WO | WO 2007/035523 A2 | 3/2007 |

OTHER PUBLICATIONS

Wang Peng et al., "An Analysis of a Dead Spot for 2.45 Ghz Band Passive RFID Tags Close to Metals", IEICE Transaction, vol. J93-B, No. 11, pp. 1531-1540, IEICE 2010. (English summary translation attached).

* cited by examiner

FIG.16

| H/S<br>[mm] | WITH DIELECTRIC<br>[dBm] | WITHOUT DIELECTRIC<br>[dBm] | Δ Pmin |
|---|---|---|---|
| 150/ 20 | 26.5 | Error | |
| 150/ 70 | 19.6 | 24.3 | −4.7 |
| 150/150 | 19.6 | 22.4 | −2.8 |

FIG.19

| EG CONCENTRATION | $\varepsilon_r$ | Tan $\delta$ | |
|---|---|---|---|
| 0% | 81 | 0.05 | WATER |
| 40% | 64 | 0.1 | |
| 60% | 58 | 0.16 | |
| 80% | 50 | 0.23 | |
| 100% | 31 | 0.3 | |

FIG.20

| NAME | $\varepsilon_r$ | Tan $\delta$ | |
|---|---|---|---|
| ALUMINA | 8~11 | 0.0005~0.007 | |
| BLACK ALUMINA | 16.7 | 0.001 | |
| BARIUM TITANATE | 39.5 | 0.0014 | ($BaTi_4O_9$) |
| TITANIUM OXIDE | 80~104 | | ($TiO_2$) |
| STRONTIUM TITANATE | 300 | 0.005 | ($SrTiO_3$) |

| $\varepsilon_r$ | $\lambda_d/2$[mm] | Ds[mm] | $\beta$ |
|---|---|---|---|
| 20 | 36.7 | 34.0 | 0.93 |
| 40 | 25.9 | 24.0 | 0.93 |
| 60 | 21.2 | 20.0 | 0.95 |
| 81 | 18.2 | 16.0 | 0.88 |

| $\varepsilon_r$ | Ls | Ds | D2=Ls−Ds | $2(\phi_1+\phi_2)$ | $\lambda_g/2$ | $\lambda_d/2$ |
|---|---|---|---|---|---|---|
| 81 | 197 | 14-19 | 183-178 | 3.31 $\pi$ | 196 | 18.2 |

FIG.36

| r01 | $E_{r20}$ [V/m] | S [=$E_{r20}$/Ei] |
|---|---|---|
| −0.32 | 5.70 | +0.141 |
| −0.38 | 0.18 | +0.0044 |
| −0.45 | −5.90 | −0.147 |

FIG.37A (1) SIMPLEX THIN FILM

| Name | $\Sigma$ [S/m] | DENSITY [kg/m³] |
|---|---|---|
| Ti | 1.8E+6 | 4506 |
| Mn | 6.9E+5 | 7210 |
| Graphite | 7.0E+4 | 2250 |

(2) ZnO_X

| Name | $\Sigma$ [S/m] | DENSITY [kg/m³] |
|---|---|---|
| ZnO:Al | 52.6 | 5606 |
| ZnO:B | 15.6 | 5606 |
| ZnO:Ga | 19.6 | 5606 |

FIG.37B

| Name | P [$\Omega$ cm] | $\Sigma$ [S/m] | $\delta$s [$\mu$m] |
|---|---|---|---|
| Graphite | 1.43E−7 | 7E+4 | 62.9 |
| ZnO_Al(2wt%) | 1.9E−4 | 52.6 | 2293 |

FIG.38A
|  | CONDUCTIVITY | FILM THICKNESS Dt[μm] | REFLECTANCE r |
|---|---|---|---|
| Graphite | 70000 S/m | 0.14~0.26 | 0.32~0.45 |
| ZnO_Al(2w%) | 52.6 S/m | 40~60 | 0.34~0.42 |
FIG.38B
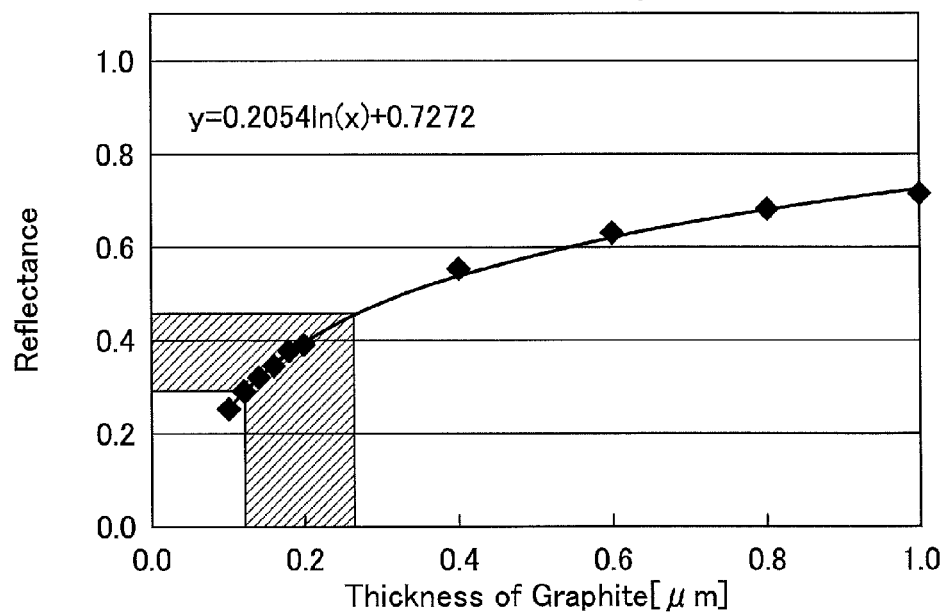
REFLECTION COEFFICIENT r <Graphite>
$y = 0.2054 \ln(x) + 0.7272$
FIG.38C
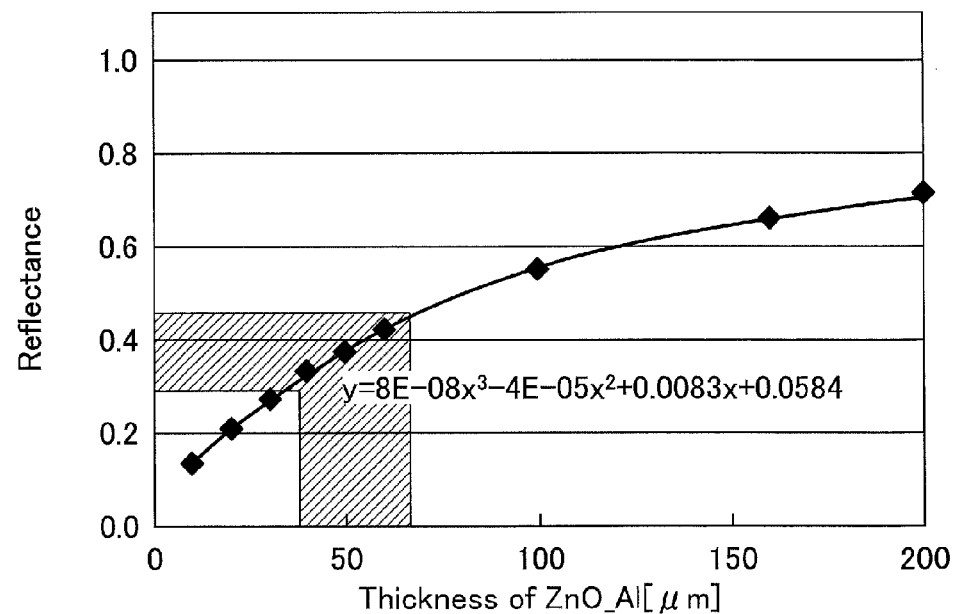
REFLECTION COEFFICIENT r <ZnO_Al(2wt%)>
$y = 8E{-}08 x^3 - 4E{-}05 x^2 + 0.0083 x + 0.0584$ Ls DEPENDENCY OF REFLECTION COEF. S (Dt=40 μm)

Dt DEPENDENCY OF REFLECTION COEF. S (Ls=96mm)

Ls DEPENDENCY OF REFLECTION COEF. S (Dt=0.16 μm)

Dt DEPENDENCY OF REFLECTION COEF. S (Ls=96mm)

ND COMMUNICATION METHOD

WIRELESS COMMUNICATION MODULE, WIRELESS COMMUNICATION SYSTEM, AND COMMUNICATION METHOD

CROSS-REFERENCE TO RELATED APPLICATIONS

This application is based upon and claims the benefit of priority of the prior Japanese Priority Application No. 2013-172236 filed on Aug. 22, 2013, and the prior Japanese Priority Application No. 2014-135768 filed on Jul. 1, 2014, the entire contents of which are hereby incorporated by reference.

FIELD

The disclosures herein generally relate to a wireless communication module, a wireless communication system, and a communication method.

BACKGROUND

As an example of a technology to manage one or more objects to be managed, a bar code system using bar codes has been known. Objects to be managed may be goods, merchandise, documents, or any other arbitrary objects. The bar code system reads a bar code attached on an object to be managed by a bar code reader, and obtains information represented by the bar code. However, the bar code system needs to read bar codes one by one, and it is not easy to collectively manage or to process lots of objects to be managed at once.

A RFID tag system using RFID (Radio Frequency IDentification) tags can cope with such a concern, in theory. An RFID tag is also called an "RFIC (Radio Frequency Integrated Circuit) tag" or a "wireless tag". In an RFID tag system, a RFID tag reader transmits a radio wave, and then, a RFID tag that receives the radio wave transmits information stored in its own memory. The RFID tag reader obtains information transmitted from a number of RFID tags to collectively manage the RFID tags (Non-Patent Documents 1-2).

RELATED-ART DOCUMENTS

[Non-Patent Document]
[Non-Patent Document 1] Wang Peng et al., "An Analysis of a Dead Spot for 2.45 GHz Band Passive RFID Tags Close to Metals", IEICE Transaction, IEICE 2010, Vol. J93-B, No. 11, pp. 1531-1540
[Non-Patent Document 2] Taguchi Mitsuo, et al., "Analysis of Dead Zone of RFID System", 2006 IEEE Antennas and Propagation Society International Symposium, Albuquerque, 558.8, pp. 4759-4762, July 2006

However, a conventional RFID tag system has a problem that it may not necessarily be able to collectively manage a number of objects to be managed depending on a usage environment. For example, assume that documents, envelopes including documents, or document folders (referred to as "documents" below) have RFID tags attached, and the documents are stored in a file cabinet that has a closed space formed by conductive walls 11 such as metal. In this case, when a radio wave is transmitted from an antenna of an RFID tag reader disposed at one end of the file cabinet, a standing wave is generated due to reflection by the conductive walls 11 of the file cabinet, which makes the radio wave strength locally reduced at places corresponding to the nodes of the standing wave. A place with locally weak radio wave strength is called a "dead spot" or a "dead zone", and an RFID tag attached to the documents existing at a dead spot cannot receive a radio wave having appropriate strength, and cannot respond to the RFID tag reader. Consequently, the RFID tag reader cannot appropriately obtain information stored in all RFID tags in the file cabinet, and cannot collectively manage the documents stored in the file cabinet due to local communication interference.

SUMMARY

According to at least one embodiment of the present invention, a wireless communication module includes an antenna configured to be disposed on a first conductive wall among a plurality of the conductive walls enclosing a closed space; a tag reader configured to be connected with the antenna, and to read an RFID tag existing in the closed space via the antenna; and a reflective part configured to have a thin film shape or a plate shape, and to be disposed between the first conductive wall and a second conductive wall facing the first conductive wall. The closed space is partitioned by the reflective part into a first space on a side of the first conductive wall and a second space on a side of the second conductive wall. The radio wave is output by the tag reader, radiated from the antenna, and reflected by the reflective part, to become a first reflected wave propagating in the first space. The radio wave radiated from the antenna also transmits through the reflective part, propagates in the second space, is reflected by the second conductive wall, and transmits through the reflective part, to become a second reflected wave propagating in the first space. A position of the reflective part between the first conductive wall and the second conductive wall is determined so that the first reflected wave and the second reflected wave are canceled by each other.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 16 is a table comparing experimental results of FIGS. 14-15 for three positions of the RFID tag;

FIG. 19 is a diagram illustrating the relative permittivity $\in_r$ and the dielectric loss tan δ of a liquid material;

FIG. 20 is a diagram illustrating the relative permittivity $\in_r$ and the dielectric loss tan δ of a solid material;

FIG. 36 is a diagram illustrating a calculation result of a composite reflected wave $E_{r20}$ and a reflection coefficient S for a reflectance $r_{01}$;

FIGS. 37A-37B are comparison tables of conductivity (specific resistance)σ, density, resistivity μ, and skin depth δs;

FIGS. 38A-38C are diagrams illustrating a trial calculation result of the film thickness Dt;

DESCRIPTION OF EMBODIMENTS

In the following, embodiments of the present invention will be described with reference to the accompanying drawings. The same elements across the drawings are assigned the same numerical codes.

First Embodiment

A first embodiment will be described in the following order.

A. Reduction of standing wave
A1. Configuration
A2. Cancellation of reflected waves
A2.1 First reflected wave $E_{r1}$
A2.2 Second reflected wave $E_{r2}$
A3. Effects
A4. Application examples
A5. Parameter values
B. Modified example about position of dielectric
C. Modified example about reduced second space
D. Communication method The above classification of the sections is not essential for the disclosed embodiment; items described in two or more sections may be combined to be used if necessary, and an item described in a section may be applied to another item described in another section (unless contradiction arises).

<a. Reduction of Standing Wave>

A1. Configuration

Figure 1:
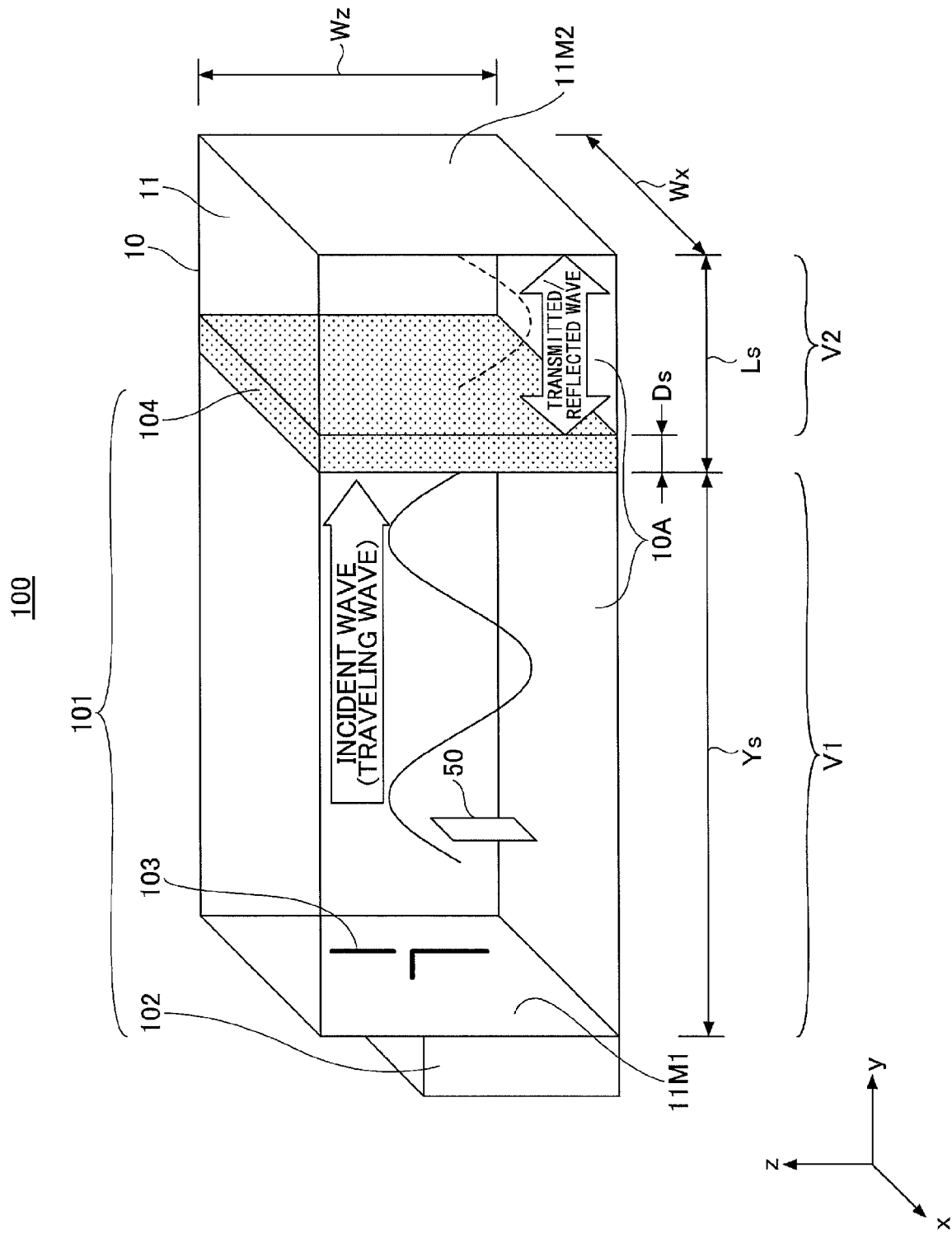
FIG. 1 is a diagram illustrating a wireless communication system used in a first embodiment of the present invention.

FIG. 1 illustrates a wireless communication system 100 in the first embodiment. The wireless communication system 100 includes a wireless communication module 101 and an RFID tag 50 disposed in a closed space 10A specified by the wireless communication module 101. The wireless communication system 100 is attached to a conductive structure 10. Note that the wireless communication system 100 may include the conductive structure 10. For the sake of explanation, it is assumed that FIG. 1 illustrates the wireless communication system 100 as a whole.

The conductive structure 10 includes six conductive walls 11 that form the closed space 10A. A first conductive wall 11M1 and a second conductive wall 11M2 are included in the six conductive walls 11. In the example illustrated in FIG. 1, the closed space 10A has a quadrilateral (rectangular) cross section in the X-Z plane. The conductive structure 10 forms a wave guide tube having a tube shape that extends in the Y-axis direction, enclosed by the six conductive walls 11 that specifies six surfaces at the top and bottom, left and right, and front and back. The wave guide tube or closed space formed by the conductive structure 10 illustrated in FIG. 1 has lengths of Wx in the X-axis direction, Wz in the Z-axis direction, and (Ys+Ls) in the Y-axis direction. The closed space 10A is enclosed by the six conductive walls 11. Although the wave guide tube has the rectangular cross section in the example illustrated in FIG. 1, the first embodiment is not restricted by the rectangular cross section, but the wave guide tube may have another cross section such as a circular cross section. Also, the number of the conductive walls 11 that forms the closed space 10A is not limited to six. The conductive structure 10 may be, for example, a shelf with a cover made of metal, a container made of metal, or a warehouse or a room covered by the conductive walls 11. Also, the conductive walls 11 may have a mesh structure.

The wireless communication module 101 includes an RFID tag reader 102, an antenna 103, and a dielectric 104.

The RFID tag reader 102 analyzes information obtained from the RFID tag 50, and manages an object to be managed having the RFID tag 50 attached. The object to be managed may be goods, merchandise, a document, or any other arbitrary object. The RFID tag reader 102 is connected with the antenna 103, and transmits or receives a radio wave with the RFID tag 50 via the antenna 103. In the example illustrated in FIG. 1, although the RFID tag reader 102 is attached to one of the conductive walls 11 that form the wave guide tube, it may be disposed at another place, for example, separated from the conductive walls 11.

The antenna 103 is disposed on the first conductive wall 11M1 at one end of the wave guide tube. The antenna 103 may be an arbitrary antenna that transmits and receives a radio wave of a predetermined frequency. The antenna 103 may be, for example, a dipole antenna, a slot antenna, a patch antenna, or a microstrip antenna. The predetermined frequency may be an arbitrary value that is determined by a communication protocol used for communication with the RFID tag. The radio wave frequency received or transmitted by the antenna 103 may be, for example, 13.56 MHz, 900 MHz band, or 2.45 GHz. The radio wave of 915 MHz is specifically assumed in simulation results as will be described later. The radio wave received or transmitted by the antenna 103 may be a vertically polarized wave, a horizontally polarized wave, or a circularly polarized wave. A vertically polarized wave is a linearly polarized wave whose electric field goes along the Z-axis direction. A horizontally polarized wave is a linearly polarized wave whose electric field goes along the X-axis direction. A circularly polarized wave is a radio wave whose electric field direction rotates as time passes. The radio wave transmitted from the antenna 103 may be referred to as an "incident wave" because it is incident on the RFID tag 50, or may be referred to as a "traveling wave" because it travels in the positive Y-axis direction.

The RFID tag 50 is attached to an object to be managed (not illustrated in FIG. 1), stores information (for example, identification information) about the object to be managed, and in response to receiving the predetermined radio wave from the RFID tag reader 102, transmits the stored information by the radio wave. Therefore, the RFID tag 50 is a passive tag whose power to transmit the radio wave is supplied from the RFID tag reader 102. For example, when the RFID tag 50 receives a predetermined command signal after having received a preamble signal for a predetermined duration, the RFID tag 50 transmits the information read out of a memory (not illustrated in FIG. 1) as a response signal. Although only one RFID tag 50 is illustrated in FIG. 1 for the sake of simplicity, a number of RFID tags 50 may exist in the closed space 10A in practice.

The dielectric 104 partitions the closed space 10A into a first space V1 and a second space V2. The dielectric 104 has the lengths of about Wx in the X-axis direction and about Wz in the Z-axis direction, and has the thickness Ds in the Y-axis direction. The dielectric 104 is an example of a plate-shaped member made of a dielectric. In practice, considering the thickness of the conductive walls 11 that form the wave guide tube, the cross section of the dielectric 104 on a plane vertical to the Y-axis direction (the X-Z plane) has a slightly shorter length than Wx in the X-axis direction, and a slightly shorter length than Wz in the Z-axis direction. The dielectric 104 is disposed between the antenna 103 disposed on the first conductive wall 11M1 at the one end of the wave guide tube, and the second conductive wall 11M2 at the other end of the wave guide tube. For the sake of explanation, it is assumed that the space between the antenna 103 and the dielectric 104 is the "first space V1", the space between the dielectric 104 and the second conductive wall 11M2 is the "second space V2". In the example illustrated in FIG. 1, the first space V1 has a length Ys in the Y-axis direction, the second space V2 has a length (Ls−Ds) in the Y-axis direction. Note that, for the sake of explanation in the following, the position of the dielectric 104 is represented by the distance between the second conductive wall 11M2 and a surface of the dielectric 104 on the side facing the first space V1, relative to the position of the second conductive wall 11M2 as the reference, and denoted as the position Ls of the dielectric 104.

Figure 2:
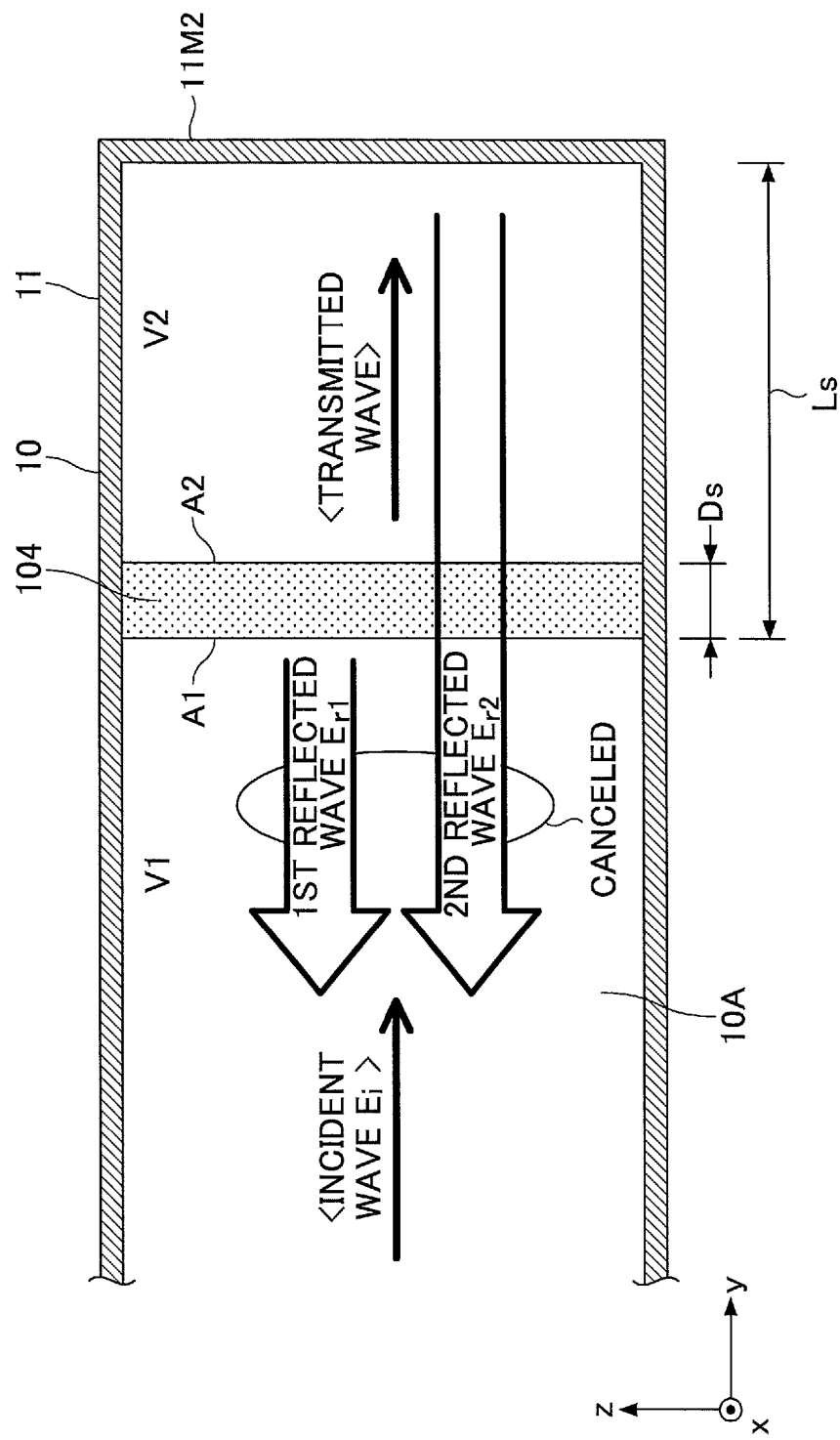
FIG. 2 is a diagram illustrating the neighborhood of a dielectric 104 of a wireless communication system in detail.

FIG. 2 illustrates the neighborhood of the dielectric 104 in FIG. 1. As illustrated in FIGS. 1-2, a part of a radio wave transmitted from the antenna 103 is reflected by the dielectric 104 to become a first reflected wave $E_{r1}$ that propagates in the first space V1. The dielectric 104 is an example of a reflective part. Another part of the radio wave transmitted from the antenna 103 transmits through the second space V2, and then, is reflected by the second conductive wall 11M2 to become a second reflected wave $E_{r2}$ that propagates in the first space V1. The phase difference between the first reflected wave $E_{r1}$ and the second reflected wave $E_{r2}$ depends on the position Ls and the thickness Ds of the dielectric 104. Thereupon, the position Ls and the thickness Ds of the dielectric 104 are determined so that the composite wave of the first reflected wave $E_{r1}$ and the second reflected wave $E_{r2}$ has zero or a sufficiently small amplitude in the first space V1. In other words, the position Ls and the thickness Ds of the dielectric 104 are determined so that the first reflected wave $E_{r1}$ and the second reflected wave $E_{r2}$ are canceled by each other in the first space V1. The dielectric 104 is disposed at the position that has the distance Ls from the second conductive wall 11M2 in the Y-axis direction (the position that has the length Ys from the first conductive wall 11M1) as will be specifically described in the section "A2. Cancellation of reflected waves". The distance Ls is represented by $\lambda_g \times n/2$ where n is a natural number. It is typically n=1. If n is greater than or equal to two, it will be described in "B. Modified example about position of dielectric". $\lambda_g$ is the guide wave length of the radio wave that propagates in the wave guide tube, and the next formula is satisfied with the wavelength $\lambda$ of the radio wave propagating in a vacuum.

$$\lambda_g = \lambda/\cos\theta$$

$$\cos\theta = [1-(\lambda/2W)^2]^{1/2}$$

where W=Wz if the radio wave transmitted from the antenna 103 is a horizontally polarized wave, or W=Wx if it is a vertically polarized wave. The condition of $Ls \approx \lambda_g \times n/2$ represents a condition under which a standing wave (wavelength of 2 Ls/n) is generated in the second space V2 having the length Ls. The distance Ls may be slightly shifted from $\lambda_g \times n/2$ because it is sufficient to generate a standing wave that has two nodes in the second space V2 at the positions of the dielectric 104 and the second conductive wall 11M2. To be $\lambda_g \times n/2$ practically, for example, the distance Ls may be within a range of plus or minus 5% of $\lambda_g \times n/2$.

The thickness Ds of the dielectric 104 is represented by $\lambda_d \times \beta/2$ where $\beta$ is a constant less than 1, for example, a value within a range of 0.85 to 0.95. $\lambda_d$ is the wavelength of the radio wave that propagates in the dielectric 104, represented by $\lambda_d = \lambda/\sqrt{\in_r}$. $\lambda$ is the wavelength of the radio wave that propagates in a vacuum, and $\in_r$ is the relative permittivity of the dielectric 104.

Figure 3:
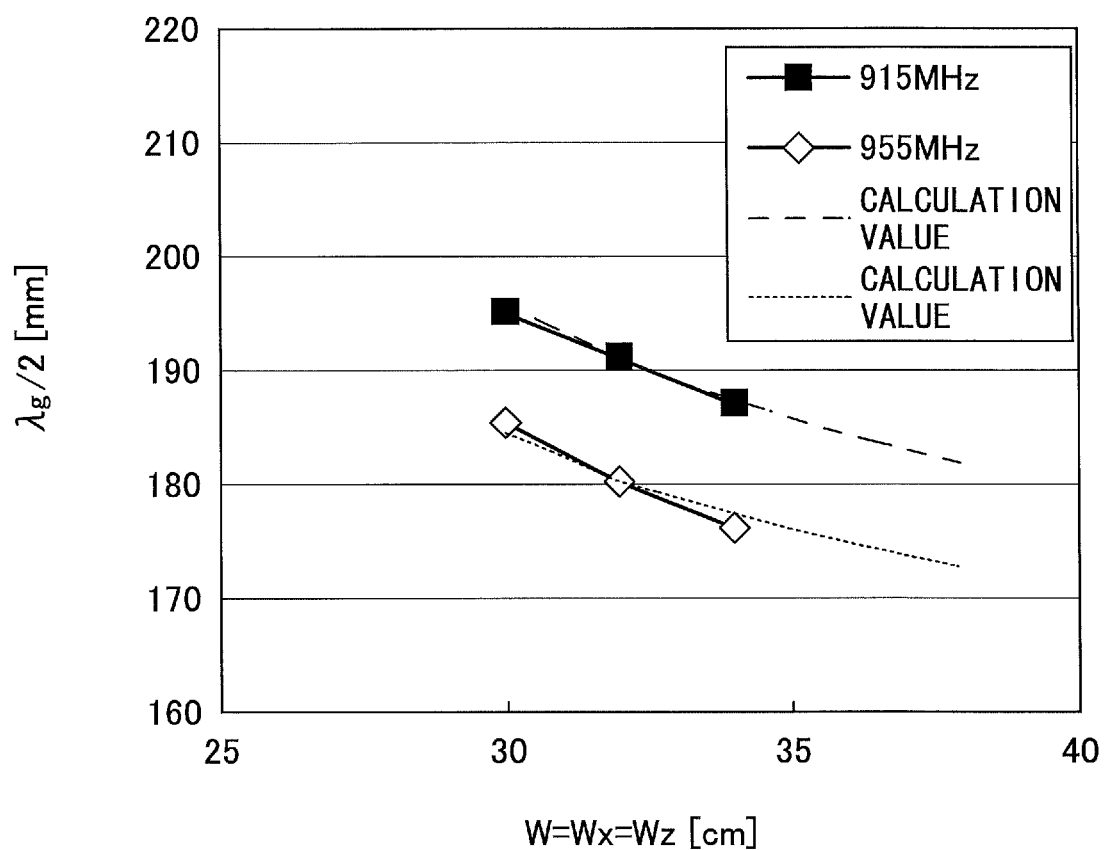
FIG. 3 is a diagram illustrating a relationship between a guide wave length $\lambda_g$ and a vertical or horizontal length W of a wave guide tube for 915 MHz and 955 MHz, respectively.

FIG. 3 illustrates a relationship between the guide wave length $\lambda_g$ and the vertical or horizontal length W of the wave guide tube when the frequency of the radio wave is 915 MHz or 955 MHz. In the simulation result illustrated in FIG. 3, it is assumed that W=Wx=Wy. As illustrated in FIG. 3, for either of the frequency 915 MHz or 955 MHz, it can be understood that the guide wave length (half of the guide wave length, $\lambda_g/2$) reduces while the area ($W^2$) of the cross section of the wave guide tube becomes larger. Therefore, while the area of the cross section of the wave guide tube becomes larger, the second space V2 (the space between the dielectric 104 and the second conductive wall 11M2) becomes smaller, and the first space V1 (the space between the first conductive wall 11M1 and the dielectric 104) becomes larger.

A2. Cancellation of Reflected Waves

The radio wave transmitted from the antenna 103 illustrated in FIG. 1 may be referred to as a "traveling wave" because it travels in the positive Y-axis direction, or may be referred to as an "incident wave" because it is incident on the RFID tag 50. A part of the traveling wave (or the incident wave) is reflected by the dielectric 104, and another part is reflected by the second conductive wall 11M2. To describe the dielectric 104 disposed in the first embodiment, first, consideration will be made in a case where the dielectric 104 does not exist.

Figure 4:
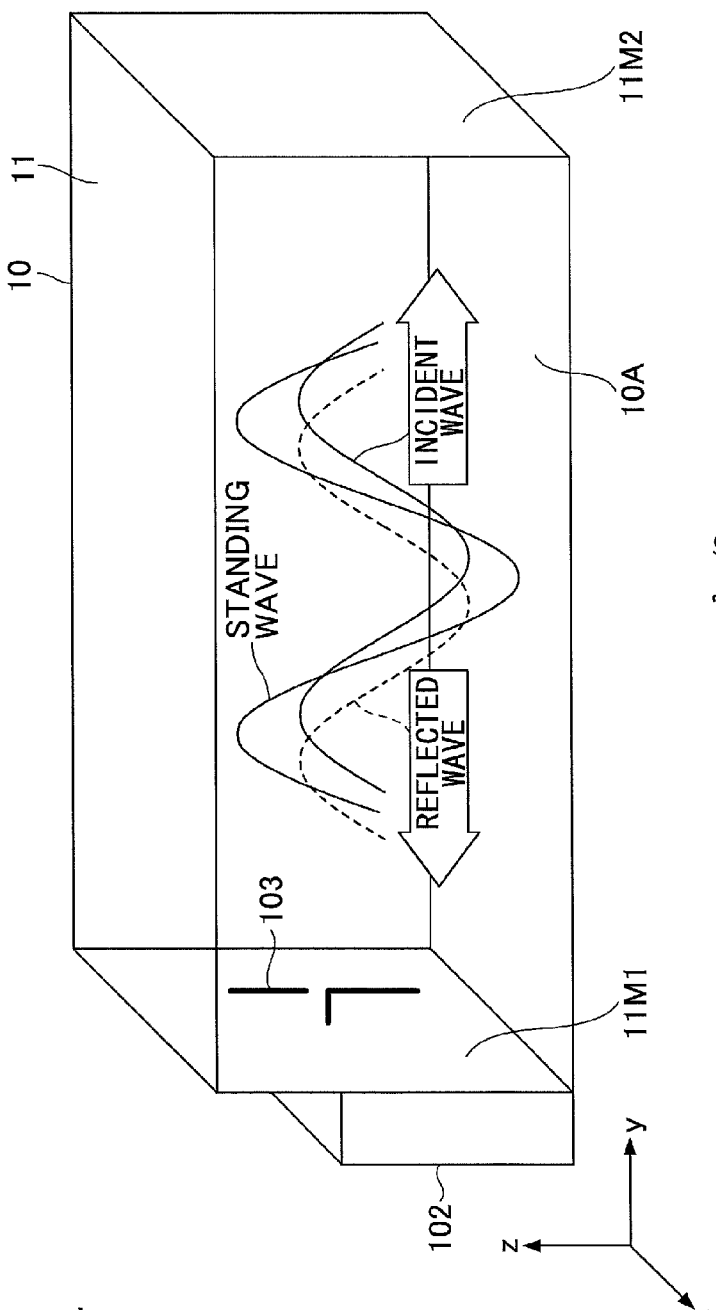
FIG. 4 is a diagram illustrating a state where a standing wave is generated when a dielectric 104 does not exist.

FIG. 4 illustrates the case where the dielectric 104 illustrated in FIG. 1 does not exist. In this case, two waves having a similar amplitude exist, one is the incident wave (traveling wave) propagating in the positive Y-axis direction transmitted from the antenna 103, and the other is the reflected wave propagating in the negative Y-axis direction reflected by the second conductive wall 11M2. As the incident wave and the reflected wave travel at the same speed in the opposite directions, a standing wave is formed that has nodes and antinodes along the Y-axis direction. Namely, the nodes of the standing wave are generated at every interval of $\lambda_g/2$ along the Y-axis direction, the antinodes are generated between the nodes.

Figure 5:
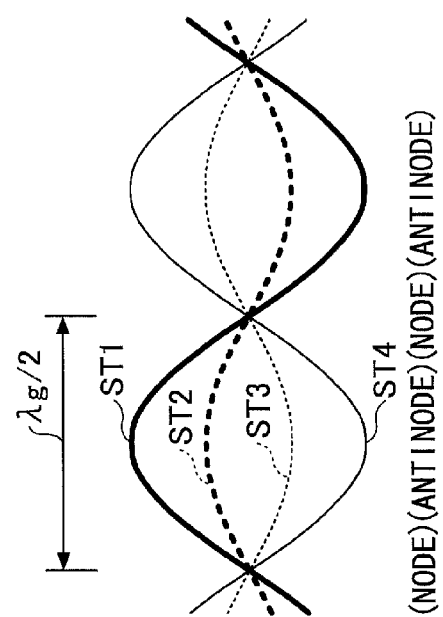
FIG. 5 is a schematic view illustrating waveforms of various phases of a standing wave.

FIG. 5 schematically illustrates waveforms in terms of four types of phases of the standing wave. Namely, the four waveforms in FIG. 5 change shape while time passes, taking shapes ST1, ST2, ST3, and ST4 in this order, and then, ST4, ST3, ST2, and ST1 in the reverse order. Nodes are generated at every interval of $\lambda_g/2$, and each antinode is generated between every pair of adjacent nodes. The radio wave strength is always zero at positions of the nodes, and the radio wave strength shows the greatest change at the positions of the antinodes.

Figure 6:
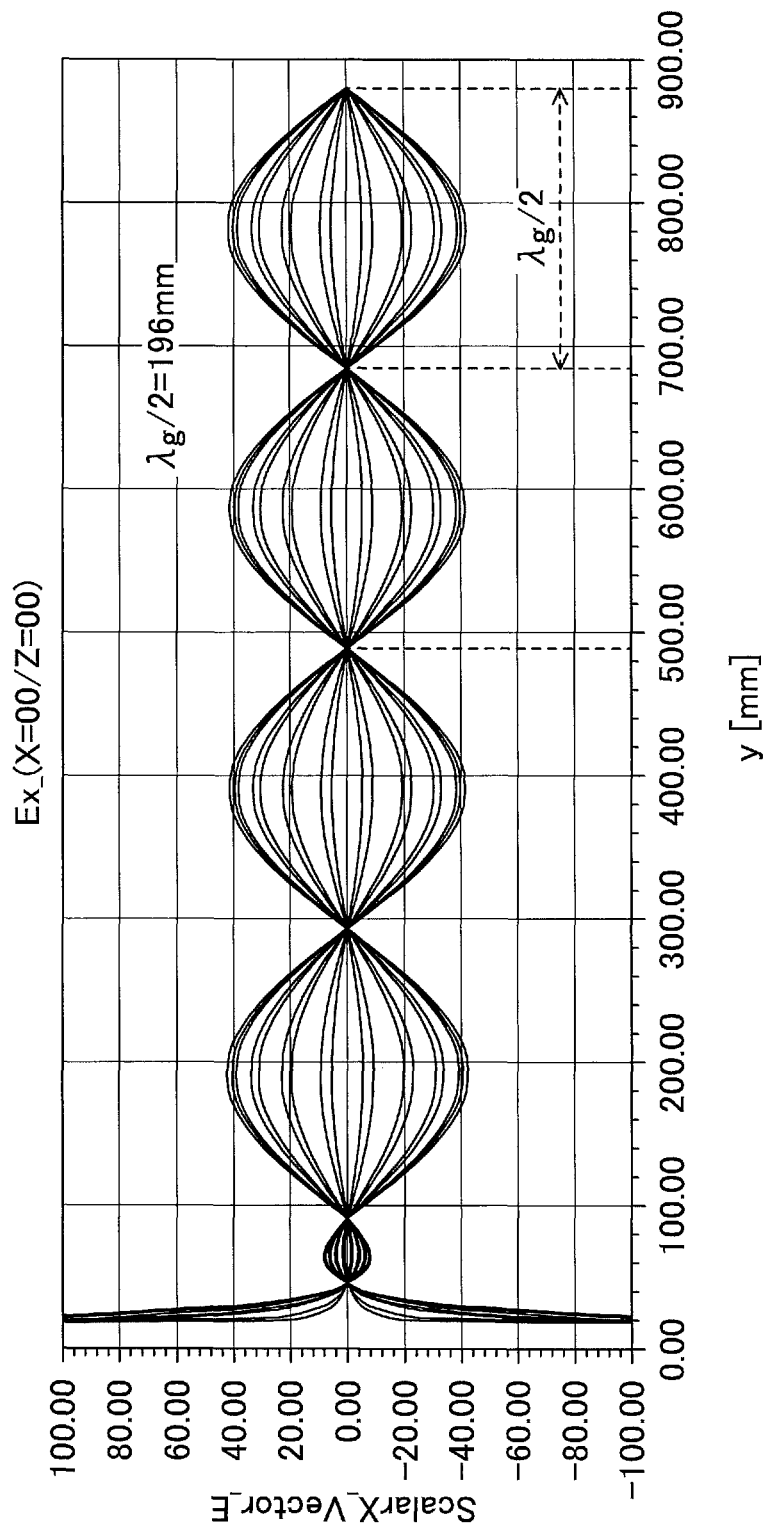
FIG. 6 is a diagram illustrating a simulation result that displays superposed waveforms of various phases of a standing wave.

FIG. 6 illustrates a simulation result that displays superposed waveforms of various phases of the standing wave. The simulation has been performed using an electromagnetic analysis tool called HFSS (high frequency structure simulator). In the example illustrated in FIG. 6, the magnitude |Ex| (ScalarX Vector_E) of an electric field is displayed with the Y coordinate when a horizontally polarized wave (a linearly polarized wave whose electric field component goes along the X-axis direction) is transmitted from the antenna 103 in a wave guide tube as illustrated in FIG. 4. The frequency of the radio wave is 915 MHz. The first conductive wall 11M1 is positioned at the origin (y=0), and the second conductive wall 11M2 is positioned at y=880 mm. If an RFID tag is disposed in the neighborhood of a node generated at every interval of $\lambda_g/2$, the RFID tag cannot sufficiently receive the radio wave from the antenna 103, and cannot respond to the RFID tag reader 102.

In contrast to this, the dielectric 104 is disposed at the predetermined position on the Y-axis direction as illustrated in FIG. 1 in the first embodiment. In the first embodiment, as illustrated in FIG. 2, a part of the incident wave $E_i$ transmitted from the antenna 103 is reflected by the dielectric 104 to become the first reflected wave $E_{r1}$ that propagates in the first space V1, and another part transmits through the second space V2, and then, is reflected by the second conductive wall 11M2 to become the second reflected wave $E_{r2}$ that transmits into the first space V1. Therefore, the reflected wave Er is the sum of the first reflected wave $E_{r1}$ and the second reflected wave $E_{r2}$.

$$Er = E_{r1} + E_{r2}$$

To be strict, a component $E_i \cos\theta$ needs to be considered, which changes depending on the angle $\theta$ that determines the guide wave length $\lambda_g$, although it should be noted that $\theta$ is omitted for the sake of simplicity of the description.

A2.1 First Reflected Wave $E_{r1}$

The first reflected wave $E_{r1}$ is a radio wave reflected by the dielectric 104. To be more precise, it is a composite wave of a reflected wave of the incident wave $E_i$ that has been transmitted from the antenna 103 and reflected by the surface A1 of the dielectric 104, and a reflected wave of the incident wave $E_i$ that has transmitted through the surface A1, reflected one or more times in the dielectric 104, and transmitted back into the first space V1 through the surface A1 again.

Figure 7:
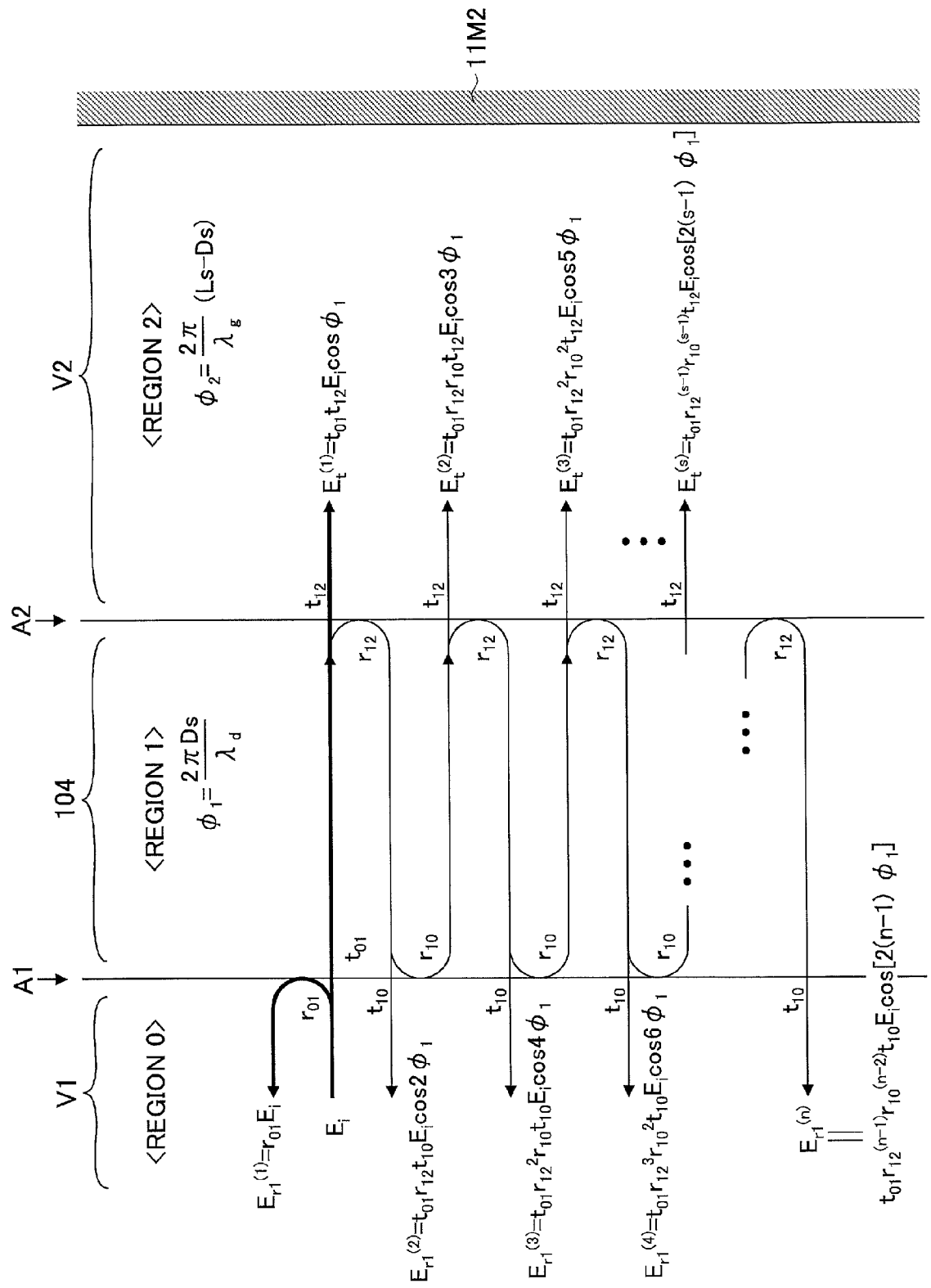
FIG. 7 is a diagram illustrating a model to calculate a first reflected wave $E_{r1}$.

FIG. 7 illustrates a simple model to calculate the first reflected wave $E_{r1}$. For convenience's sake, the first space V1 is referred to as the "region 0", the region in the dielectric 104 is referred to as the "region 1", and the second space V2 is referred to as the "region 2". In the following description, $r_{01}/t_{01}$ represents the reflectance/transmittance when the radio wave from the region 0 to the region 1 is reflected/transmitted, respectively. Also, $r_{12}/t_{12}$ represents the reflectance/transmittance when the radio wave from the region 1 to the region 2 is reflected/transmitted, respectively. Conversely, $r_{10}/t_{10}$ represents the reflectance/transmittance when the radio wave from the region 1 to the region 0 is reflected/transmitted, respectively. Also, $r_{21}/t_{21}$ represents the reflectance/transmittance when the radio wave from the region 2 to the region 1 is reflected/transmitted, respectively. Note that the reflection by the second conductive wall 11M2 in the second space V2 is a complete reflection, and the reflectance $r_{2b}$ is $r_{2b}=-1$.

As illustrated in FIG. 7, first, when the incident wave $E_i$ is reflected by the surface A1 of the dielectric 104, the first reflected component $E_{r1}^{(1)}$ is obtained.

$$R_{r1}^{(1)} = r_{01} E_i$$

The n-th reflected component is denoted as $E_{r1}^{(n)}$. The second reflected component $E_{r1}^{(2)}$, which is obtained when the incident wave $E_i$ transmits through the surface A1, reflected by the back A2, then, transmits through the surface A1, is represented by $$E_{r1}^{(2)} = t_{01} r_{12} t_{10} E_i \cos[2\phi_1]$$

where the phase $\phi_1$ represents the amount of phase change when the radio wave travels from the surface A1 to the back A2 of the dielectric 104 (or in the reverse direction), which is $\phi_1 = 2\pi Ds/\lambda_d$. The phase difference between the first reflected component $E_{r1}^{(1)}$ (or incident wave $E_i$) and the second reflected component $E_{r1}^{(2)}$ is $2\phi_1$ (for one round trip), and hence, it is multiplied by $\cos[2\phi_1]$. Note that it is not mandatory to represent the amount of phase change by the cosine function, but the amount of phase change may be represented by the complex number $\exp(j2\phi_1)$. The third reflected component $E_{r1}^{(3)}$, which is obtained when the incident wave $E_i$ transmits through the surface A1, reflected twice by the back A2, reflected once by the surface A1, then, transmits through the surface A1, is represented by $$E_{r1}^{(3)} = t_{01} r_{12}^2 r_{10} t_{10} E_i \cos[4\phi_1]$$

The fourth reflected component $E_{r1}^{(4)}$, which is obtained when the incident wave $E_i$ transmits through the surface A1, reflected three times by the back A2, reflected twice by the surface A1, then, transmits through the surface A1, is represented by $$E_{r1}^{(4)} = t_{01} r_{12}^3 r_{10}^2 t_{10} E_i \cos[6\phi_1]$$

The n-th reflected component $E_{r1}^{(n)}$ can be obtained by similar consideration.

$$E_{r1}^{(n)} = t_{01} r_{12}^{(n-1)} r_{10}^{(n-2)} t_{10} E_i \cos[2(n-1)\phi_1]$$

where $n \geq 2$.
$E_{r1}^{(1)} = r_{01} E_i$ for $n=1$.

Although n goes to infinity, by determining an appropriate maximum value of n, or nMAX, in practice to calculate the sum of the first to nMAX-th reflected components, the first reflected wave $E_{r1}$ can be estimated. Thus, the first reflected wave $E_{r1}$ can be represented as follows.

$$E_{r1} = E_{r1}^{(1)} + E_{r1}^{(2)} + \ldots + E_{r1}^{(nMAX)}$$

A2.2 Second Reflected Wave $E_{r2}$

The second reflected component $E_{r2}$ is a radio wave that is obtained when the incident wave $E_i$ transmits from the region 1 to the side of the region 2 (the second space V2), reflected by the second conductive wall 11M2, then, transmits into the region 0 again. First, the first transmitted component $E_t^{(1)}$, which is obtained when the incident wave $E_i$ generated in the region 0 transmits through the surface A1 of the dielectric 104, and then, transmits through the back A2 without reflection, is represented by $$E_t^{(1)} = t_{01} t_{12} E_i \cos[\phi_1]$$

$E_t^{(s)}$ represents the s-th transmitted component among transmitted waves $E_t$ that have transmitted into the region 2. Phase $\phi_i$ represents the amount of phase change when a radio wave travels from the surface A1 to the back A2 of the dielectric 104 (or in the reverse direction), which is $\phi_1 = 2\pi Ds/\lambda_d$. The phase difference between the incident wave $E_i$ and the first transmitted component $E_t^{(1)}$ is $\phi_1$ (for a one-way), and hence, it is multiplied by $\cos[\phi_1]$. Note that it is not mandatory to represent the amount of phase change by the cosine function, but the amount of phase change may be represented by the complex number $\exp(j\phi_1)$.

The second transmitted component $E_t^{(2)}$, which is obtained when the incident wave $E_i$ transmits through the surface A1, reflected once by the surface A2, reflected once by the surface A1, and then, transmits through the back A2, is represented by $$E_t^{(2)} = t_{01} r_{12} r_{10} t_{12} E_i \cos[3\phi_1]$$

The third transmitted component $E_t^{(3)}$, which is obtained when the incident wave $E_i$ transmits through the surface A1, reflected twice by the back A2, reflected twice by the surface A1, and then, transmits through the back A2, is represented by $$E_t^{(3)} = t_{01} r_{12}^2 r_{10}^2 t_{12} E_i \cos[5\phi_1]$$

The s-th transmitted component $E_t^{(s)}$ can be obtained by similar consideration.

$$E_t^{(s)} = t_{01} r_{12}^{(s-1)} r_{10}^{(s-1)} t_{12} E_i \cos[2(s-1)\phi_1]$$

where $s \geq 1$. Although s goes to infinity, an appropriate maximum value of s, or sMAX, can be determined in practice to estimate the transmitted wave $E_t$ into the region 2 by considering the first to sMAX-th transmitted components.

Figure 8:
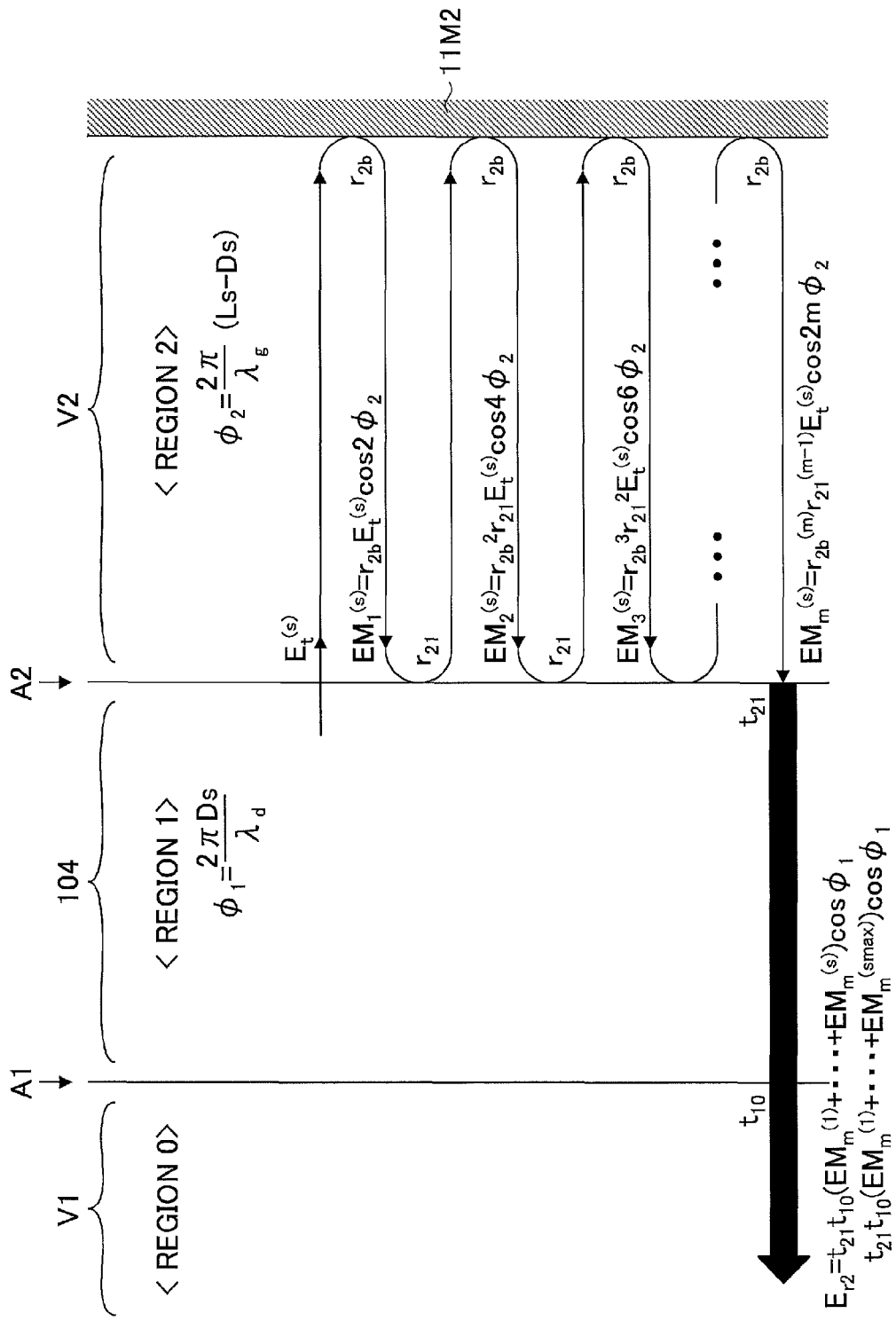
FIG. 8 is a diagram illustrating a model to calculate a second reflected wave $E_{r2}$.

As illustrated FIG. 8, the s-th ($s \geq 1$) transmitted component $E_t^{(s)}$ into the region 2 is reflected by the back A2 of the dielectric 104 and the second conductive wall 11M2 multiple times, and then, transmits into the region 1 to be incident on the region 0 (the first space V1).

The first reflected component $EM_1^{(s)}$ of the s-th transmitted component $E_t^{(s)}$ that transmits into the region 2, then reflected by the second conductive wall 11M2 to reach the back A2 is represented by:

$$EM_1^{(s)} = r_{2b} E_t^{(s)} \cos[2\phi_2]$$

$EM_m^{(s)}$ represents a component that is generated when the s-th transmitted component $E_t^{(s)}$ transmitted into the region 2 is reflected in the region 2 (the second space V2) m times. Phase $\phi_2$ represents the amount of phase change when a radio wave travels in the region 2 (from the back A2 to the second conductive wall 11M2 and vice versa), which is $\phi_2=2\pi(Ls-Ds)/\lambda_g$. The phase difference between the s-th transmitted component $E_t^{(s)}$ and the first reflected component $EM_1^{(s)}$ is $\phi_2$ (for one round trip), and hence, it is multiplied by cos [$\phi_2$]. Note that it is not mandatory to represent the amount of phase change by the cosine function, but the amount of phase change may be represented by the complex number exp($j2\phi_2$).

The second reflected component $EM_2^{(s)}$ of the s-th transmitted component $E_t^{(s)}$ that transmits into the region 2, then reflected by the second conductive wall 11M2 twice, reflected by the back A2 once, to reach the back A2, is represented by:

$$EM_2^{(3)}=r_2b^2r_{21}E_t^{(s)} \cos [4\phi_2]$$

The third reflected component $EM_3^{(s)}$ of the s-th transmitted component $E_t^{(s)}$ that transmits into the region 2, then reflected by the second conductive wall 11M2 three times, reflected by the back A2 twice, to reach the back A2, is represented by:

$$EM_3^{(s)}=r_{2b}^3r_{21}^2E_t^{(s)} \cos [6\phi_2]$$

The m-th reflected component $EM_m^{(s)}$ can be obtained by similar consideration.

$$EM_m^{(s)}=r_{2b}^m r_{21}^{(m-1)}E_t^{(s)} \cos [2m\phi_2]$$

where m≥1.

Although m goes to infinity, an appropriate maximum value of m, or mMAX, can be determined in practice to estimate an influence of multiple reflections of the s-th transmitted component $E_t^{(s)}$.

A transmitted wave obtained when the incident wave $E_i$ generated in the region 0 (the first space V1) transmits into the region 2 (the second space V2) via the region 1 includes transmitted components of $E_t^{(s)}$(s=1, 2, . . . , sMAX), namely, $\{E_t^{(1)}, E_t^{(2)}, \ldots, E_t^{(sMAX)}\}$. The second reflected component $E_{r2}$ is obtained when each of these transmitted components is reflected m times in the region 2 (the second space V2) to transmit into the region 1.

$$E_{r2}=t_{21}t_{10}(EM_m^{(1)}+EM_m^{(2)}+ \ldots +Em_m^{(sMAX)})\cos [\phi_1]$$

As described above, the position Ls and the thickness Ds of the dielectric 104 need to be set so that the first reflected wave $E_{r1}$ and the second reflected wave $E_{r2}$ are canceled by each other, or sufficiently reduced in the region 0 (the first space V1).

Relational formulas for the first reflected wave $E_{r1}$, the second reflected wave $E_{r2}$, and the composite reflected wave Er based on the simple model in FIGS. 7-8 are summarized as follows:

Er=$E_{r1}$+$E_{r2}$ (the magnitude of the composite wave to be 0)

$$E_{r1}=E_{r1}^{(1)}+E_{r1}^{(2)}+ \ldots +E_{r1}^{(nMAX)}$$

$$E_{r2}=t_{21}t_{10}(EM_m^{(1)}+EM_m^{(2)}+ \ldots +EM_m^{(sMAX)})\cos [\phi_1]$$

$$EM_m^{(s)}=r_{2b}^m r_{21}^{(m-1)}E_t^{(s)} \cos [2m\phi_2]$$

$\phi_1=2\pi Ds/\lambda_d$ $\phi_2=2\pi(Ls-Ds)/\lambda_g$

Based on an example of numerical values below, the first reflected wave $E_{r1}$ and the second reflected wave $E_{r2}$ are calculated to obtain the reflected wave Er and the reflection coefficient S as an example.

$Ds=16$ mm,$Ls=(\lambda_g/2)=197$ mm, $\lambda_d=\lambda/\sqrt{\in_r}=43.5$ mm,$f=c/\lambda=915$ MHz, $E_i=40$ [V/m], $\phi_1=132.2°,\phi_2=166.2°$, $n$MAX=40,$s$MAX=5,$m=40$, $r_{01}=-0.8,t_{01}=0.2$, $r_{12}=0.8,t_{12}=1.8$, $r_{10}=0.8,t_{10}=1.8$, $r_{21}=-0.8,t_{21}=0.2$, $r_{2b}=-1$ From these numerical values, $E_{r1}=-37.53$ [V/m], $E_{r2}=38.3$ [V/m], $Er=E_{r1}+E_{r2}=0.77$ [V/m]

are obtained in which an extremely small value of 0.77 [V/m] is obtained for the composite electric field Er for the first reflected wave $E_{r1}$ and the second reflected wave $E_{r2}$. This is because, under the condition, the first reflected wave $E_{r1}$ and the second reflected wave $E_{r2}$ have opposite phases to each other, and the composite electric field Er is canceled or absorbed in the dielectric 104 (see <<A5. Parameter values>> (relative permittivity $\in_r$), and FIG. 23). Note that the reflection coefficient S in this case takes an extremely low value, S=Er/$E_i$=0.019(=1.9%).

An analysis has been made by an HFSS simulation below because it is difficult to obtain precise electric field distribution and effects by a trial calculation using the simple model.

A3. Effects

Figure 9:
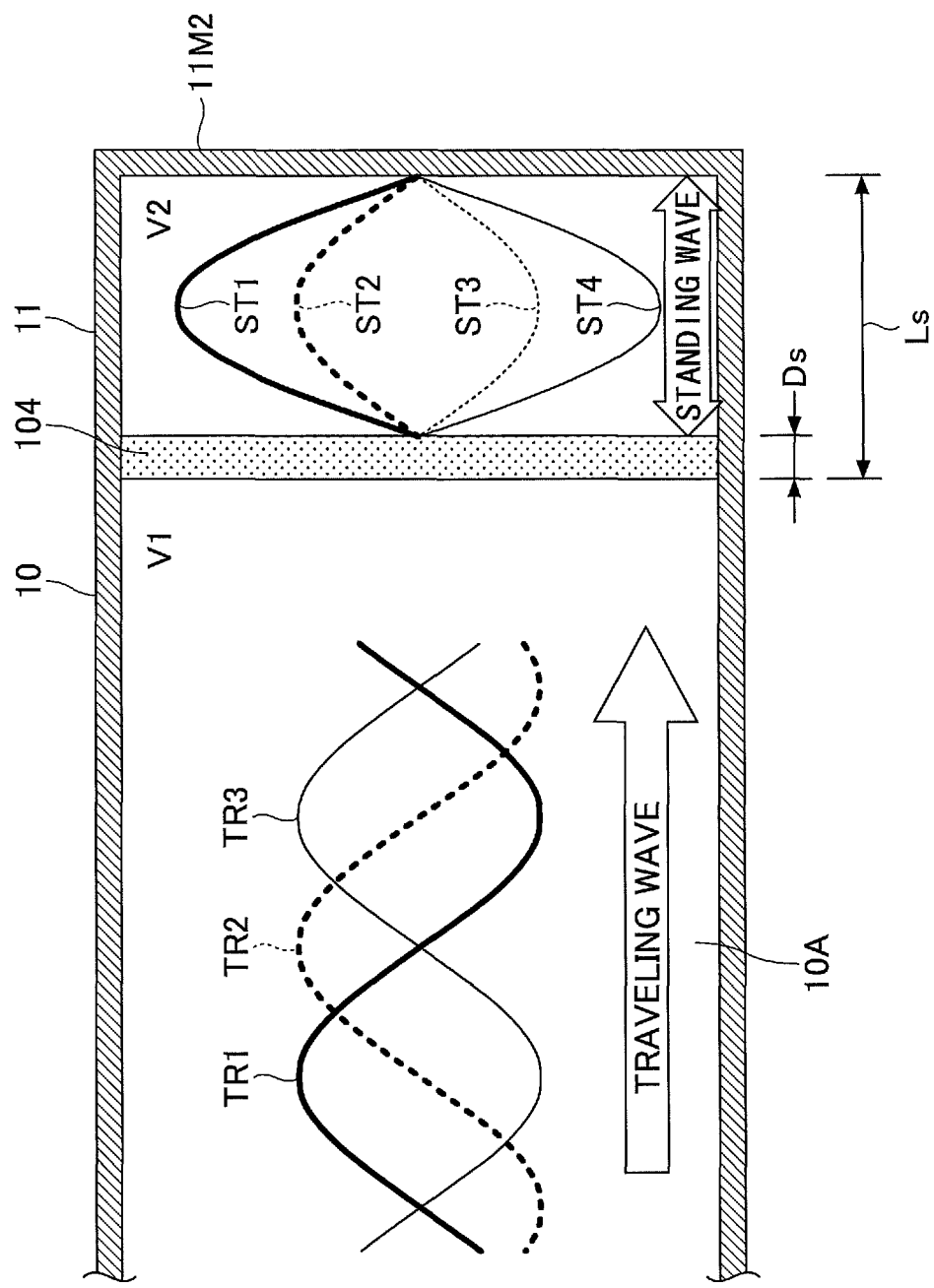
FIG. 9 is a diagram illustrating a state where a first reflected wave $E_{r1}$ and a second reflected wave $E_{r2}$ are canceled by each other in a first space V1, and a standing wave is generated in a second space V2.

When the first reflected wave $E_{r1}$ and the second reflected wave $E_{r2}$ are canceled by each other in the first space V1, as illustrated in FIG. 9, the only radio wave having non-zero magnitude in the first space V1 is the traveling wave radiated from the antenna 103 or the incident wave. The standing wave is not generated in the first space V1. The example in FIG. 9 schematically illustrates three waveforms TR1, TR2, and TR3 among various phases of the traveling wave transmitted from the antenna 103. The traveling wave changes its waveform to take TR1, TR2 and TR3 in order as time passes. Although a reflected wave is generated when the traveling wave reaches the dielectric 104, the reflected wave is canceled, and hence, a standing wave is not generated in the first space V1.

In the second space V2, a standing wave is generated due to a transmitted wave corresponding to the traveling wave or the incident wave transmitted through the dielectric 104 and a reflected wave corresponding to the transmitted wave reflected by the second conductive wall 11M2. The example in FIG. 9 schematically illustrates four waveforms ST1, ST2, ST3, and ST4 among various phases of the transmitted wave. As time passes, the standing wave changes its waveform to take ST1, ST2, ST3, ST4, and then, ST4, ST3, ST2, and ST1 in order. Nodes of the standing wave in the second space V2 are generated only at two positions, namely, the dielectric 104 and the second conductive wall 11M2 because the second space V2 has the length of Ls=$\lambda_g$/2 (strictly Ls−Ds) along the Y-axis direction. This is because Ls is set to about half of the guide wave length.

Therefore, an RFID tag can be placed anywhere in the first space V1 and the second space V2 to receive the radio wave with an appropriate strength, and to appropriately respond to the RFID tag reader.

Thus, the wireless communication system 100 and the wireless communication module 101 in the present embodiment can improve communication performance in the closed space 10A enclosed by the conductive walls 11, by placing the dielectric 104 at a position having the length of Ls=$\lambda_g$/2 from the second conductive wall 11M2. Ls=$\lambda_g$/2 is a value of Ls=$\lambda_g$×n/2 when n is 1.

Note that, as described above, the distance Ls may be slightly shifted from $\lambda_g$×n/2. To be $\lambda_g$×n/2 practically, for example, the distance Ls may be within a range of plus or minus 5% of $\lambda_g$×n/2.

In the following, actual simulation results will be illustrated with reference to FIGS. 10-12. The following parameter values are used in the simulation for the wireless communication system 100 as illustrated in FIG. 1.

The width of the wave guide tube in the X-axis direction Wx=300 mm;

The width of the wave guide tube in the Z-axis direction Wz=300 mm;

The length of the wave guide tube in the Y-axis direction (Ys+Ls)=880 mm;

The thickness of the dielectric 104 Ds=16 mm;

The width of the dielectric 104 in the X-axis direction=300 mm;

The width of the dielectric 104 in the Z-axis direction=300 mm;

The relative permittivity of the dielectric 104 $\in_r$=81;

The dielectric loss of the dielectric 104 tan δ=0.08;

The position of the dielectric 104 Ls=197 mm≈$\lambda_g$/2; and

The radio wave frequency f=915 MHz

Figure 10:
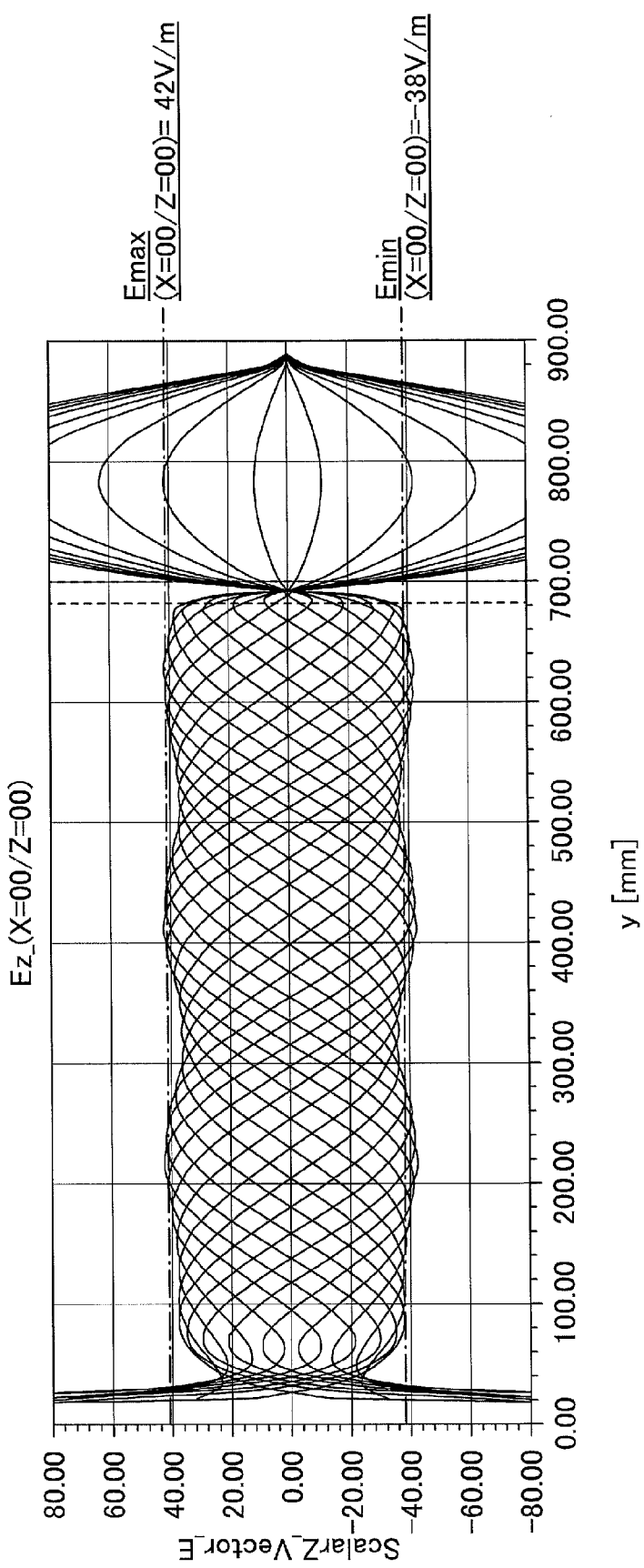
FIG. 10 is a diagram illustrating a simulation result that displays various superposed phases of a traveling wave where x=0 and z=0.

FIG. 10 illustrates a simulation result that displays various superposed phases of a traveling wave. The example in FIG. 10 illustrates the magnitude |Ez| (ScalarZ_Vector_E) of an electric field on the Y-axis direction (x=0 and z=0) when a vertically polarized wave (a linearly polarized wave whose electric field component goes along the Z-axis direction) is transmitted from the antenna 103 illustrated in FIG. 1. The radio wave frequency is 915 MHz. The first conductive wall 11M1 is positioned at the origin (y=0), or at one end of the wave guide tube, and the second conductive wall 11M2 is positioned at the other end (y=880 mm) of the wave guide tube. The dielectric 104 is positioned at y=880−197=683 mm, and two dashed lines are drawn that correspond to the surface A1 and the back A2, respectively. As illustrated in FIG. 10, only the traveling wave exists and a standing wave is not generated in the first space V1 from the antenna 103 to the dielectric 104. In the second space from the dielectric 104 to the second conductive wall 11M2, a standing wave is generated, but the nodes are generated only at two positions, the dielectric 104 and the second conductive wall 11M2. Therefore, an RFID tag can receive the radio wave having sufficiently high strength anywhere in the first space V1 and the second space V2.

Figure 11:
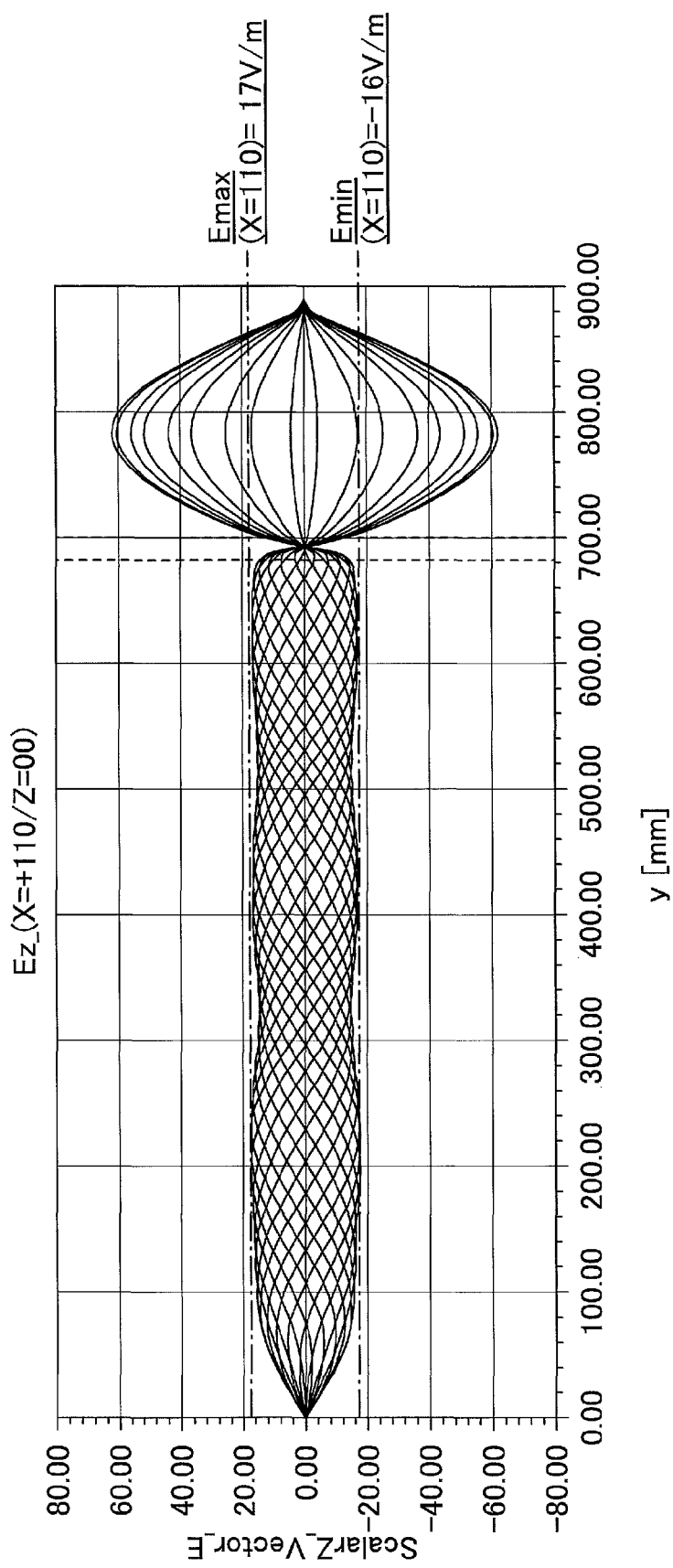
FIG. 11 is a diagram illustrating a simulation result that displays various superposed phases of a traveling wave where x=110 and z=0.

Similarly to FIG. 10, FIG. 11 also illustrates a simulation result that displays various superposed phases of a traveling wave in which the magnitude |Ez|(ScalarZ_Vector_E) of the electric field measured at x=110 and z=0 is illustrated with the coordinate on the Y-axis direction. As illustrated in FIG. 11, only the traveling wave exists and a standing wave is not generated in the first space V1 from the antenna 103 to the dielectric 104. In the second space from the dielectric 104 to the second conductive wall 11M2, a standing wave is generated, but the nodes are generated only at two positions, the dielectric 104 and the second conductive wall 11M2. However, in the example illustrated in FIG. 11, the magnitude of the electric field is less than that illustrated in FIG. 10.

This is because when a radio wave in the wave guide tube is a vertically polarized wave, the electric field strength in the horizontal (X-axis) direction decreases while moving from the center to the left or right boundary (x=−150, 150 mm) of the wave guide tube, and the electric field strength is 0 at the conductive wall 11 (x=−150 or 150 mm) positioned at the boundary of the wave guide tube. In the example illustrated in FIG. 11, the magnitude of the electric field is measured at a position closer to the boundary (x=150 mm) of the wave guide tube than in the example illustrated in FIG. 10 (x=0 mm). Incidentally, when a radio wave in the wave guide tube is a horizontally polarized wave, the electric field strength in the vertical (Z-axis) direction decreases while moving from the center to the top or bottom boundary of the wave guide tube, and the electric field strength is 0 at the conductive wall 11 at the boundary of the wave guide tube.

Figure 12:
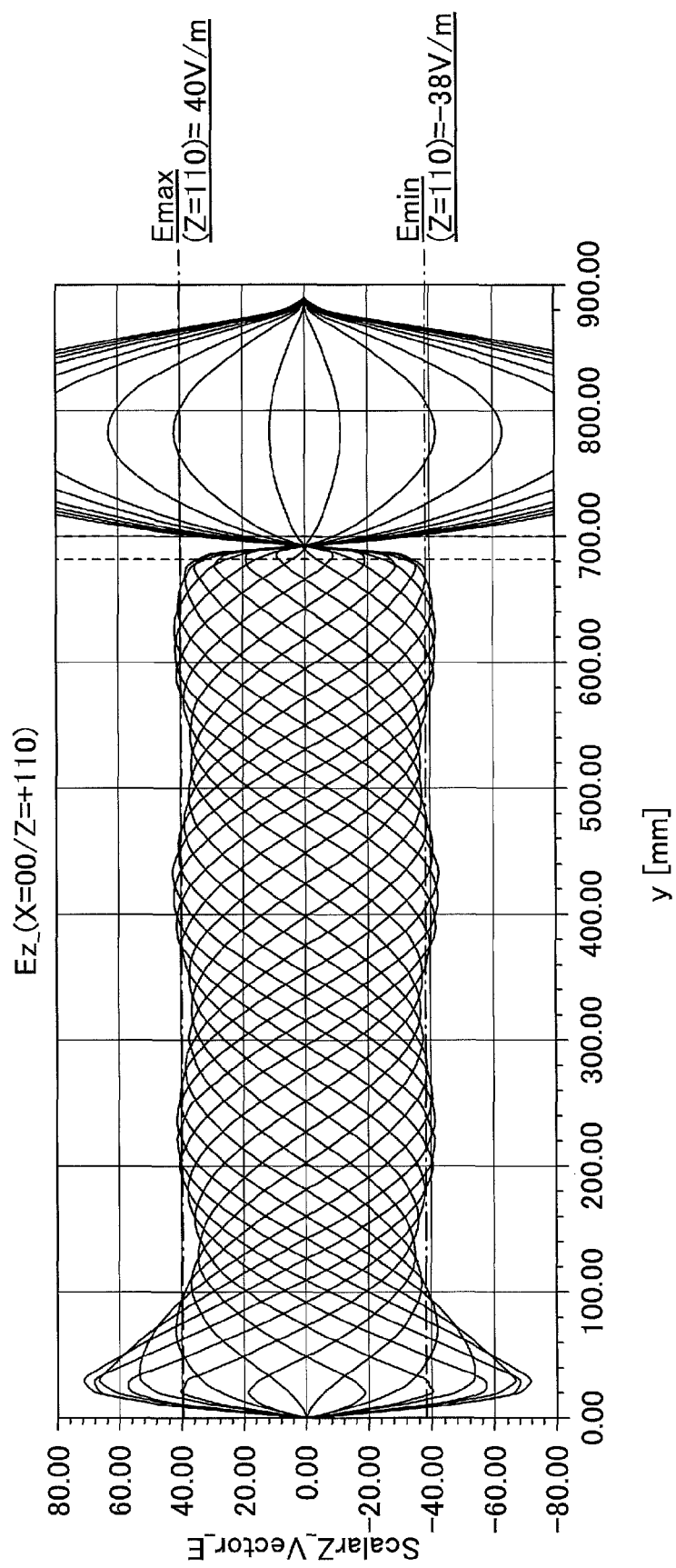
FIG. 12 is a diagram illustrating a simulation result that displays various superposed phases of a traveling wave where x=0 and z=110.

Similarly to FIG. 10, FIG. 12 also illustrates a simulation result that displays various superposed phases of a traveling wave in which the magnitude |Ez| (ScalarZ_Vector_E) of the electric field measured at x=0 mm and z=110 mm is illustrated with the coordinate on the Y-axis direction. As illustrated in FIG. 12, only the traveling wave exists and a standing wave is not generated in the first space V1 from the antenna 103 to the dielectric 104. In the second space from the dielectric 104 to the second conductive wall 11M2, a standing wave is generated, but the nodes are generated only at two positions, the dielectric 104 and the second conductive wall 11M2. The example illustrated in FIG. 12 differs from the example illustrated in FIG. 11 in that it has the magnitude of the electric field as comparably great as in the example in FIG. 10. Also, in the example illustrated in FIG. 12, the magnitude of the electric field is measured at a position closer to the boundary (z=150 mm) of the wave guide tube than in the example illustrated in FIG. 10 (z=0 mm). When the radio wave in the wave guide tube is a vertically polarized wave, the electric field strength in the vertical (Z-axis) direction is constant, and thus a sufficiently strong electric field is generated even at this position. Incidentally, when the radio wave in the wave guide tube is a horizontally polarized wave, the electric field strength in the horizontal (X-axis) direction is constant.

A4. Application Examples

Figure 13:
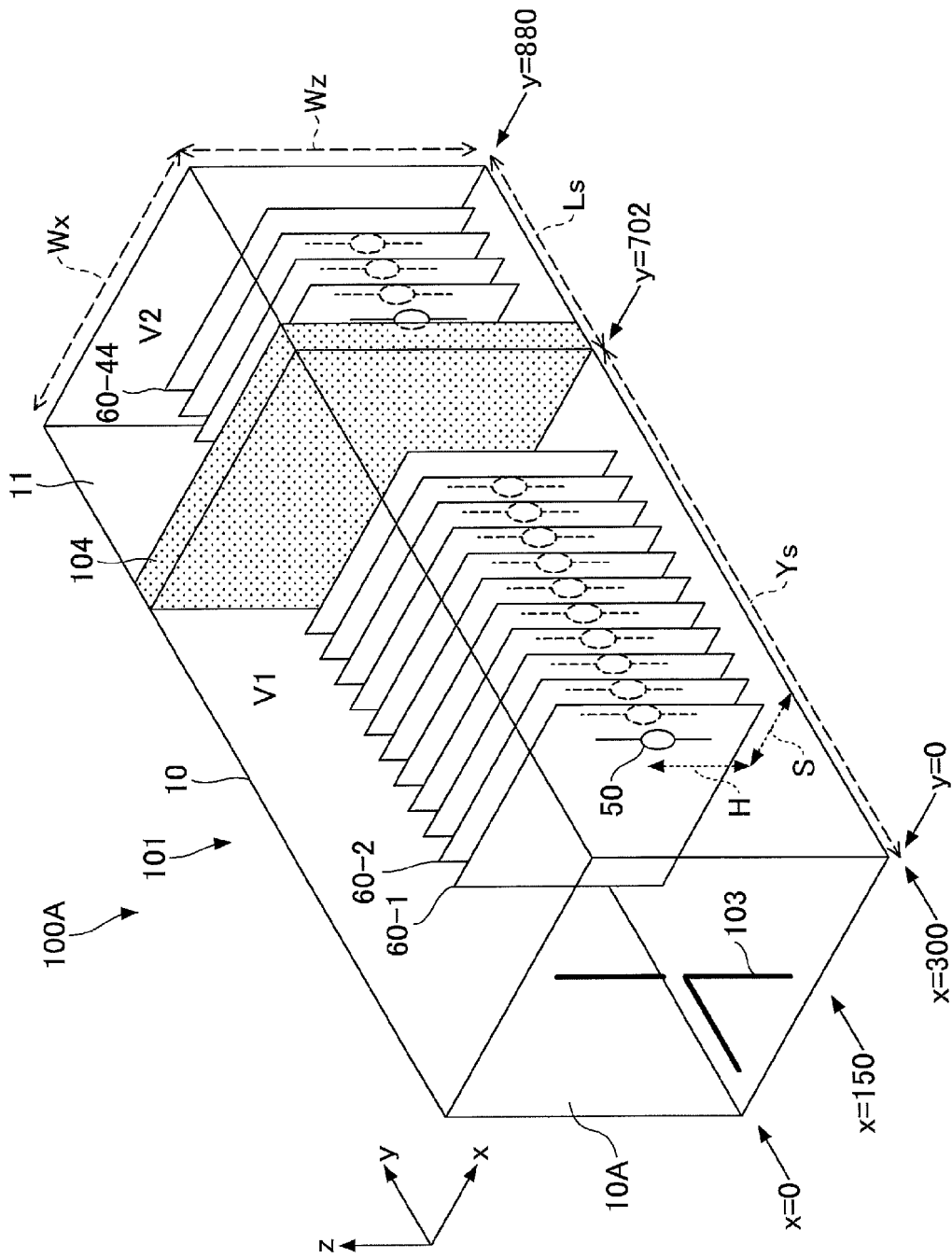
FIG. 13 is a diagram illustrating a wireless communication system in which a wireless communication module 101 has an RFID tag 50 disposed.

A demonstration experiment has been performed in that an RFID tag is actually placed in the first space V1 and the second space V2 and a radio wave is transmitted from the antenna to read out information from the RFID tag. FIG. 13 illustrates such a wireless communication system 100A. Although it is generally similar to the wireless communication system 100 illustrated in FIG. 1, in the wireless communication system 100A illustrated in FIG. 13, 44 envelopes 60-1 to 60-44 having RFID tags 50 attached, respectively, are provided in the closed space. The envelopes include documents, and it is intended to manage a number of documents. The wireless communication system 100A forms a wave guide tube having dimensions of 300 mm in the X-axis direction, 300 mm in the Z-axis direction, and 880 mm in the Y-axis direction.

The 44 envelopes stand in the Z-axis (vertically), and the 44 envelopes are arranged in the Y-axis direction. An RFID tag 50 has the size of 79 mm×11 mm, and is attached to an envelope at the height of 150 mm (z=150 mm) from the bottom of the envelope. The experiment is performed for three positions of the RFID tag 50 in the X-axis direction, x=150 mm (S=150 mm), x=230 mm (S=70 mm) and x=280 mm (S=20 mm). S represents the distance from the conductive wall 11 (boundary) positioned at x=300 mm. The RFID tags 50 can respond to power greater than or equal to −10 dBm (minimum operation power).

The dielectric 104 is formed of an acrylic water tank having the thickness of 2 mm, filled with water. The inside dimensions of the acrylic water tank are 290 mm in the X-axis direction, 290 mm in the Z-axis direction, and Ds=16 mm in the Y-axis direction. The acrylic water tank is placed at 198 mm (y=682 to 702 mm) from the second conductive wall 11M2. Therefore, considering that the thickness of the acrylic resin is 2 mm, water is placed at the position (y=684 to 700 mm) having the distance of Ls=196 mm from the second conductive wall 11M2. Note that acrylic has the relative permittivity of $\epsilon_r$=2.7 to 4.5, which is sufficiently smaller than that of water, and hence, it has little influence on the overall relative permittivity. The acrylic water tank filled with water can be regarded as the dielectric 104 having the relative permittivity of $\epsilon_r$=81 placed at Ds=16 mm.

The antenna 103 is a dipole antenna having the transmission power of 14 to 30.3 dBm, and the antenna gain of 2.14 dBi.

Figure 14:
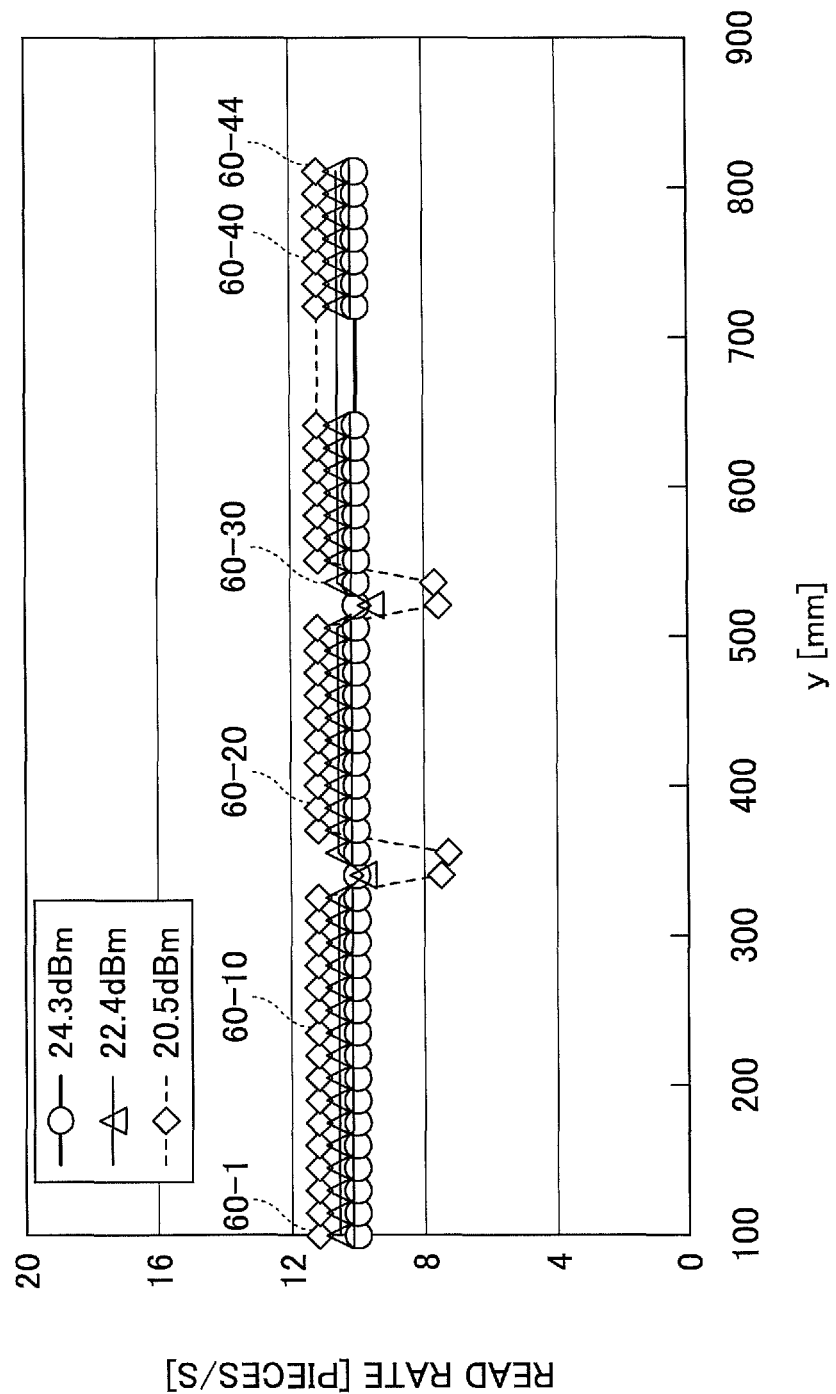
FIG. 14 is a diagram illustrating an experimental result on a read rate [pieces/s] of an RFID tag when a dielectric 104 (acrylic water tank) is not disposed in a closed space.

FIG. 14 illustrates an experimental result when the dielectric 104 (acrylic water tank) is not disposed in the closed space 10A where read rates [pieces/s] of RFID tags are measured at various positions on the Y-axis direction while changing the power of a vertically polarized wave (linearly polarized wave whose electric field goes along the Z-axis direction) from the antenna 103. The radio wave frequency is 915 MHz. The read rate indicates the number of RFID tags read out per second. The position of y=100 mm corresponds to an RFID tag 50 that is attached to the first envelope 60-1, and the position of y=800 mm corresponds to an RFID tag 50 that is attached to the 44th envelope 60-44.

When the power transmitted from the antenna 103 of the RFID tag reader is 20.5 dBm, the read rates for the RFID tags attached to 17th, 18th, 29th, and 30th envelopes 60-17, 60-18, 60-29, and 60-30 respectively, are lower compared to the other RFID tags placed at the other positions. Such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 22.4 dBm, the read rates are considerably improved. However, the read rates for the RFID tags attached to 17th and 29th envelopes 60-17 and 60-29 are still lower than the other RFID tags placed at the other positions. Again in this case, such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 24.3 dBm, the same read rate is realized at any positions on the Y-axis direction. Therefore, to appropriately manage documents when an acrylic water tank is not disposed, the RFID tag reader needs to transmit a radio wave having the strength of 24.3 dBm or greater.

Figure 15:
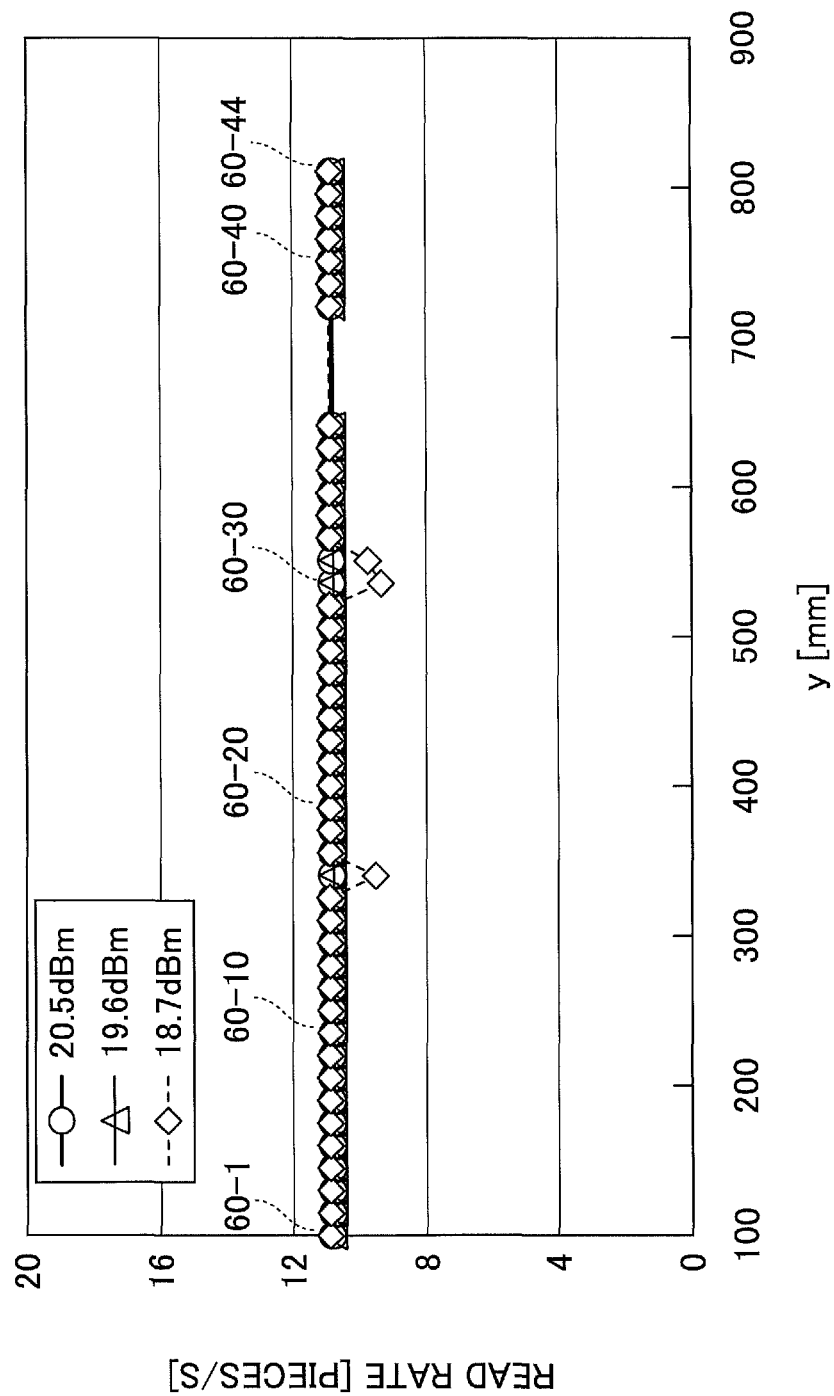
FIG. 15 is a diagram illustrating an experimental result on a read rate [pieces/s] of an RFID tag when a dielectric 104 (acrylic water tank) is disposed in a closed space.

FIG. 15 illustrates an experimental result when the dielectric 104 (acrylic water tank) is disposed in the closed space 10A where read rates [pieces/s] of RFID tags are measured at various positions on the Y-axis direction while changing the power of a vertically polarized wave (linearly polarized wave whose electric field goes along the Z-axis direction) from the antenna 103. The radio wave frequency is 915 MHz.

When the power transmitted from the antenna 103 of the RFID tag reader is 18.7 dBm, the read rates for the RFID tags attached to 17th, 30th, and 31th envelopes 60-17, 60-130, and 60-31, respectively, are lower than those of the other RFID tags placed at the other positions. Such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 19.6 dBm, the same read rate is realized at any positions on the Y-axis direction. When the power transmitted from the antenna 103 of the RFID tag reader is even higher 20.5 dBm, the same read rate is also realized at any positions on the Y-axis direction. Therefore, to appropriately manage documents when an acrylic water tank is disposed, the RFID tag reader needs to transmit a radio wave having the strength of 19.6 dBm or greater.

FIG. 16 compares experimental results of FIGS. 14-15 for three positions of an RFID tag. H is a coordinate in the Z-axis direction that represents the height of a position where the RFID tag 50 is disposed. S represents how far the RFID tag 50 is disposed from the conductive wall 11 positioned at x=300 mm. First, when the position (H/S) of the RFID tag 50 is (150 mm/20 mm) and (x=280 mm), and the dielectric 104 is not disposed, documents cannot be managed appropriately. On the other hand, when the dielectric 104 is disposed, and the radio wave is transmitted with power of 26.5 dBm or greater, the documents can be managed appropriately.

When the position (H/S) of the RFID tag 50 is (150 mm/70 mm) and (x=230 mm), and when the dielectric 104 is not disposed, the radio wave needs to be transmitted with the power of 24.3 dBm or greater to appropriately manage the documents. On the other hand, and when the dielectric 104 is disposed, it is sufficient to transmit the radio wave with the power of 19.6 dBm or greater to appropriately manage the documents. In this case, as much as 4.7 dBm (ΔPmin) of power can be saved.

When the position (H/S) of the RFID tag 50 is (150 mm/70 mm) and (x=150 mm), and when the dielectric 104 is not disposed, the radio wave needs to be transmitted with the power of 22.4 dBm or greater to appropriately manage the documents. On the other hand, when the dielectric 104 is disposed, it is sufficient to transmit the radio wave with the power of 19.6 dBm or greater to appropriately manage the documents. In this case, 2.8 dBm (ΔPmin) of power can be saved.

Figure 17:
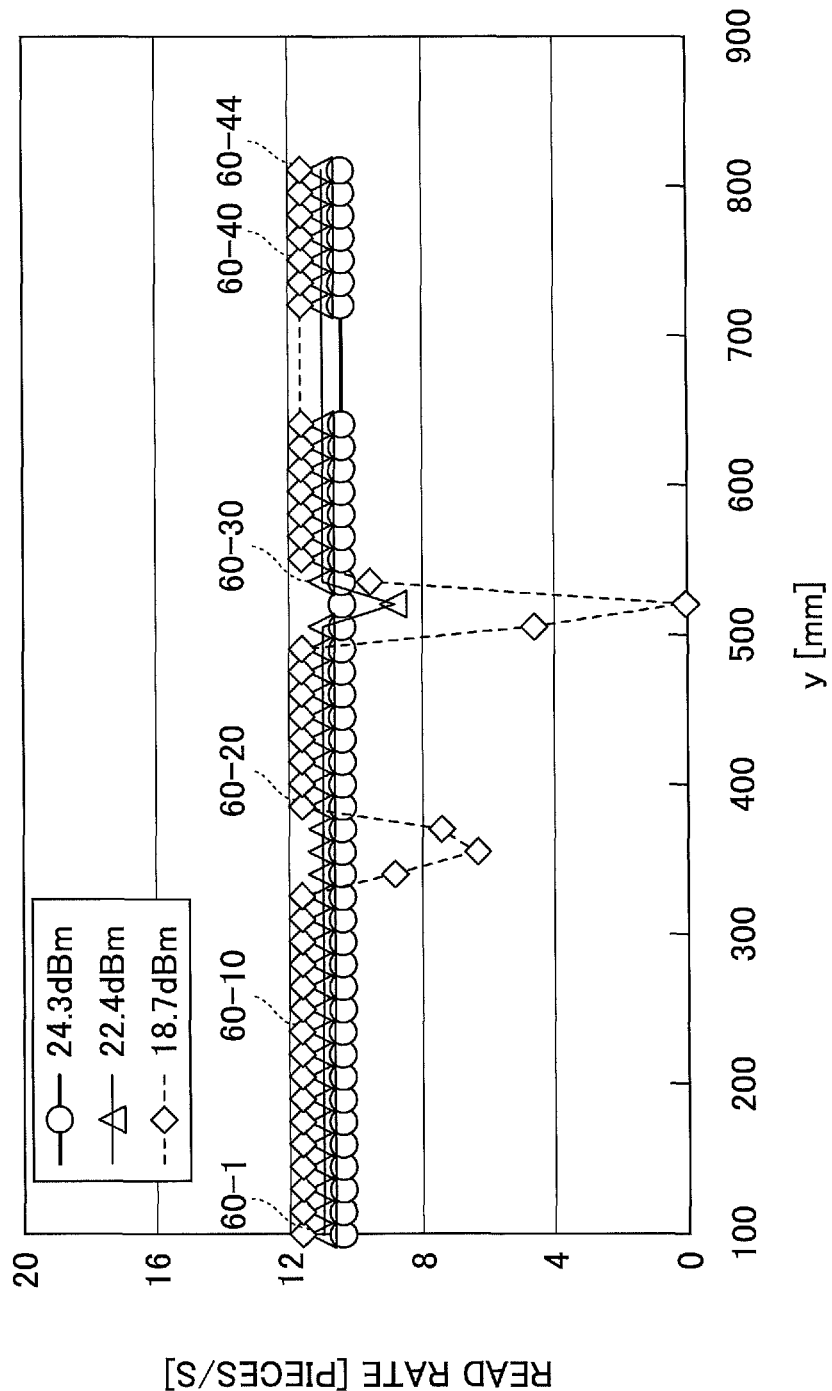
FIG. 17 s a diagram illustrating a wireless communication system in which a wireless communication module 101 has an RFID tag 50 disposed.
Figure 18:
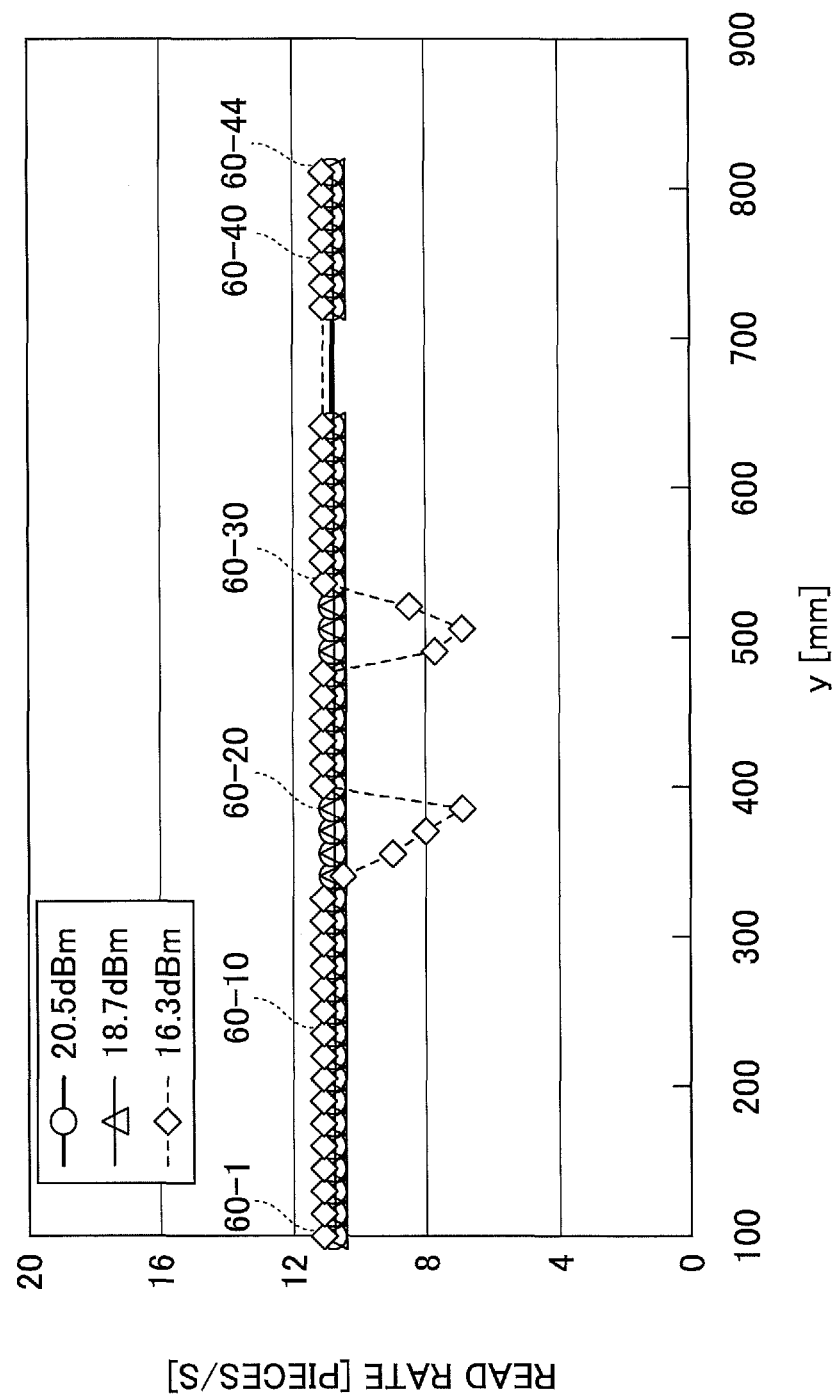
FIG. 18 is a diagram illustrating an experimental result on a read rate [pieces/s] of an RFID tag when a dielectric 104 (acrylic water tank) is disposed in a closed space.

FIGS. 17-18 illustrates experimental results similar to those in FIGS. 14-15, although examples in FIGS. 17-18 differs in that the radio wave is a horizontally polarized wave (linearly polarized wave whose electric field goes along the X-axis direction).

FIG. 17 illustrates an experimental result when the dielectric 104 (acrylic water tank) is not disposed in the closed space 10A where read rates [pieces/s] of RFID tags are measured at various positions on the Y-axis direction while changing the power of the horizontally polarized wave from the antenna 103.

When the power transmitted from the antenna 103 of the RFID tag reader is 18.7 dBm, the read rates for the RFID tags attached to 17th, 18th, 19th, 28th, 29th, and 30th envelopes 60-17, 60-18, 60-19, 60-28, 60-29, and 60-30 are lower than those of to the other RFID tags placed at the other positions. Such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 22.4 dBm, the read rates are considerably improved. However, the read rates for the RFID tags attached to 29th and 30th envelopes 60-29 and 60-30 are still lower than those of the other RFID tags placed at the other positions. Again in this case, such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 24.3 dBm, the same read rate is realized at any positions on the Y-axis direction. Therefore, to appropriately manage documents when an acrylic water tank is not disposed, the RFID tag reader needs to transmit a radio wave having the strength of 24.3 dBm or greater.

FIG. 18 illustrates an experimental result when the dielectric 104 (acrylic water tank) is disposed in the closed space 10A where read rates [pieces/s] of RFID tags are measured at various positions on the Y-axis direction while changing the power of the horizontally polarized wave from the antenna 103.

When the power transmitted from the antenna 103 of the RFID tag reader is 16.3 dBm, the read rates for the RFID tags attached to 17th, 18th, 19th, 20th, 27th, 28th, and 29th envelopes 60-17, 60-18, 60-19, 60-20, 60-27, 60-28, and 60-29, respectively, are lower than those of the other RFID tags placed at the other positions. Such dependency of the read rate of an RFID tag on the position on the Y-axis direction (the position where an envelope is placed) is not preferable from the viewpoint of appropriate management of envelopes and documents.

When the power transmitted from the antenna 103 of the RFID tag reader is even higher 18.7 dBm, the same read rate is realized at any positions on the Y-axis direction. When the power transmitted from the antenna 103 of the RFID tag reader is even higher 20.5 dBm, the same read rate is also realized at any positions on the Y-axis direction. Therefore, to appropriately manage documents when an acrylic water tank is disposed, the RFID tag reader needs to transmit a radio wave having the strength of 18.7 dBm or greater.

From the examples illustrated in FIGS. 17-18, it can be understood that the transmission power of the radio wave transmitted from the RFID tag reader is saved by as much as 24.3−18.7=5.6 dBm when the dielectric 104 is disposed in the closed space 10A. Thus, according to the first embodiment, by disposing the dielectric 104 in the closed space 10A, the documents can be managed with lower power than when the dielectric 104 is not disposed.

A5. Parameter Values (Relative Permittivity $\in_r$)

Depending on usage, the dielectric 104 may be formed of any appropriate material that has been in known the technology field. FIGS. 19-20 illustrate an example of various materials having different relative permittivity. FIG. 19 illustrates an example of a liquid material including ethylene glycol where several values of the relative permittivity $\in_r$ and the dielectric loss tan δ are illustrated while changing the concentration (EG concentration) at the frequency of 1 GHz. FIG. 20 illustrates an example of solid materials.

(Relationship Between Thickness Ds and Relative Permittivity $\in_r$)

Figure 21:
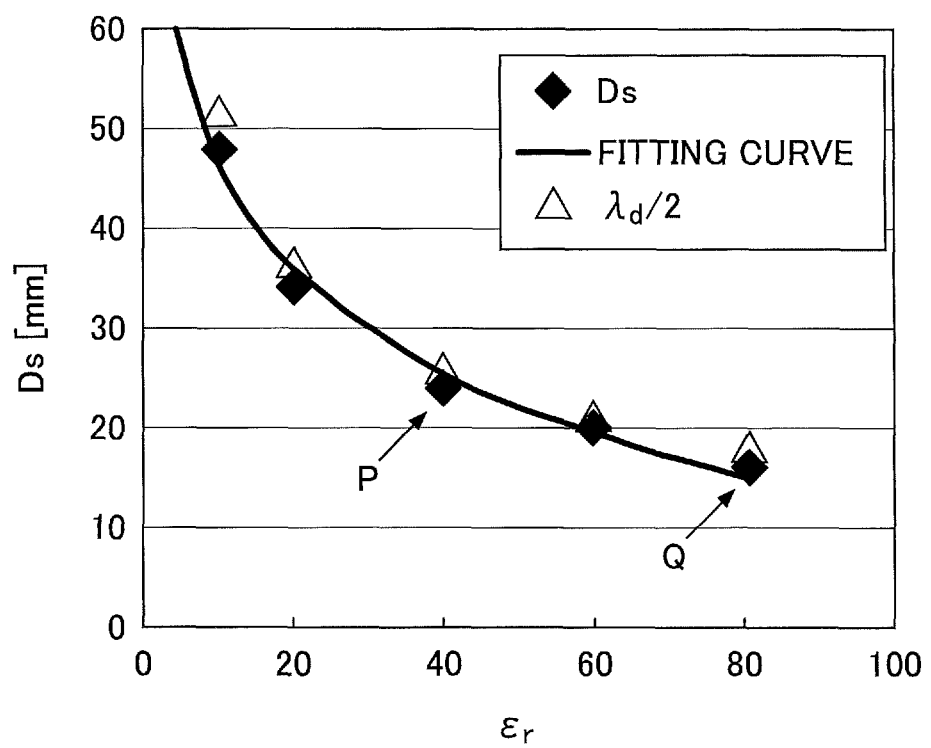
FIG. 21 is a diagram illustrating a relationship between the thickness Ds and the relative permittivity $\in_r$ of a dielectric 104 that satisfies a condition to have first and second reflected waves $E_{r1}$ and $E_{r2}$ canceled appropriately in a first space V1.

FIG. 21 illustrates a result of an HFSS simulation where the thickness Ds and the relative permittivity $\in_r$ of the dielectric 104 are obtained that satisfies the condition under which the first and second reflected waves $E_{r1}$ and $E_{r2}$ are appropriately canceled by each other in the first space V1 when the dielectric 104 is positioned at $Ls=\lambda_g/2$ from the second conductive wall 11M2 in the wireless communication system 100 illustrated in FIG. 1.

As illustrated in FIG. 21, when the relative permittivity $\in_r$ of the dielectric 104 is smaller, the thickness Ds of the dielectric 104 needs to be greater, and when the relative permittivity $\in_r$ of the dielectric 104 is greater, the thickness Ds of the dielectric 104 may be smaller. When the relative permittivity $\in_r$ of the dielectric 104 is greater, the region for placing an RFID tag becomes smaller. Therefore, it is preferable to have a great relative permittivity $\in_r$ of the dielectric 104 from the viewpoint of making the region greater for placing an RFID tag. On the other hand, a material having a higher relative permittivity tends to be expensive. Therefore, considering also from the viewpoint of practical use, it is preferable to have the relative permittivity $\in_r$ of 40 or greater.

Note that values of $\lambda_d/2$ are also plotted in FIG. 21. To generate a standing wave in the dielectric 104, the thickness of the dielectric 104 needs to be half (non-integer multiple, strictly) of the wavelength $\lambda_d$ in the dielectric 104 in theory. Actually comparing points plotted as values of Ds with points plotted as values of $\lambda_d/2$, it can be understood that although the value of Ds to appropriately cancel the reflected waves is about $\lambda_d/2$, it needs to be made slightly smaller than $\lambda_d/2$ to be more precise. Namely, $Ds=(\lambda_d/2)\beta$ where $0<\beta<1$.

(Optimization of β)

Figures 22, 23:
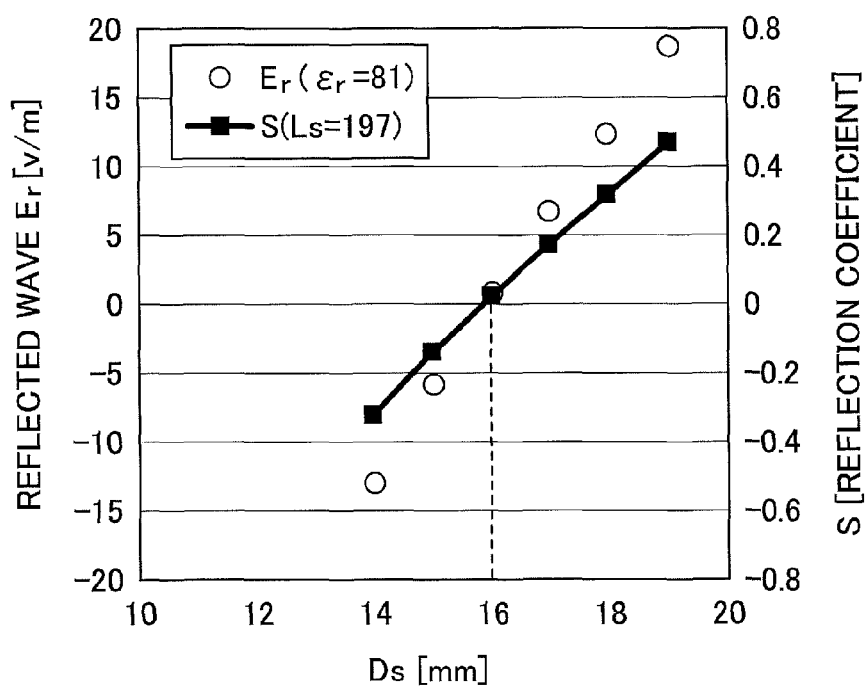
FIG. 22 is a diagram comparing the relative permittivity $\in_r$ and the thickness Ds of a dielectric 104 that satisfies a condition to have first and second reflected waves $E_{r1}$ and $E_{r2}$ canceled appropriately, with $\lambda_d/2$.
FIG. 23 is a diagram illustrating a mutual relationship between the thickness Ds[mm] of a dielectric 104, the magnitude Er[V/m] of a reflected wave, and the reflection coefficient S (=Er/$E_i$) when the dielectric 104 having the relative permittivity $\in_r$ of 81 is used.

FIG. 22 illustrates a comparison result between the relative permittivity $\in_r$ that satisfies the condition to cancel the reflected waves $E_{r1}$ and $E_{r2}$, $\lambda_d/2$, and the thickness Ds of the dielectric 104, which is obtained from the HFSS simulation in FIG. 21, to calculate β to make $Ds=(\lambda_d/2)\beta$. The calculated result is $0.88 \leq \beta \leq 0.95$.

FIG. 23 illustrates a mutual relationship between the thickness Ds [mm] of the dielectric 104, the magnitude Er [V/m] of a reflected wave, and the reflection coefficient S ($=Er/E_i$) when the dielectric 104 having the relative permittivity $\in_r$ of 81 is used, which is obtained by the simple model calculation in FIGS. 7-8. As illustrated in FIG. 23, when the thickness Ds is within a range of 14 mm to 19 mm, the magnitude Er of the reflected wave has the magnitude of −12 to +19 [V/m], and the reflection coefficient indicates the value of −0.3 to +0.5. And, when the thickness Ds is around 16 mm, the magnitude Er of the reflected wave and the reflection coefficient are closest to 0. This combination of $\in_r=81$ and Ds=16 mm corresponds to the point Q in FIG. 21. In this case, it can be represented as the thickness $Ds=0.88\lambda_d$ because the wavelength $\lambda_d/2$ of the radio wave travels in the dielectric 104 is 18.2 mm. Note that the phase difference is $2(\phi_1+\phi_2)=3.31\pi$ between the reflected wave reflected by the dielectric 104 and the reflected wave reflected by the second conductive wall 11M2, and it is a state close to opposite phases. Therefore, it is understood from the simple model calculation that the electric fields are canceled by each other.

To summarize the results illustrated in FIGS. 21-23, it can be understood that $0<\beta<1$, and preferably $0.85\leq\beta\leq0.95$ when representing $Ds=\lambda_d\times\beta/2$.

(Dielectric Loss Tan δ)

When the dielectric loss or the dielectric loss tangent tan δ of the dielectric 104 is great, power loss of a radio wave or a phase shift tends to be generated. Therefore, it is preferable that the dielectric loss tan δ is small, ideally 0.

Figure 24:
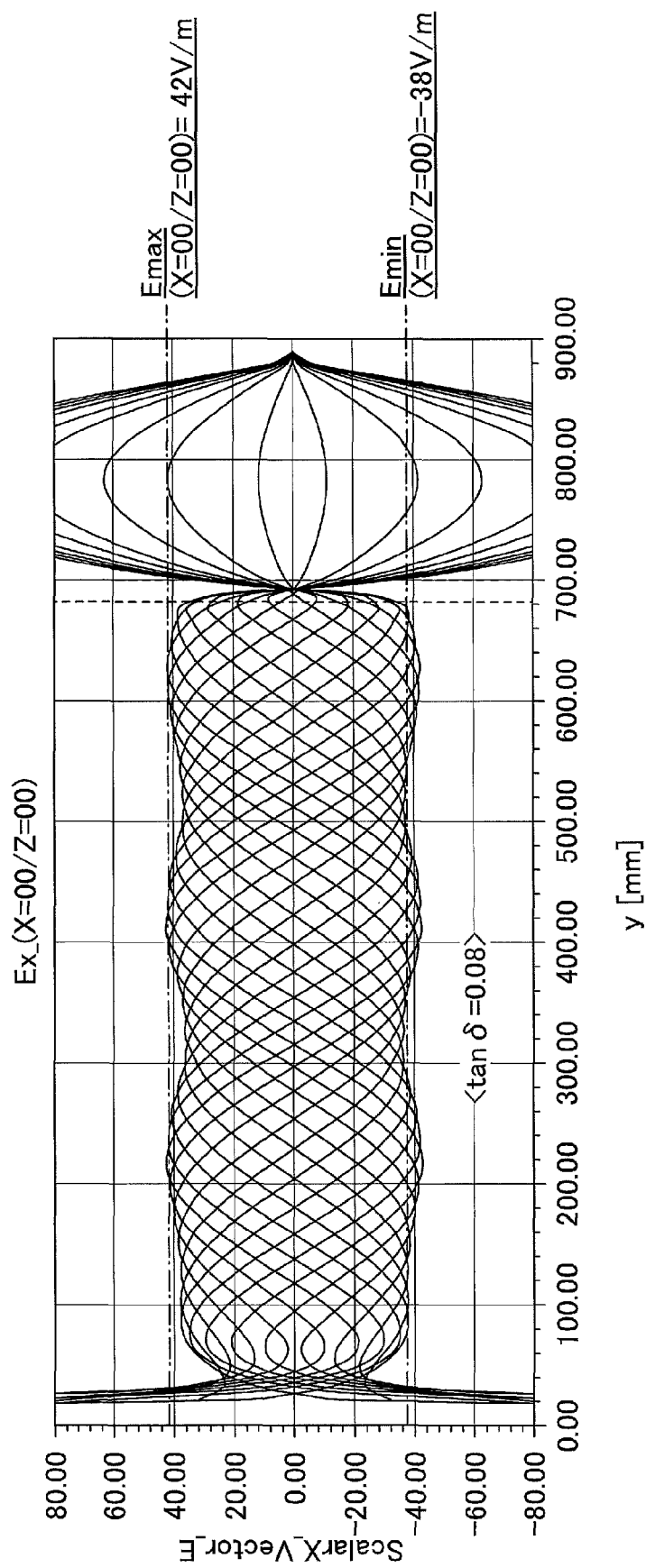
FIG. 24 is a diagram illustrating a simulation result that displays various superposed phases of a traveling wave generated when a dielectric 104 having the dielectric loss tan δ of 0.08 is used.

FIG. 24 illustrates a simulation result that displays various superposed phases of a traveling wave generated when the dielectric 104 having the dielectric loss tan δ of 0.08 is used in a wireless communication system 100 as illustrated in FIG. 1. In the example illustrated in FIG. 24, the magnitude |Ex| (ScalarX_Vector_E) of an electric field is displayed with the Y coordinate (x=0 and z=0) when a horizontally polarized wave (a linearly polarized wave whose electric field component goes along the X-axis direction) is transmitted from the antenna 103 illustrated in FIG. 1. The frequency of the radio wave is 915 MHz. The first conductive wall 11M1 is positioned at the origin (y=0), or at one end of the wave guide tube, and the second conductive wall 11M2 is positioned at the other end (y=880 mm) of the wave guide tube. The dielectric 104 is positioned at Ls=197 mm, and two dashed lines are drawn that correspond to the surface A1 and the back A2, respectively. As illustrated in FIG. 24, only the traveling wave exists and a standing wave is not generated in the first space V1 from the antenna 103 to the dielectric 104. In the second space from the dielectric 104 to the second conductive wall 11M2, a standing wave is generated, but the nodes are generated only at two positions, the dielectric 104 and the second conductive wall 11M2. Therefore, an RFID tag can receive the radio wave having sufficiently high strength anywhere in the first space V1 and the second space V2.

Figure 25:
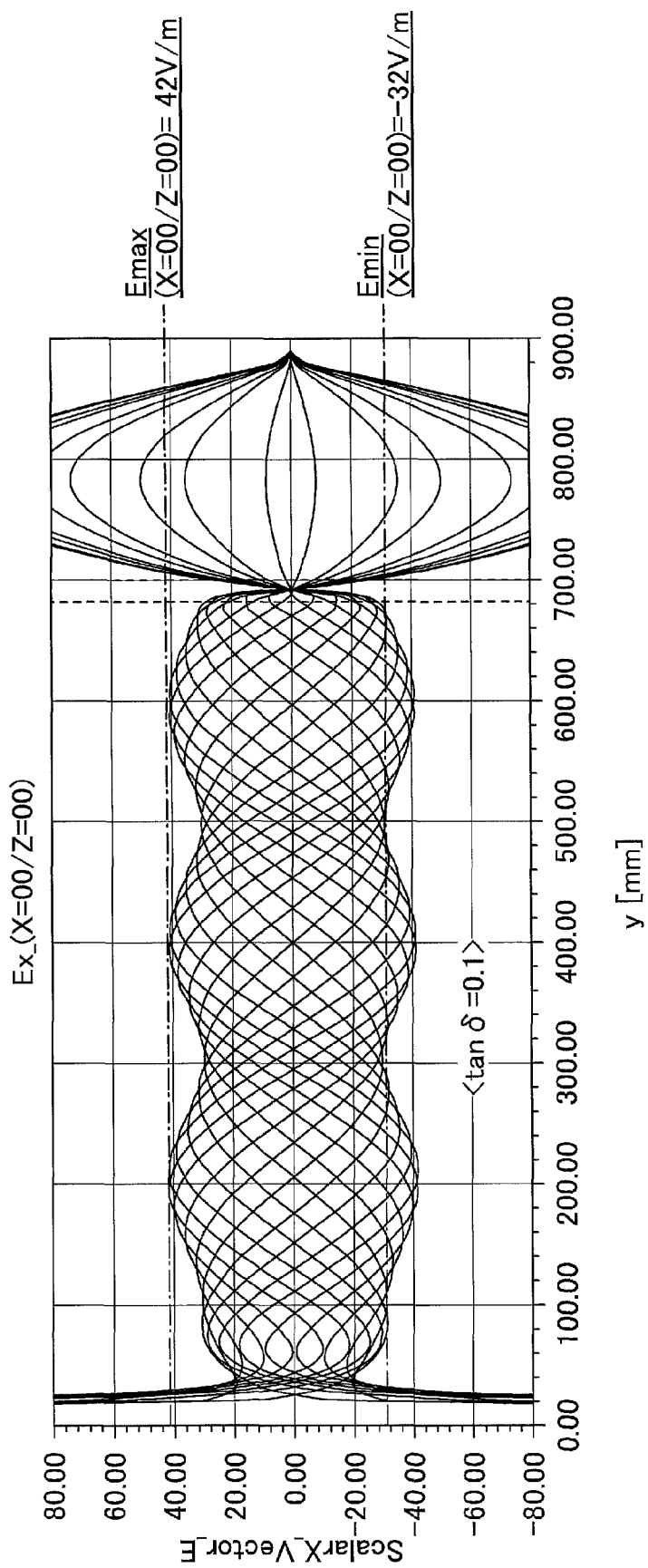
FIG. 25 is a diagram illustrating a simulation result that displays various superposed phases of a traveling wave generated when a dielectric 104 having the dielectric loss tan δ of 0.1 is used.

FIG. 25 illustrates a simulation result similar to that of FIG. 24, but differs in that the dielectric loss tan δ of the dielectric 104 is 0.1. As illustrated in FIG. 25, only the traveling wave exists and a standing wave is not generated in the first space V1 from the antenna 103 to the dielectric 104. In the second space from the dielectric 104 to the second conductive wall 11M2, a standing wave is generated, but the nodes are generated only at two positions, the dielectric 104 and the second conductive wall 11M2. However, due to the dielectric loss tan δ greater than that in FIG. 24, there are positions where the strength of the radio wave is cyclically weak in the first space V1. When the strength of the radio wave differs depending on positions, it may be difficult for an RFID tag to respond in a position where the strength of the radio wave is weak. However, if the strength degradation is around the level in FIG. 25, an RFID tag can receive the radio wave with a sufficiently high strength at any positions in the first space V1 and the second space V2.

Figure 26:
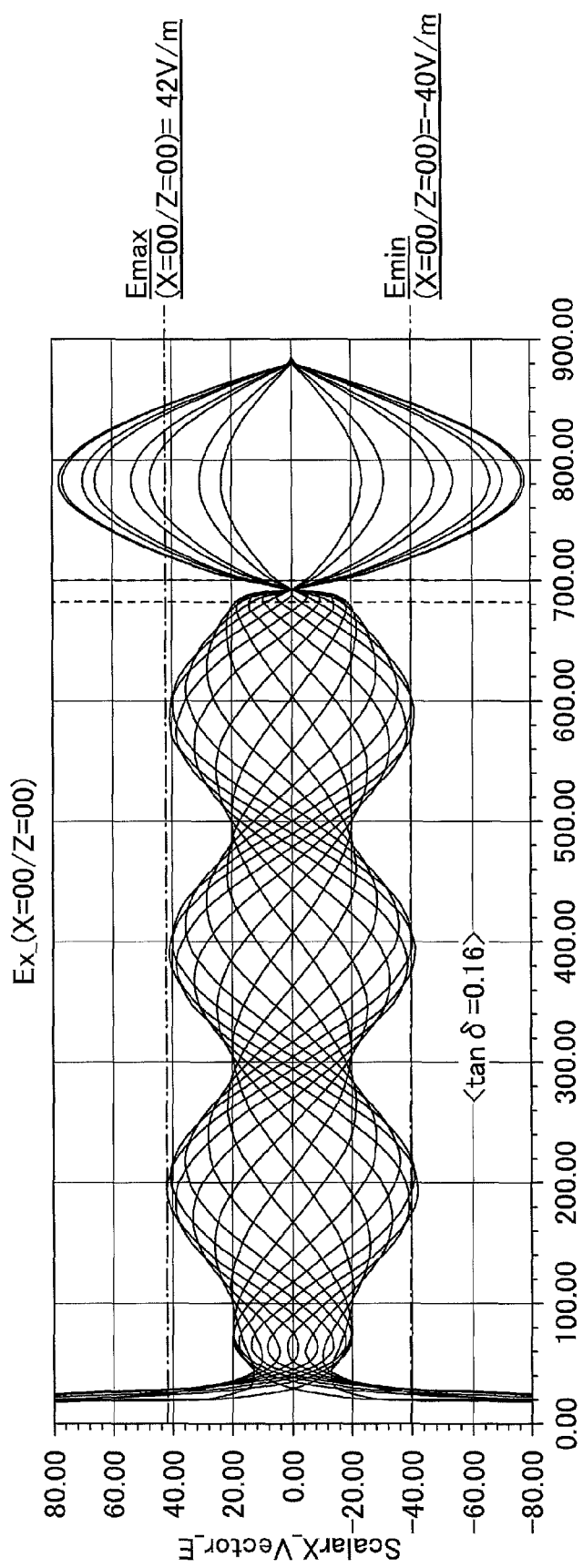
FIG. 26 is a diagram illustrating a simulation result that displays various superposed phases of a traveling wave generated when a dielectric 104 having the dielectric loss tan δ of 0.16 is used.

FIG. 26 illustrates a simulation result similar to that of FIG. 24, but differs in that the dielectric loss tan δ of the dielectric 104 is 0.16. As illustrated in FIG. 26, due to the dielectric loss tan δ greater than those in FIGS. 24-25, there are positions where the strength of the radio wave is cyclically weak in the first space V1. When the strength of the radio wave differs depending on positions, it may be difficult for an RFID tag to respond in a position where the strength of the radio wave is weak. When the strength degrades as much as illustrated, an RFID tag having higher reception sensitivity may still appropriately respond to the RFID tag reader, but an RFID tag having a lower reception sensitivity may not be able to respond to the RFID tag reader anymore. To summarize the results illustrated in FIGS. 24-26, it is preferable that the dielectric loss tan δ is within a range between 0 and 0.2, and more preferably, within a range between 0 and 0.1.

<B. Modified Example about Position of Dielectric>

In the examples described with reference to FIGS. 9-18, FIG. 1, the dielectric 104 is disposed in a wireless communication system 100 as illustrated in FIG. 1, having the distance Ls from the second conductive wall 11M2, which is $Ls\approx\lambda_g/2$. The reflected wave reflected by the dielectric 104 and the reflected wave reflected by the second conductive wall 11M2 have the phase difference of $2(\phi_1+\phi_2)\approx3\pi$, which indicates the opposite phases. There are other phase differences that indicate opposite phases, which may be, $3\pi$, $5\pi$, $7\pi$ . . . $=2(n-1)$ $\pi$. Namely, the first embodiment is not restricted to $Ls\approx\lambda_g/2$, but it is possible to have $Ls\approx\lambda_g(1/2)$, $\lambda_g(2/2)$, $\lambda_g(3/2)$ . . . $=\lambda_g\times n/2$.

Figure 27:
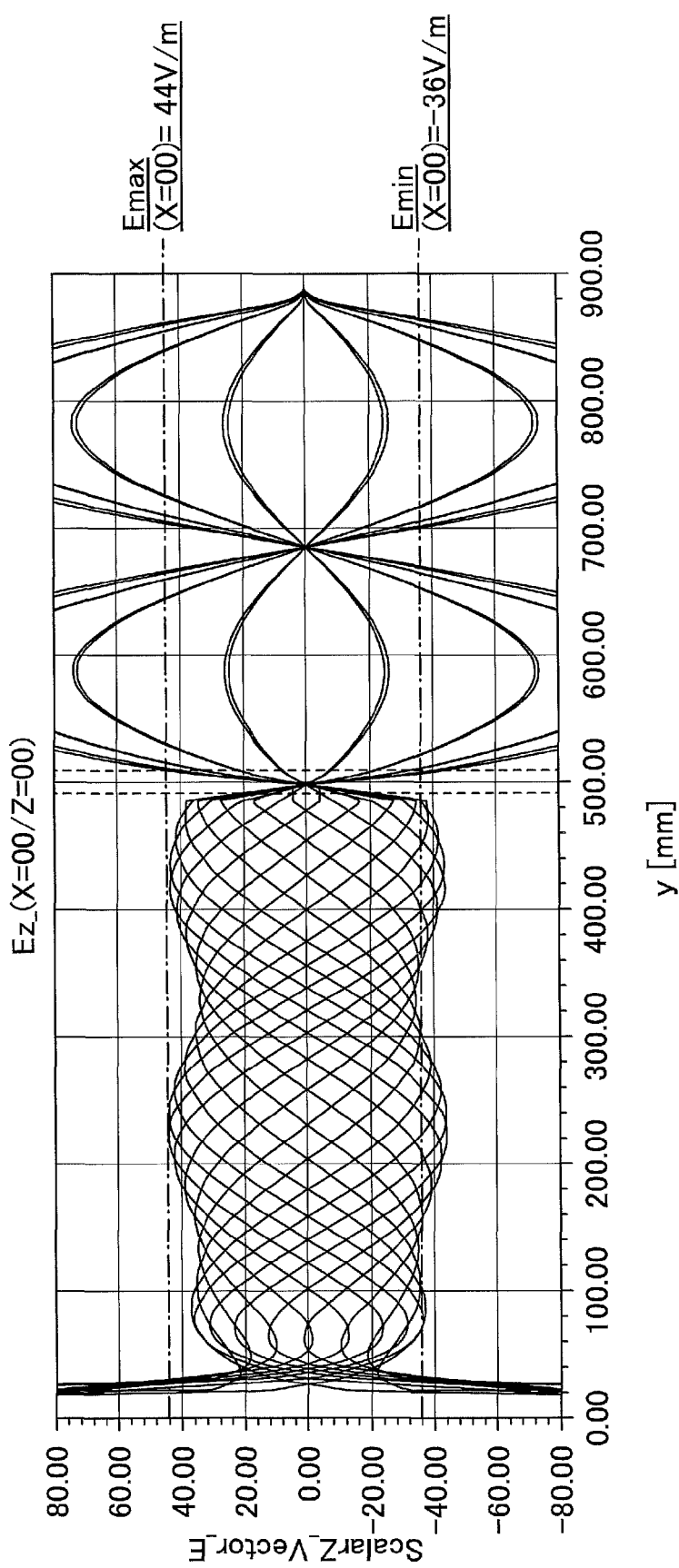
FIG. 27 is a diagram illustrating a simulation result that displays various superposed phases of a traveling wave in a wireless communication system having a dielectric 104 disposed at a position of Ls=$\lambda_g \times 2/2$.

FIG. 27 illustrates a simulation result that displays various superposed phases of a traveling wave in a wireless communication system having the dielectric 104 disposed at a position of $Ls=\lambda_g\times2/2$ (case of n=2). The example in FIG. 27 illustrates the magnitude |Ez| (ScalarZ_Vector_E) of an electric field on the Y-axis direction (x=0 and z=0) when a vertically polarized wave (a linearly polarized wave whose electric field component goes along the Z-axis direction) is transmitted from the antenna 103 illustrated in FIG. 1. The radio wave frequency is 915 MHz. The first conductive wall 11M1 is positioned at the origin (y=0), or at one end of the wave guide tube, and the second conductive wall 11M2 is positioned at the other end (y=880 mm) of the wave guide tube. The dielectric 104 is positioned at y=880−(196×2) =488 mm (Ls=196×2=392 mm), and two dashed lines are drawn that correspond to the surface A1 and the back A2, respectively.

As illustrated in FIG. 27, only the traveling wave exists and a standing wave is not generated in the first space V1 from the antenna 103 to the dielectric 104. In the second space from the dielectric 104 to the second conductive wall 11M2, a standing wave is generated, and the nodes are generated not only at two positions, the dielectric 104 and the second conductive wall 11M2, but also at the center of these. The interval between the nodes is $\lambda_g/2=196$ mm. An RFID tag can receive the radio wave having sufficiently high strength anywhere in the first space V1. However, in the second space V2, an RFID tag disposed around the center cannot receive the radio wave having sufficiently high strength because one of the nodes of the standing wave is generated in the neighborhood. Therefore, when positioning an RFID tag in the second space, positions around the nodes of the standing wave should be avoided where the electric field is extremely reduced, and hence, the use range is restricted and convenience is reduced. Therefore, the first space V1 is preferable as the region to dispose an RFID tag.

Figure 28:
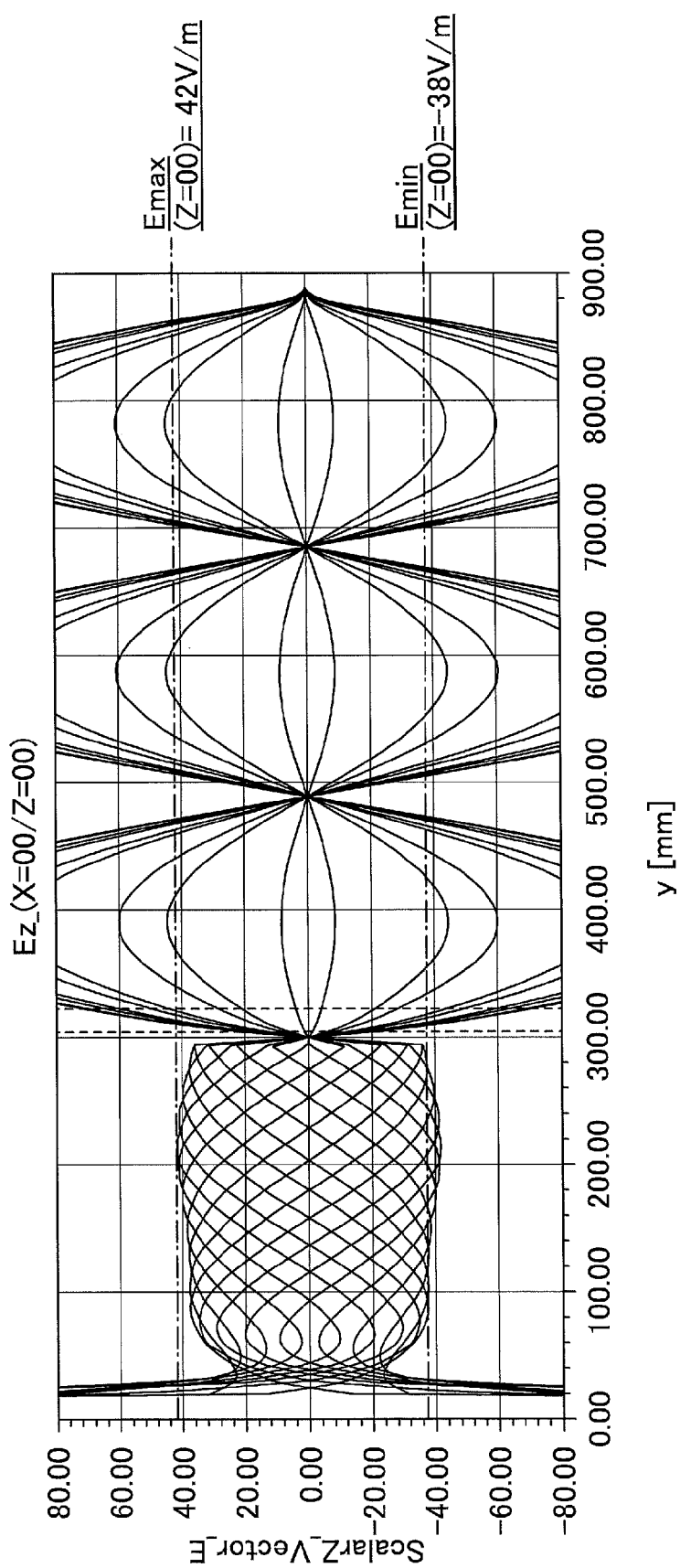
FIG. 28 is a diagram illustrating a simulation result that displays various superposed phases of a traveling wave in a wireless communication system having a dielectric 104 disposed at a position of Ls=$\lambda_g \times 3/2$.

FIG. 28 illustrates a simulation result that displays various superposed phases of a traveling wave in a wireless communication system having the dielectric 104 disposed at a position of $Ls=\lambda_g\times3/2$ (case of n=3). The example in FIG. 27 also illustrates the magnitude |Ez| (ScalarZ_Vector_E) of an electric field on the Y-axis direction (x=0 and z=0) when a vertically polarized wave (a linearly polarized wave whose electric field component goes along the Z-axis direction) is transmitted from the antenna 103 illustrated in FIG. 1. The radio wave frequency is 915 MHz. The first conductive wall 11M1 is positioned at the origin (y=0), or at one end of the wave guide tube, and the second conductive wall 11M2 is positioned at the other end (y=880 mm) of the wave guide tube. The dielectric 104 is positioned at y=880−(196×3)

=292 mm (Ls=196×3=588 mm), and two dashed lines are drawn that correspond to the surface A1 and the back A2, respectively.

As illustrated in FIG. 28, only the traveling wave exists and a standing wave is not generated in the first space V1 from the antenna 103 to the dielectric 104. In the second space from the dielectric 104 to the second conductive wall 11M2, a standing wave is generated, and the nodes are generated not only at two positions, the dielectric 104 and the second conductive wall 11M2, but two positions between them. The interval between the nodes is $\lambda_g/2=196$ mm. An RFID tag can receive the radio wave having sufficiently high strength anywhere in the first space V1. However, in the second space V2, an RFID tag disposed around the center cannot receive the radio wave having sufficiently high strength because two nodes of the standing wave are generated around the center. Therefore, when positioning an RFID tag in the second space, positions around the nodes of the standing wave should be avoided where the electric field is extremely reduced, and hence, the use range is restricted and convenience is reduced. Therefore, the first space V1 is preferable as the region to dispose an RFID tag.

As can be seen from the example (Ls=$\lambda_g/2$) illustrated in FIG. 10, the example (Ls=$\lambda_g\times2/2$) illustrated in FIG. 27, and the example (Ls=$\lambda_g\times3/2$) illustrated in FIG. 28, when the distance Ls of the dielectric 104 is greater than or equal to two times of ($\lambda_g/2$) (n≥2), nodes of a standing wave is generated in the second space V2, and hence, it is desirable to dispose and use an RFID tag in the first space V1.

Thus, communication performance in the closed space 10A enclosed by the conductive walls 11 can be improved by placing the dielectric 104 at a position having the length of Ls=$\lambda_g\times n/2$ from the second conductive wall 11M2.

Note that the position of the dielectric 104 may be slightly shifted from Ls(=$\lambda_g\times n/2$). For example, the distance Ls may be within a range of plus or minus 5% of $\lambda_g\times n/2$.

<C. Modified Example about Reduced Second Space>

In the first embodiment, the dielectric 104 is disposed in the middle of the tube-shaped wave guide tube to form the first space V1 and the second space V2. The first space V1 can always be usable as the region to place an RFID tag. The second space may or may not be used as the region to place an RFID tag. If the second space V2 is not used as the region to place an RFID tag, and the second space V2 has a great volume, the space is wasted. Therefore, if the second space V2 is not used as the region to place an RFID tag, it is preferable that the volume of the second space V2 is small.

Figure 29:
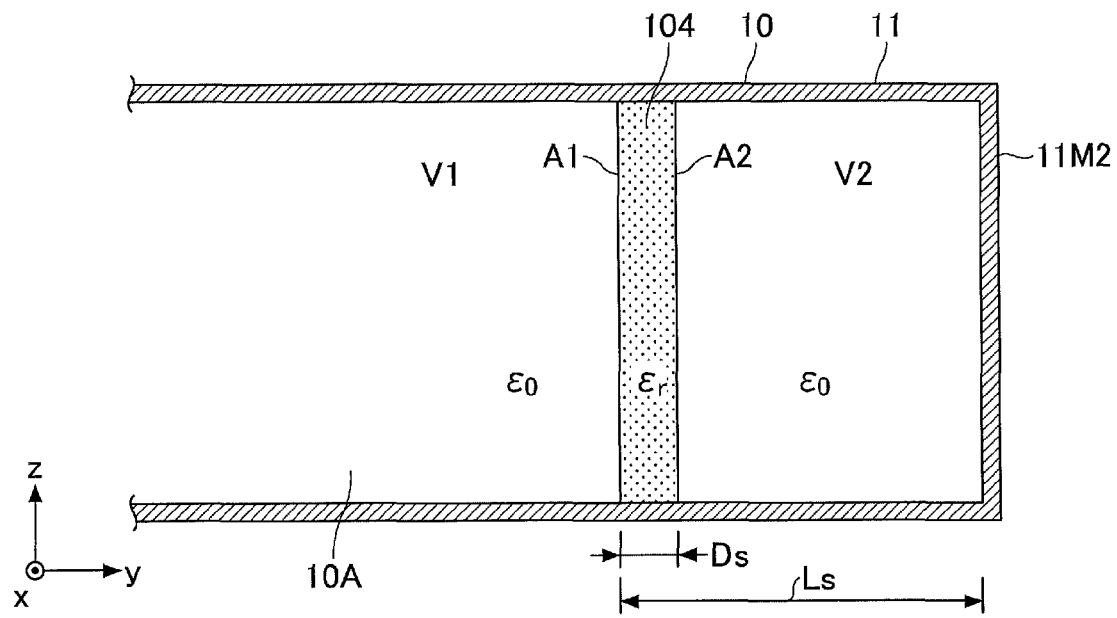
FIG. 29 is a diagram illustrating a modified example where a second space V2 is narrowed.

FIG. 29 illustrates a modified example to make a second space V2 narrow. FIG. 29 illustrates the neighborhood of the dielectric 104 similarly to FIG. 2. As air fills the first space V1, the permittivity of the first space is virtually equal to the permittivity $\in_0$ of vacuum (relative permittivity is 1). The dielectric 104 is formed of a material having the relative permittivity $\in_r$. As air also fills the second space V2, the permittivity of the second space is virtually equal to the permittivity $\in_0$ of vacuum (relative permittivity is 1).

Figure 30:
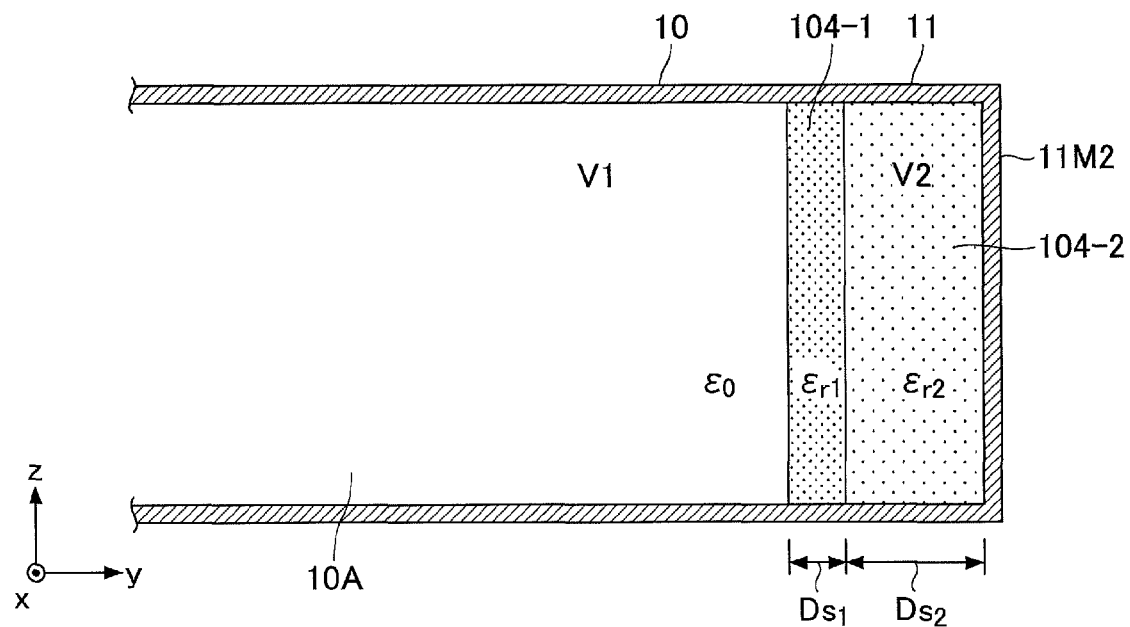
FIG. 30 is a diagram illustrating a state where a dielectric material fills a second space V2 to make the volume of the second space V2 smaller.

FIG. 30 illustrates a state where the volume of the second space V2 is reduced by filling a dielectric material into the second space V2. As illustrated in FIG. 30, a second dielectric 104-2 is provided having the thickness Ds2 and the relative permittivity $\in_{r2}$ between a first dielectric 104-1 having the thickness Ds1 and the relative permittivity $\in_{r1}$, and the second conductive wall 11M2. The first dielectric 104-1 is the same as the dielectric 104 in FIG. 29, and $\in_{r1}=\in_r$. The first dielectric 104-1 is an example of a plate-shaped member made of a dielectric. The relative permittivity $\in_{r2}$ of the second dielectric 104-2 may be the same as or different from the relative permittivity $\in_{r1}$ of the first dielectric 104-1. In the example illustrated in FIG. 30, the second dielectric 104-2 having relative permittivity $\in_{r2}$ fills the second space V2. The second dielectric 104-2 is an example of a dielectric.

The thickness Ds2 needs to be about $\lambda_g/(2\sqrt{\in_{r2}})$ to confine a standing wave having the guide wave length of $\lambda_g$ generated in the second space V2 into the dielectric 104-2 (it also depends on a mutual relationship with the dielectric 104-1). By having the second space V2 filled with the dielectric material, the volume of the second space V2 can be made smaller.

Figure 31:
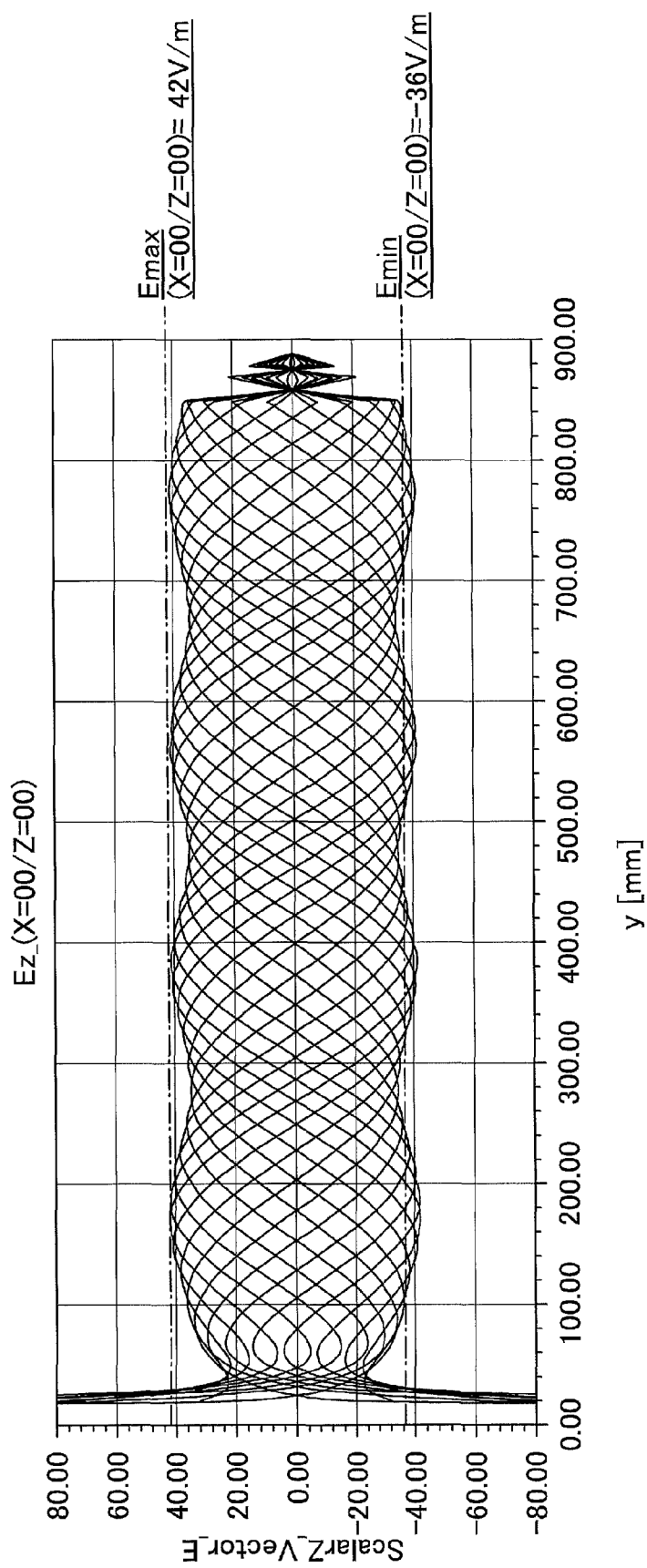
FIG. 31 is a diagram illustrating a simulation result that displays various superposed phases of a traveling wave in a wireless communication system in which one type of dielectric material fills a second space V2.

FIG. 31 illustrates a simulation result that displays various superposed phases of a traveling wave in a wireless communication system in which a dielectric material fills the second space V2. The example in FIG. 31 also illustrates the magnitude |Ez| (ScalarZ_Vector_E) of an electric field on the Y-axis direction (x=0 and z=0) when a vertically polarized wave (a linearly polarized wave whose electric field component goes along the Z-axis direction) is transmitted from the antenna 103 illustrated in FIG. 1. The radio wave frequency is 915 MHz. The first conductive wall 11M1 is positioned at the origin (y=0), or at one end of the wave guide tube, and the second conductive wall 11M2 is positioned at the other end (y=880 mm) of the wave guide tube.

The first dielectric 104-1 occupies the position from y=849.2 mm to 865.2 mm with the thickness of 16 mm. The first dielectric 104-1 is a dielectric corresponding to water as described with reference to FIG. 1, and has the relative permittivity $\in_{r1}$ is 81 and the dielectric loss tan δ if 0.08. The second dielectric 104-2 occupies the position from y=865.2 mm to 880 mm with the thickness of 14.8 mm. The second dielectric 104-2 is formed of, for example, strontium titanate (SrTiO$_3$), and has the relative permittivity $\in_{r2}$ of 300 and the dielectric loss tan δ of 0.005.

As illustrated in FIG. 31, only the traveling wave exists and a standing wave is not generated in the first space V1 from the antenna 103 to the first dielectric 104-1. Therefore, an RFID tag can receive the radio wave having sufficiently high strength anywhere in the first space V1. An RFID tag cannot be placed in the second space V2 from the first dielectric 104-1 to the second conductive wall 11M2 because it is filled with the second dielectric 104-2. A standing wave is generated in the second space V2. It should be noted that the second space V2 occupies an extremely thin space of 14.8 mm.

<D. Communication Method>

Figure 32:
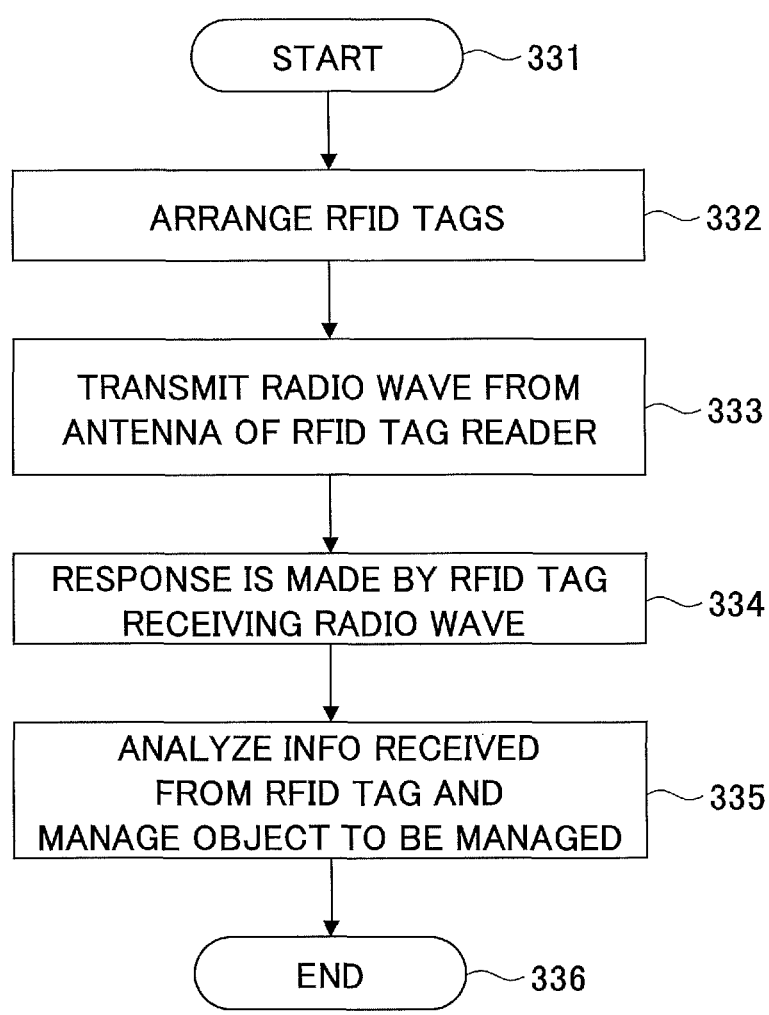
FIG. 32 is a flowchart of a communication method of a wireless communication system.

FIG. 32 is a flowchart of a communication method of a wireless communication system. The flow starts at Step 331. At Step 331, a wireless communication system as illustrated in FIG. 1 is provided. A wireless communication module 101 included in the wireless communication system forms a tube-shaped wave guide tube to form the closed space 10A, the antenna 103 of an RFID tag reader 102 is disposed at one end of conductive walls 11, and the dielectric 104 is disposed between the antenna 103 and the other end of the conductive walls 11 to form the first space V1 and the second space V2.

At Step 332, one or more RFID tags 50 are disposed in the position closed space 10A formed by the wireless communication module 101. For example, envelopes 60-1 to 60-44 of documents as illustrated in FIG. 13, which are objects to be managed, are arranged in the closed space 10A.

At Step 333, a radio wave is transmitted from the antenna 103. This radio wave includes, for example, a preamble signal and a command signal. The radio wave transmitted from the antenna 103 is reflected by the dielectric 104 and second conductive wall 11M2. The first reflected wave $E_{r1}$ that is reflected by the dielectric 104 and propagates in the first space V1, and the second reflected wave $E_{r2}$ reflected by the second conductive wall 11M2 and propagates in the first space V1 are canceled by each other in the first space V1. Consequently, the RFID tags disposed only in the first space V1 or both in the first and second spaces V1 and V2 receive only the traveling wave transmitted from the antenna 103.

At Step 334, having received the radio wave (traveling wave) transmitted from the antenna 103 with an appropriate strength, the RFID tag obtains information stored in its own memory, generates a transmission signal including the information, and transmits the transmission signal by a radio wave.

At Step 335, the RFID tag reader 102 analyzes the information received from one or more RFID tags, and manages objects to be managed that have the RFID tags attached. Then, the flow goes forward to Step 336 to end.

It is assumed that the RFID tag reader 102 reads the RFID tags 50 in the first embodiment described above. However, the wireless communication system 100 in the first embodiment may be used in an environment where a radio wave such as Zigbee (trademark) or Wi-Fi is radiated from the antenna 103 to recognize wireless portable units.

Second Embodiment

E1. Configuration

Figure 33:
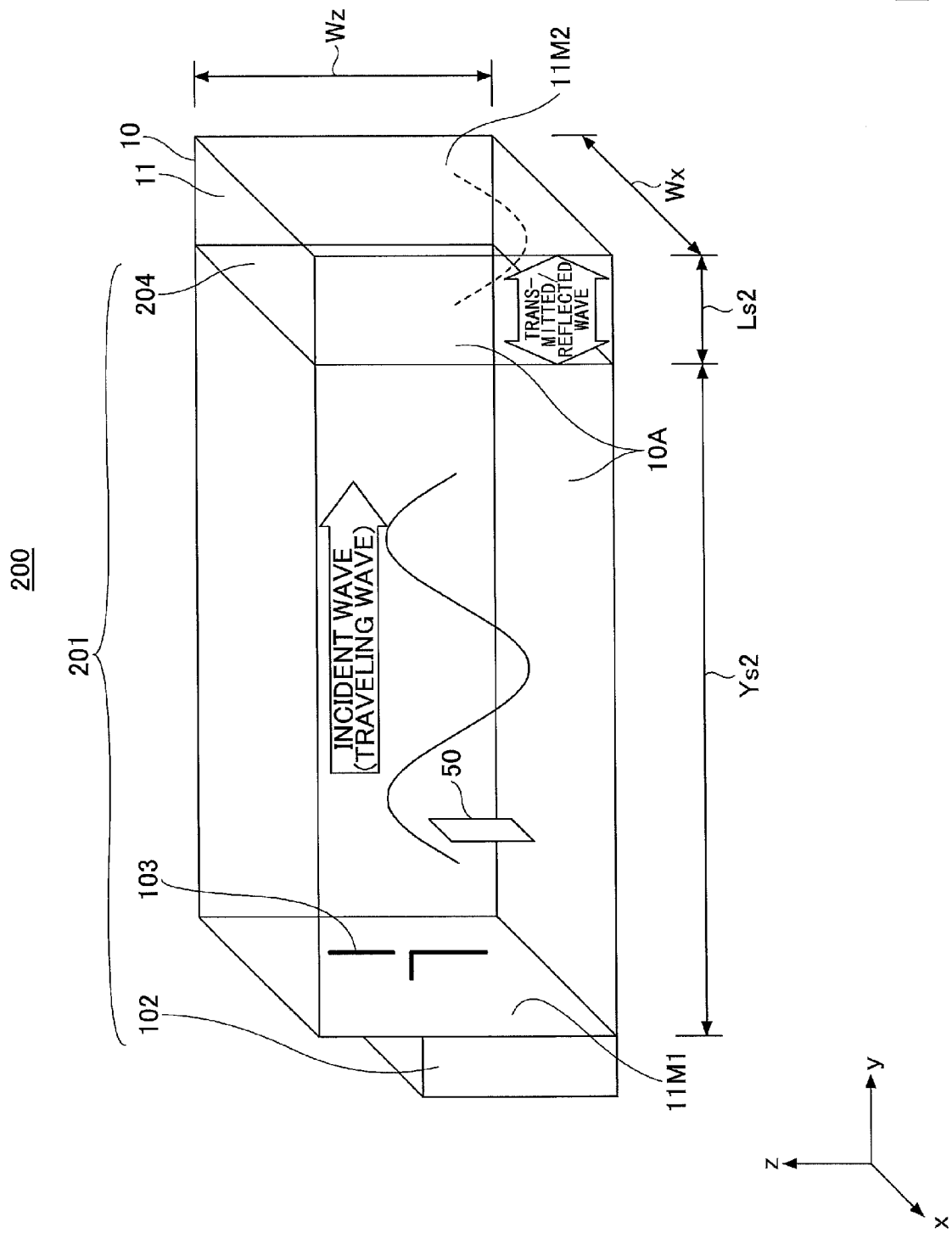
FIG. 33 is a diagram illustrating a wireless communication system used in a second embodiment of the present invention.
Figure 34:
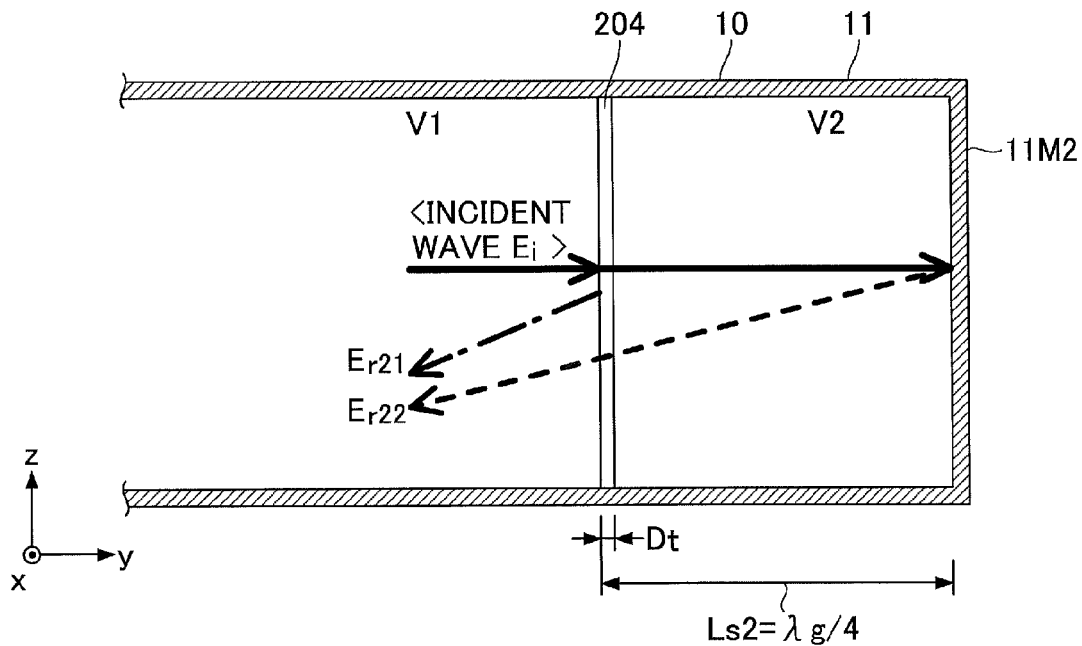
FIG. 34 is an enlarged view of a part of FIG. 33.

FIG. 33 illustrates a wireless communication system 200 used in a second embodiment. FIG. 34 is an enlarged view of a part of FIG. 33. The wireless communication system 200 includes a wireless communication module 201 and an RFID tag 50 disposed in a closed space 10A specified by the wireless communication module 101. The wireless communication system 200 is attached to a conductive structure 10. Note that the wireless communication system 200 may include the conductive structure 10. For the sake of explanation, it is assumed that FIG. 33 illustrates the wireless communication system 200 as a whole.

The wireless communication module 201 includes an RFID tag reader 102, an antenna 103, and a conductive thin film 204. The dielectric 104 in the wireless communication module 101 in the first embodiment is replaced by the conductive thin film 204 in the wireless communication module 201. The conductive thin film 204 is disposed at a position different from the position where the dielectric 104 is disposed.

The other elements are the same as in the first embodiment, assigned the same numerical codes, and their description is omitted.

The conductive thin film 204 partitions the closed space 10A into a first space V1 and a second space V2. A thin film that partially transmits a part of an electromagnetic wave and partially reflects another part is used for the conductive thin film 204. The conductive thin film 204 is an example of a reflective part. As the conductive thin film 204, for example, a graphite thin film, a zinc oxide thin film having aluminum added, a zinc oxide thin film having boron added, a zinc oxide thin film having gallium added, may be used. The thickness of the conductive thin film 204 is, for example, 0.1 mm or less.

The conductive thin film 204 has the lengths of about Wx in the X-axis direction and about Wz in the Z-axis direction, and has the thickness Ds in the Y-axis direction. In practice, considering the thickness of the conductive walls 11 that forms the wave guide tube, the cross section of the conductive thin film 204 on a plane vertical to the Y-axis direction (the X-Z plane) has a slightly shorter length than Wx in the X-axis direction, and slightly shorter lengths than Wz in the Z-axis direction.

The conductive thin film 204 is disposed between the antenna 103 disposed on the first conductive wall 11M1 at the one end of the wave guide tube, and the second conductive wall 11M2 at the other end of the wave guide tube. For the sake of explanation, it is assumed that the space between the antenna 103 and the conductive thin film 204 is the "first space V1", the space between the dielectric 104 and the second conductive wall 11M2 is the "second space V2". In the example illustrated in FIG. 33, the conductive thin film 204 may often have the thickness of 0.1 mm. In that case, the first space V1 has the length Ys2 in the Y-axis direction, and the second space V2 has the length Ls2 (Ls2−Dt) in the Y-axis direction. Although omitted in FIGS. 33-34, the conductive thin film 204 is actually formed on a surface of a substrate or the like to have mechanical strength. As the substrate, a material having a low permittivity is preferable.

Note that, for the sake of explanation in the following, the position of the conductive thin film 204 is represented by the distance between the second conductive wall 11M2 and a surface of the conductive thin film 204 on the side facing the first space V1, relative to the position of the second conductive wall 11M2 as the reference, and denoted as the position Ls2 of the conductive thin film 204.

A part of the radio wave transmitted from the antenna 103 is reflected by the conductive thin film 204 to become a first reflected wave $E_{r1}$ that propagates in the first space V1. Another part of the radio wave transmitted from the antenna 103 transmits through the second space V2, and then, is reflected by the second conductive wall 11M2 to become a second reflected wave $E_{r2}$ that propagates in the first space V1.

The phase difference between the first reflected wave $E_{r1}$ and the second reflected wave $E_{r2}$ depends on the position Ls2 of the conductive thin film 204. The position Ls2 of the conductive thin film 204 is determined so that the composite wave of the first reflected wave $E_{r1}$ and the second reflected wave $E_{r2}$ has zero or a sufficiently small amplitude in the first space V1.

Specifically, the conductive thin film 204 is disposed at the position that has the distance Ls2 from the second conductive wall 11M2 in the Y-axis direction as will be specifically described in the section "E2. Cancellation of reflected waves". The distance Ls2 is represented by $Ls2 = \lambda_g \times (2n-1)/4$ where n is a natural number ($n \geq 1$). It is typically $n=1$, namely, $Ls2 = \lambda_g/4$, and in this case, the reflected waves are canceled as follows.

The radio wave, which has transmitted through the conductive thin film 204 and just travels into the second space V2, has its phase changed by 90° while having reached the conductive walls 11M2, and has its phase changed by 180° when having been reflected by the conductive walls 11M2, and thus at this moment, has its phase changed by 270°. The phase is further changed by 90° until the radio wave reaches the conductive thin film 204 from the conductive walls 11M2. Therefore, the second reflected wave $E_{r22}$ has its phase changed by 360° while starting from the first space V1, transmitting through the conductive thin film 204, being reflected by the conductive walls 11M2, and reaching the conductive thin film 204.

On the other hand, the first reflected wave $E_{r21}$ has its phase changed by 180° when reflected by the conductive thin film 204. Namely, the first reflected wave $E_{r21}$ has its phase reversed when reflected by the conductive thin film 204. Therefore, the first reflected wave $E_{r21}$ and the second reflected wave $E_{r22}$ have the phases opposite to each other, and the electric fields are canceled on the surface of the conductive thin film 204 facing the first space V1. Namely, the first reflected wave $E_{r21}$ and the second reflected wave $E_{r22}$ are canceled by each other on the surface of the conductive thin film 204 facing the first space V1.

Note that when n is two or greater, it will be described in "E5. Modified example about position of conductive thin film 204".

E2. Cancellation of Reflected Waves

In the second embodiment, the conductive thin film 204 is disposed at a predetermined position on the Y-axis direction as illustrated in FIG. 33. An incident wave $E_i$ is transmitted from the antenna 103. As illustrated in FIG. 34, a part of the incident wave $E_i$ is reflected by the conductive thin film 204 to become the first reflected wave $E_{r21}$ that propagates in the first space V1. Also, another part of the incident wave $E_i$ transmits through the conductive thin film 204 to enter the second space V2, reflected by the second conductive wall 11M2, and then, transmits through the conductive thin film 204 again to enter the first space V1. The reflected wave reflected by the second conductive wall 11M2, and then, transmits through the conductive thin film 204 again to enter the first space V1 is referred to as the "second reflected wave $E_{r22}$".

Therefore, the composite reflected wave $E_{r20}$ on the surface of the conductive thin film 204 facing the first space V1 is represented by the sum of the first reflected wave $E_{r21}$ and the second reflected wave $E_{r22}$.

$$E_{r20}=E_{r21}+E_{r22}$$

To be strict, a component $E_i \cos \theta$ needs to be considered, which changes depending on the angle $\theta$ that determines the guide wave length $\lambda_g$, although it should be noted that $\theta$ is omitted for the sake of simplicity of the description.

Figure 35:
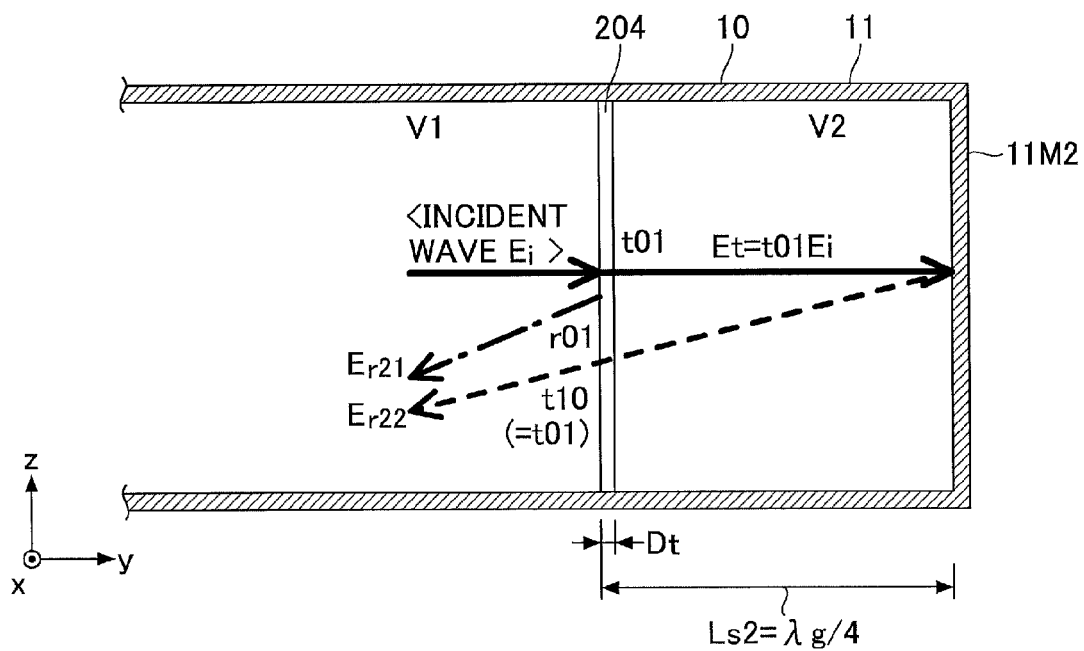
FIG. 35 is an enlarged view of a part of FIG. 33.

Here, conditions will be considered to minimize the standing wave by calculating the composite reflected wave $E_{r20}$ using a simple model illustrated in FIG. 35. FIG. 35 is an enlarged view of a part of FIG. 33.

It is assumed that the incident wave $E_i$ transmitted from the antenna 103 is partly reflected by the conductive thin film 204, and partly transmits through the conductive thin film 204. Also, $r_{01}$ represents the reflectance of the conductive thin film 204, and $t_{01}$ (=1+$r_{01}$) represents the transmittance when the radio wave goes in the direction from the first space V1 to the second space V2. The reflection at the conductive walls 11M2 is assumed to be complete reflection where the reflectance rb=−1. Also, the reflectance $r_{01}$ is assumed to be a negative value satisfying $-1<r_{01}<0$. Also, the transmittance $t_{10}$, which is the transmittance when the radio wave goes in the direction from the second space V2 to the first space V1, is equal to the transmittance $t_{01}$.

The reflected wave $E_{r21}$ reflected by the conductive thin film 204 is represented by Formula (1).

$$E_{r21}=r_{01}E_i \quad (1)$$

The radio wave that transmits through the conductive thin film 204 is reflected by the second conductive wall 11M2, and then, transmits through the conductive thin film 204 again to enter the first space V1 to become the second reflected wave $E_{r22}$. Using Ls2=$\lambda_g$/4, the phase difference $\phi_1$ is represented by $\phi_1=2\pi(Ls2/\lambda_g)=\pi/2$. Therefore, the phase difference between the second reflected wave $E_{r22}$, which has made a round trip movement for the distance Ls2, and the first reflected wave $E_{r21}$ is $2\phi_1=\pi$.

Considering the reflection on the second conductive wall 11M2, the phase change B is B=rb*cos(2$\phi_1$)=1. Therefore, the second reflected wave $E_{r22}$ is represented by Formula (2).

$$E_{r22}=Bt_{01}t_{10}E_i=t_{01}{}^2E_i \quad (2)$$

Using Formulas (1) and (2), the composite reflected wave $E_{r20}$ is represented by Formula (3).

$$E_{r20}=(r_{01}+t_{01}{}^2)E_i \quad (3)$$

The reflectance $r_{01}$ of the conductive thin film 204 is adjusted by using Formula (3) to calculate the composite reflected wave $E_{r20}$ and the reflection coefficient S.

FIG. 36 illustrates a calculation result of the composite reflected wave $E_{r20}$ and the reflection coefficient S for the reflectance $r_{01}$.

As illustrated in FIG. 36, the reflection coefficient S is minimum when the reflectance $r_{01}=-0.38$. Note that calculation conditions include the dimensions Wx and Wy of the cross section of the wave guide tube of the conductive structure 10 are Wx=Wy=300 mm, the frequency of the incident wave $E_i$ is f=915 MHz, $E_i$=40V/m, and Ls2=98 mm. The length Ls2 is nearly equal to $\lambda_g$/4.

Although the reflectance condition of the conductive thin film 204 is narrowed down by the simple model calculation, precise electric field distribution and effect estimation are difficult to obtain. A detailed analysis will be described in "E4. Embodiments".

E3. Conductive Thin Film

From the above result, the conductive thin film 204 is required to have the reflectance $r_{01}$ of about 0.38. Reflectance of materials have been considered using the electromagnetic analysis tool HFSS. FIG. 37A is a comparison table of conductivity (specific resistance)σ, density, resistivity ρ, and skin depth δs. Note that the skin depth δs is the value at 915 MHz.

Based on the comparison table in FIG. 37A, a trial calculation is made in FIG. 37B for the reflectance of a thin film made of graphite and a thin film made of zinc oxide having aluminum added ZnO_Al(2 wt %). Here, the conductivity (specific resistance) of zinc oxide ZnO_Al(2 wt %) is taken from a value described in Japanese Journal of Applied Physics, vol. 24, No. 10, 1985, L781-L784. Zinc oxide is a material developed for a transparent electrode.

Note that zinc oxide having boron added ZnO-B, or having gallium added ZnO—Ga may be used other than zinc oxide (ZnO_Al(2 wt %)).

The skin depth δs (=√(2/(ωσμ)) of graphite and ZnO_Al is 62.9 μm/2293 um. Therefore, one may assume that a film thinner than this can transmit through and reflect an electromagnetic wave. Thereupon, a trial calculation is performed to obtain the film thickness dependency of the reflectance of conductive thin films having different conductivities, by the electromagnetic analysis tool HFSS. FIGS. 38A-38C illustrate the trial calculation result of the film thickness Dt. FIG. 38A illustrates the conductivities and the reflectances, and FIGS. 38B-38C illustrate characteristics of the reflectances with respect to the film thicknesses of graphite and ZnO_Al, respectively. It is understood that when the film thickness Dt is thinner than the skin depth δs, the reflectance r can be adjusted to 0.3 to 0.45 for graphite and ZnO_Al.

E4. Embodiments

Figure 39:
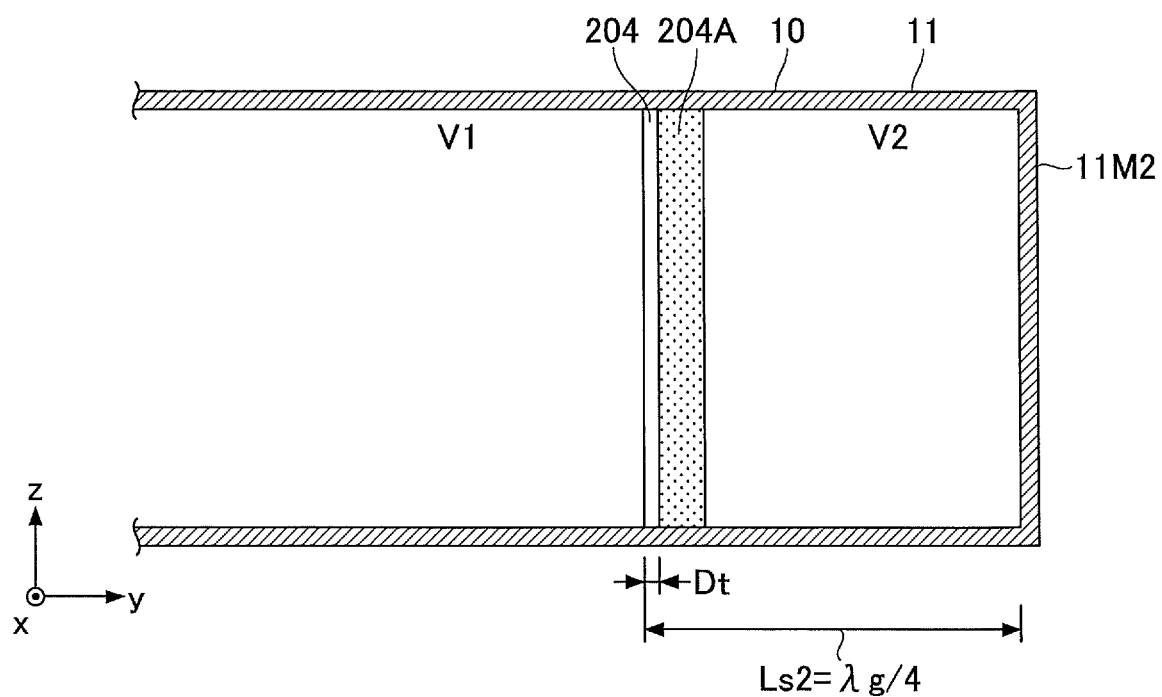
FIG. 39 is a diagram illustrating a part of a wireless communication module that includes a reflecting plate that includes a substrate 204A made of Teflon (trademark) having the conductive thin film 204 of ZnO_Al(2 w %) formed on it.

FIG. 39 illustrates a part of a wireless communication module that includes a reflecting plate made from a substrate 204A of Teflon having a the conductive thin film 204 of ZnO_Al(2 w %) formed on a surface of the substrate 204A. This wireless communication module has a configuration in which the wireless communication module 201 illustrated in FIG. 33 has the substrate 204A added.

Here, an embodiment will be described where the conductive thin film 204 is formed of ZnO_Al whose usefulness has been confirmed as described above. The reflecting plate is produced from the substrate 204A of Teflon having the conductive thin film 204 of ZnO_Al (2 w %) formed on a surface of the substrate 204A, to build a system.

Note that the film thickness of the thin film of ZnO_Al (2 w %) is 40 μm, the relative permittivity $\in_r$ of the substrate made of Teflon 204A is 2.08, and tan δ is 0.001. The relative permittivity of the substrate made of Teflon 204A is negligibly smaller than that of water that is used as the dielectric 104 in the first embodiment, and hence, the substrate made of Teflon 204A has a negligible influence. A resin substrate of phenol, epoxy, polyimide, or the like may be used instead of the substrate made of Teflon 204A.

Figure 40A:
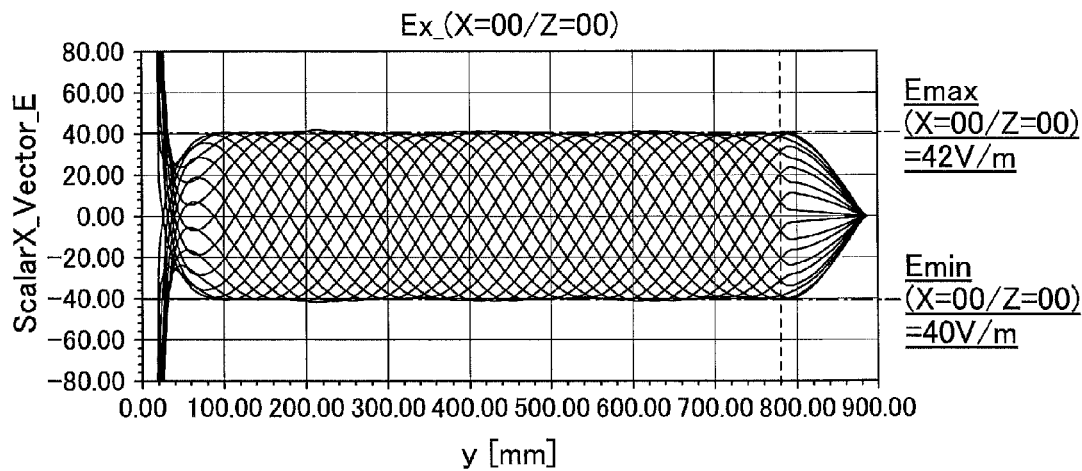
FIGS. 40A-40C are diagrams illustrating electric field distribution.
Figure 40B:
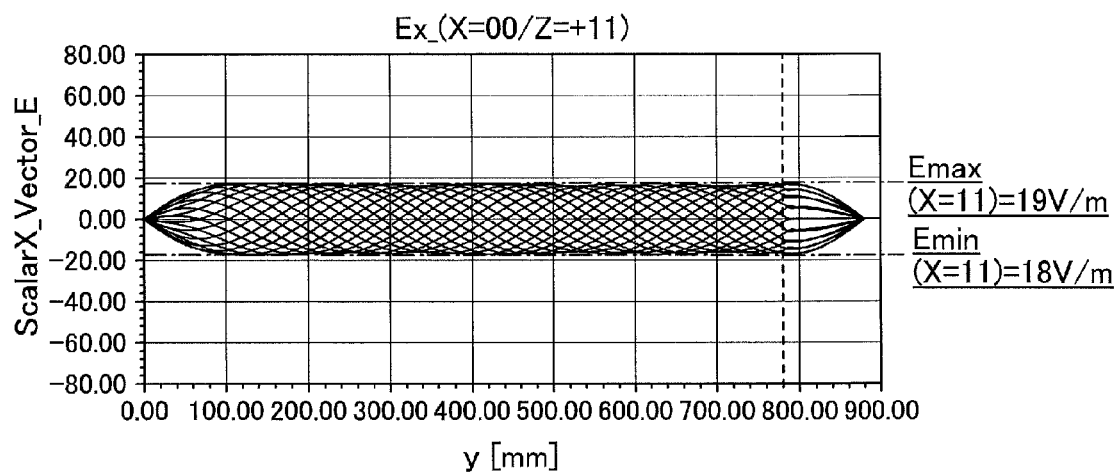
Figure 40C:
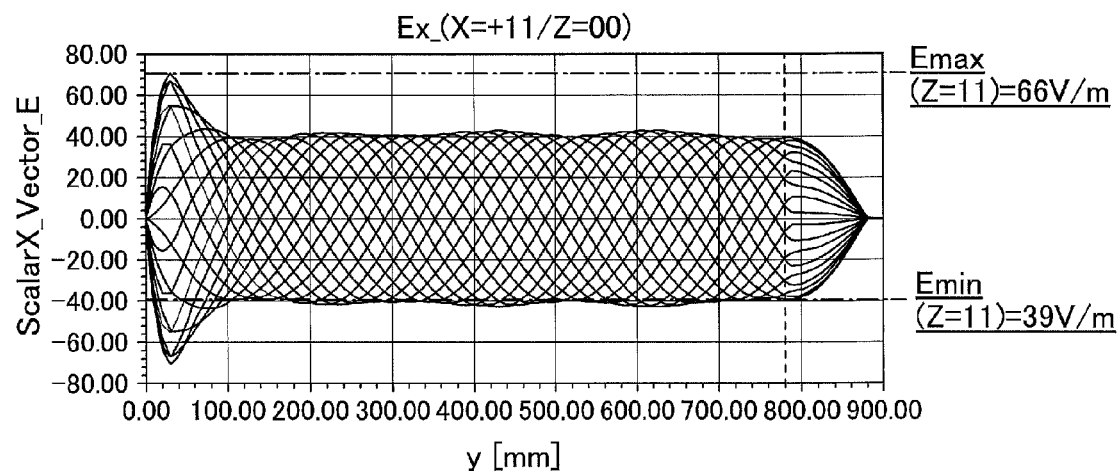

Using the electromagnetic analysis tool HFSS, electric field distribution is examined in detail. FIGS. 40A-40C illustrate the electric field distribution. Note that the incident wave $E_i$ is a horizontally polarized wave of 915 MHz, the film thickness of ZnO_Al(2 w %) is 40 μm, the reflectance is 0.34, the conductivity is 53 S/m, the relative permittivity $\in_r$=1, and Ls2=96 mm. The substrate made of Teflon 204A has the thickness of 4 mm.

FIG. 40A illustrates the electric field distribution on the center axis (X=0/Z=0) of the closed space 10A. As illustrated in FIG. 40A, the electric field distribution is obtained that is close to that of the traveling wave in the first space V1 or the second space V2. The maximum value Emax of the electric field is 42V/m, and the minimum value Emin of the electric field is 40V/m. Also, the reflection coefficient is a favorable value of S=0.02 in this case.

FIGS. 40B and 40C illustrate the electric field distribution at shifted positions from the center, at (X=0/Z=11 cm) and (X=11 cm/Z=0), respectively.

Figure 41A:
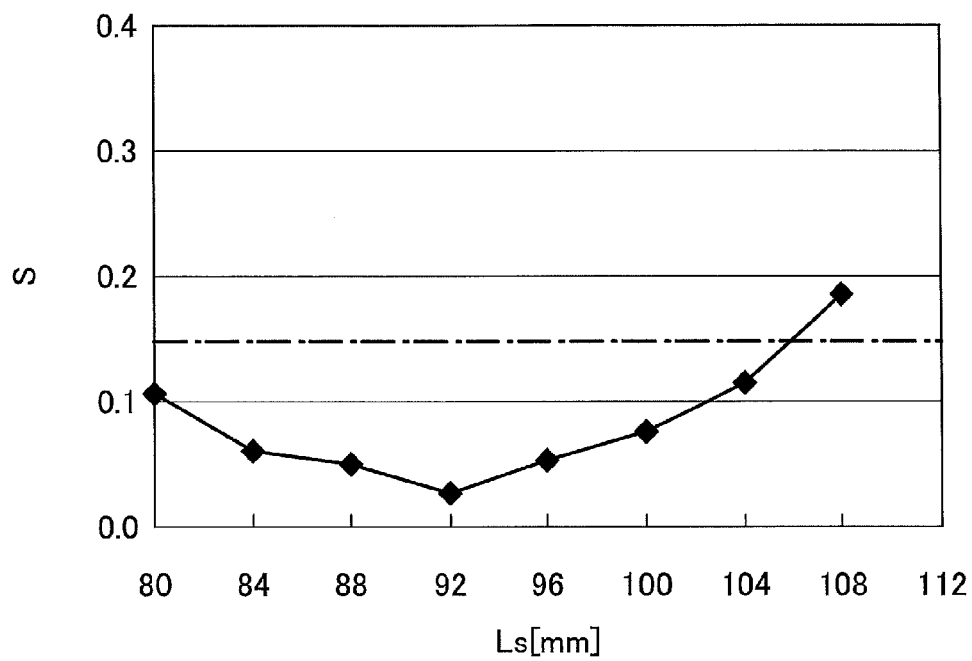
FIGS. 41A-41B are diagrams illustrating characteristics of a reflection coefficient S when a position Ls2 and a thickness Dt are adjusted.
Figure 41B:
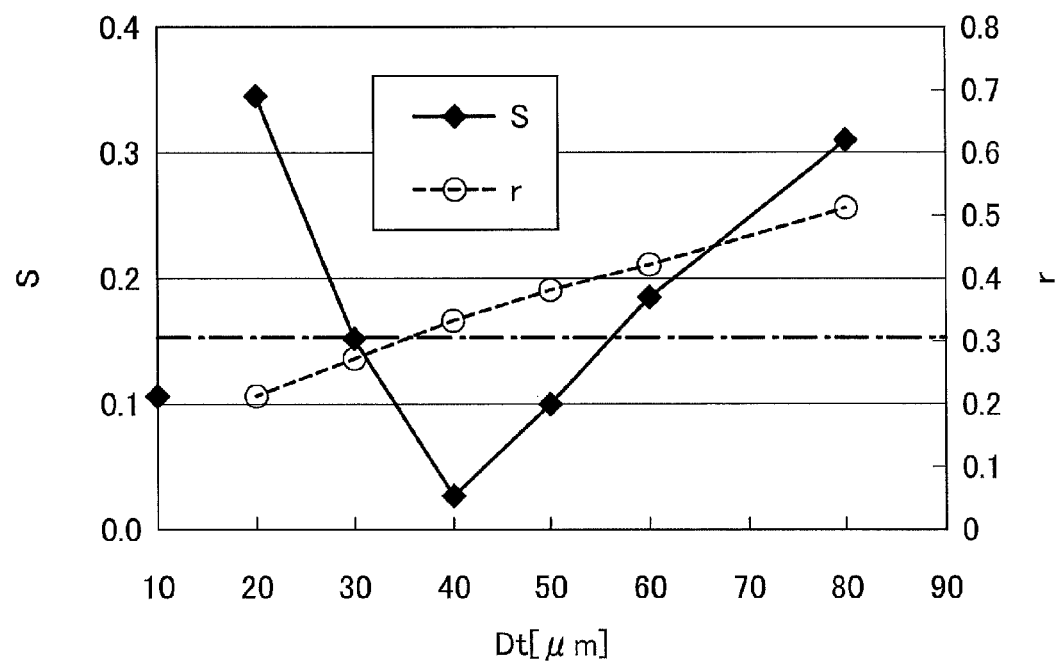

Also, a trial calculation is performed for the reflection coefficient S when the position Ls2 of the conductive thin film 204 and thickness Dt are adjusted. FIGS. 41A-41B illustrate characteristics of the reflection coefficient S when the position Ls2 and the thickness Dt are adjusted.

The position Ls2 of the conductive thin film 204 is changed from 80 mm to 108 mm. When the frequency of the incident wave $E_i$ is 915 MHz, a quarter of the length of the guide wave length $\lambda_g$ is about 98 mm.

Also, the thickness Dt of the conductive thin film 204 is changed in a range of 20 μm to 80 μm. This range is a range in which the reflectance r takes a value between 0.27 and 0.40.

Note that the other conditions are the same as those used for obtaining the electric field distribution illustrated in FIG. 40. Also, it is determined that a favorable traveling wave mode is kept when the reflection coefficient S is 0.15 or less.

As illustrated in FIG. 41A, when the position Ls2 of the conductive thin film 204 is within a range of 80 mm to 106 mm, the reflectance takes a favorable value. The length of 80 mm to 106 mm is close to $\lambda_g/4$.

As illustrated in FIG. 41B, when the thickness Dt of the conductive thin film 204 is within a range of 30 μm to 55 μm, the reflectance takes a favorable value. In this range, the reflectance r is within a range of 0.27 to 0.41.

E5. Modified Example about Position of Conductive Thin Film 204

In the embodiment described in FIG. 39, the conductive thin film 204 is positioned at the distance Ls2 (=$\lambda_g/4$) from the second conductive wall 11M2. Here, a modified example will be described where the conductive thin film 204 is positioned at Ls2=$\lambda_g \times (2n-1)/4$.

When n is two or greater, the distance Ls2=$\lambda_g \times (2n-1)/4$ is greater than the distance Ls2 illustrated in FIG. 39 by $\lambda_g \times (n-1)$ in terms of the propagation channel of the second reflected wave $E_{r22}$ in the second space V2. Therefore, the first reflected wave $E_{r21}$ and the second reflected wave $E_{r22}$ are canceled by each other, which is the same relationship between the two waves as in FIG. 39.

Figure 42A:
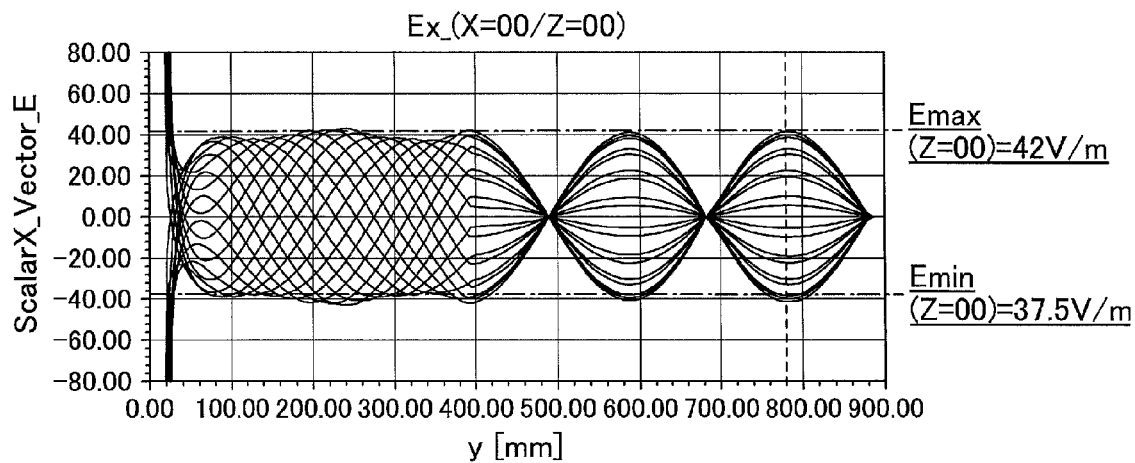
FIGS. 42A-42C are diagrams illustrating a simulation result of electric field distribution according to a modified example of the second embodiment.
Figure 42B:
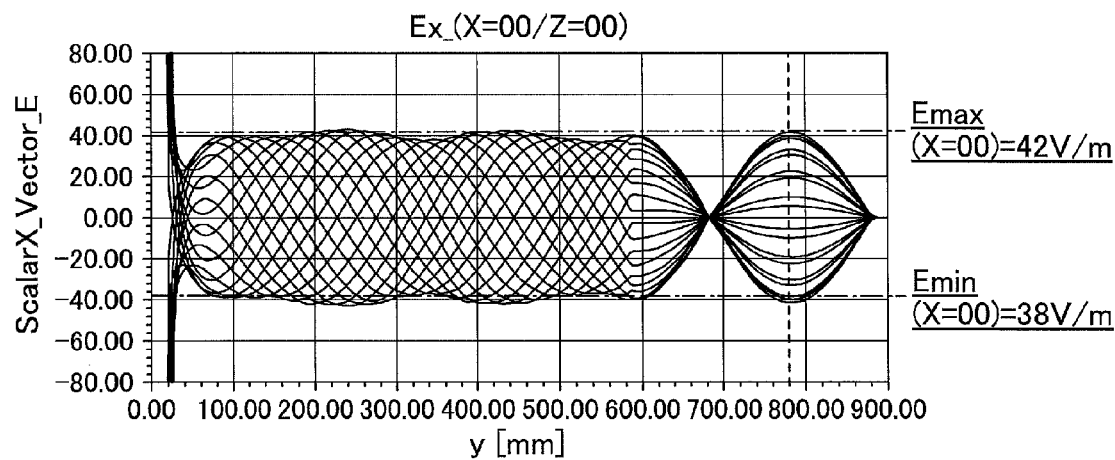
Figure 42C:
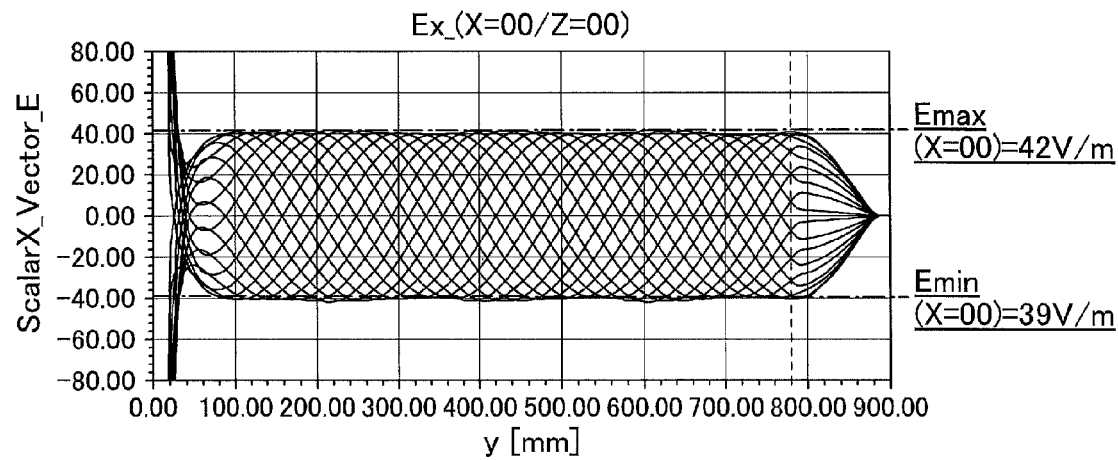

FIGS. 42A-42C illustrate a simulation result of electric field distribution according to the modified example of the second embodiment. The conductive thin film 204 is position by n=3 in FIG. 42A, n=2 in FIG. 42B, and n=1 in FIG. 42C. FIG. 42C is provided for comparison with FIG. 40A, but the minimum value Emin of the electric field is different.

FIGS. 42A-42C illustrate electric field distribution when various phases of a radio wave are superposed in a wireless communication system in which the conductive thin film 204 is disposed at positions of Ls2=$\lambda_g \times (2n-1)/4$ (where n is a natural number).

FIG. 42A to FIG. 42C illustrates the magnitude |Ez| (ScalarZ_Vector_E) of an electric field on the Y-axis direction (x=0 and z=0) when a horizontally polarized wave (a linearly polarized wave whose electric field component goes along the X-axis direction) is transmitted from the antenna 103 (see FIG. 33). The radio wave frequency is 915 MHz.

The first conductive wall 11M1 is positioned at the origin (y=0), or at one end of the wave guide tube, and the second conductive wall 11M2 is positioned at the other end (y=880 mm) of the wave guide tube. The conductive thin film 204 is positioned at Ls2=294 mm (=$3\lambda_g/4$) in FIG. 42A and is positioned at Ls2=490 mm (=$5\lambda_g/4$) in FIG. 42B, respectively, and the positions are drawn with dashed lines.

As illustrated in FIGS. 42A-42B, only the traveling wave exists and a standing wave is not generated in the first space V1. In FIG. 42A, a standing wave is generated between the conductive thin film 204 and the second conductive wall 11M2 in the second space V2 with three nodes. The interval between the nodes is $\lambda_g/2$=196 mm. In FIG. 42B, a standing wave is generated in the second space V2, with two nodes. The interval between the nodes is $\lambda_g/2$=196 mm.

Note that, as illustrated in FIG. 42C, when the conductive thin film 204 is disposed at the position of the dashed line, only the traveling wave exists in the first space V1 and a standing wave is not generated, and the number of nodes of the standing wave in the second space V2 is one.

When the electric field distribution is obtained as illustrated in FIGS. 42A-42C, an RFID tag can receive the radio wave having sufficiently high strength anywhere in the first space V1. However, the nodes of the standing wave are generated in the second space V2, around which an RFID tag cannot receive the radio wave having sufficiently high strength.

Therefore, when positioning an RFID tag in the second space, positions around the nodes of the standing wave should be avoided where the electric field is extremely reduced, and hence, the use range is restricted and convenience is reduced. Therefore, the first space V1 is preferable as the region to dispose an RFID tag.

However, communication can be made at a position other than those where nodes are generated. Therefore, an RFID tag 50 may be disposed in the second space V2 for communication if cares are taken about the position.

Thus, communication performance in the closed space 10A enclosed by the conductive walls 11 can be improved by placing the conductive thin film 204 at a position having the length of $Ls2=\lambda_g \times (2n-1)/4$ from the second conductive wall 11M2.

Note that the position of the conductive thin film 204 may be slightly shifted from $Ls2=\lambda_g \times (2n-1)/4$. For example, the distance Ls may be within a range of plus or minus 5% of $\lambda_g \times n/2$.

Next, using FIGS. 43A-43C and 44A-44B, a simulation result will be described for electric field distribution and a reflection coefficient when a conductive thin film 204 made of graphite is formed on the substrate made of Teflon 204A (see FIG. 39).

The conductive thin film 204 made of graphite has the thickness Dt of 0.16 μm, the conductivity of 70000 S/m, and the relative permittivity of $\in_r = 1$. Also, the conductive thin film 204 is positioned at Ls2=96 mm. The substrate made of Teflon 204A has the thickness of 4 mm, and the relative permittivity of 2.08, and tan δ of 0.001.

Figure 43A:
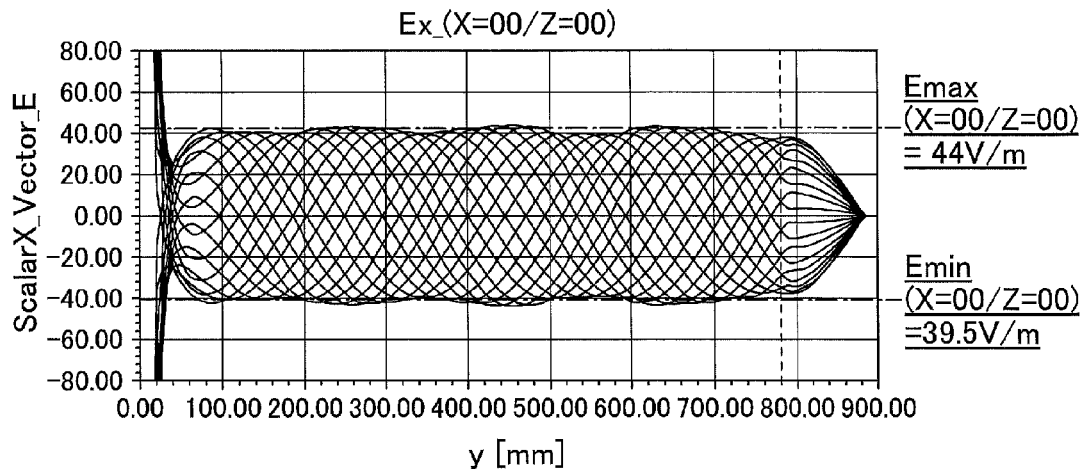
FIGS. 43A-43C are diagrams illustrating electric field distribution.

FIG. 43A illustrates electric field distribution on the center axis (X=0/Z=0) of the closed space 10A. As illustrated in FIG. 43A, the obtained electric field distribution is close to that of the traveling wave in the first space V1 or the second space V2. The maximum value Emax of the electric field is 44 V/m, and the minimum value Emin of the electric field is 39.5 V/m. Also, the reflection coefficient is a favorable value of S=0.05 in this case.

Figure 43B:
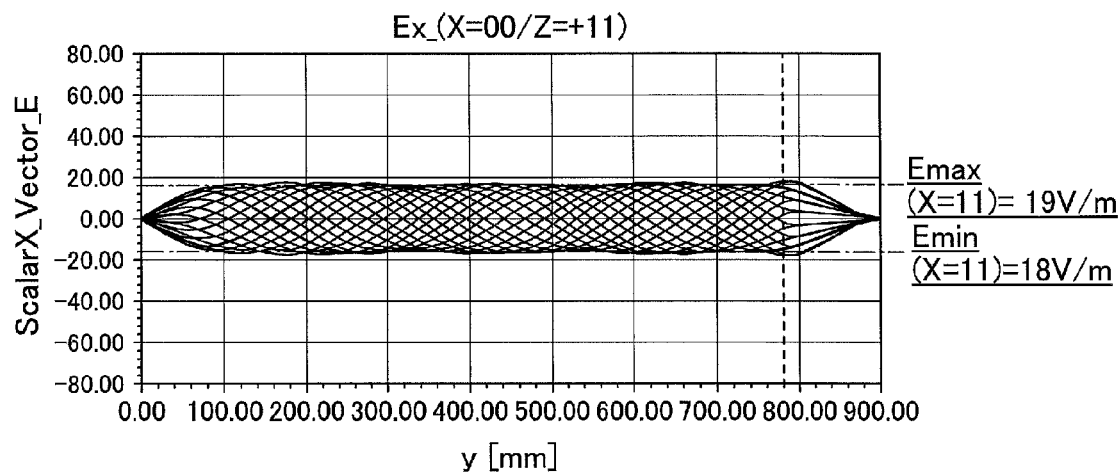
Figure 43C:
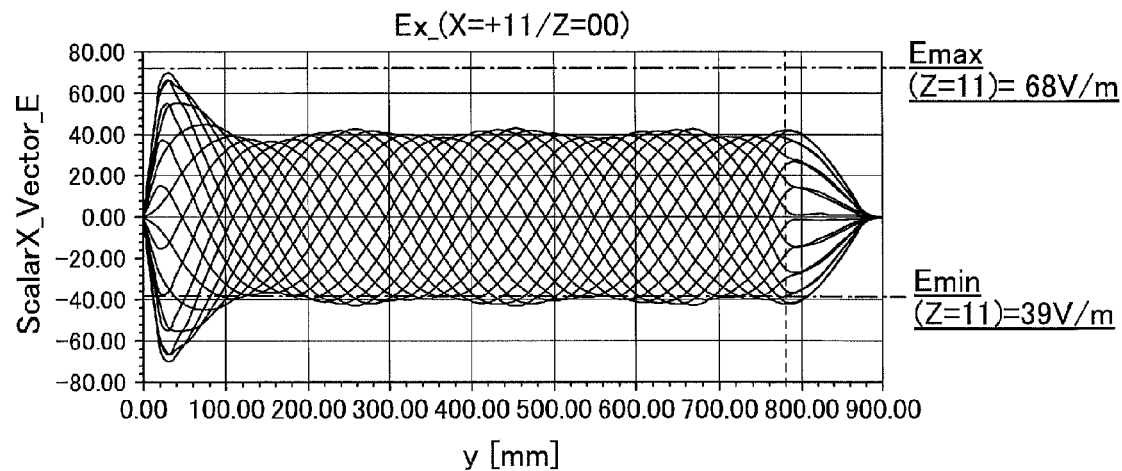

FIGS. 43B and 43C illustrate the electric field distribution shifted positions from the center at (X=0/Z=11 cm) and (X=11 cm/Z=0), respectively, which are similar to distribution when using a simplex dielectric.

Also, a trial calculation is performed for the reflection coefficient S where the position Ls2 of the conductive thin film 204 and thickness Dt are adjusted.

Figure 44A:
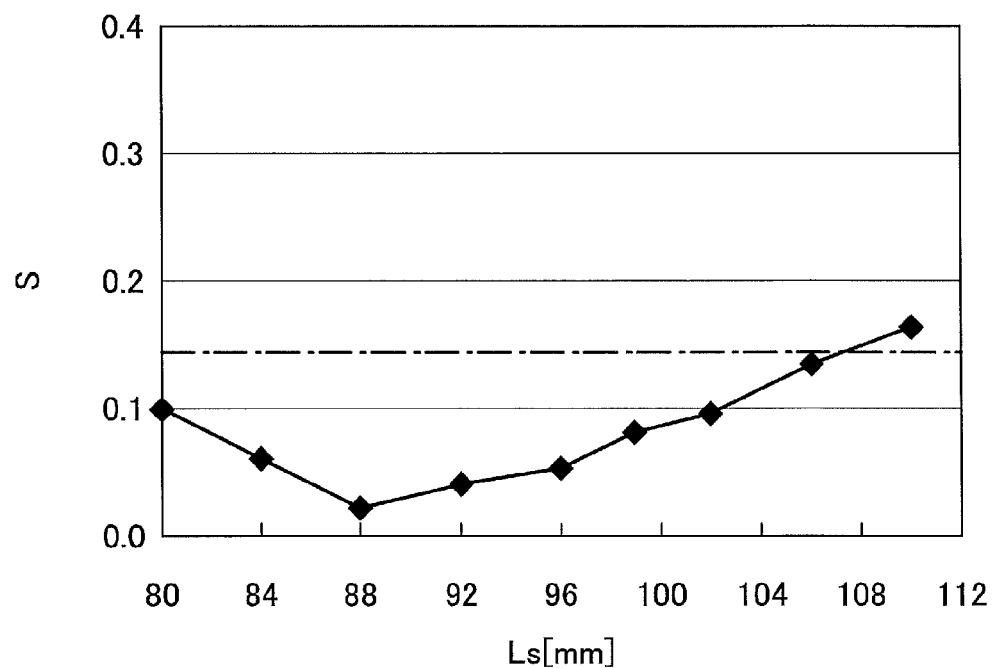
FIGS. 44A-44B are diagrams illustrating a characteristic of reflection coefficient S when a position Ls2 and a thickness Dt are adjusted.
Figure 44B:
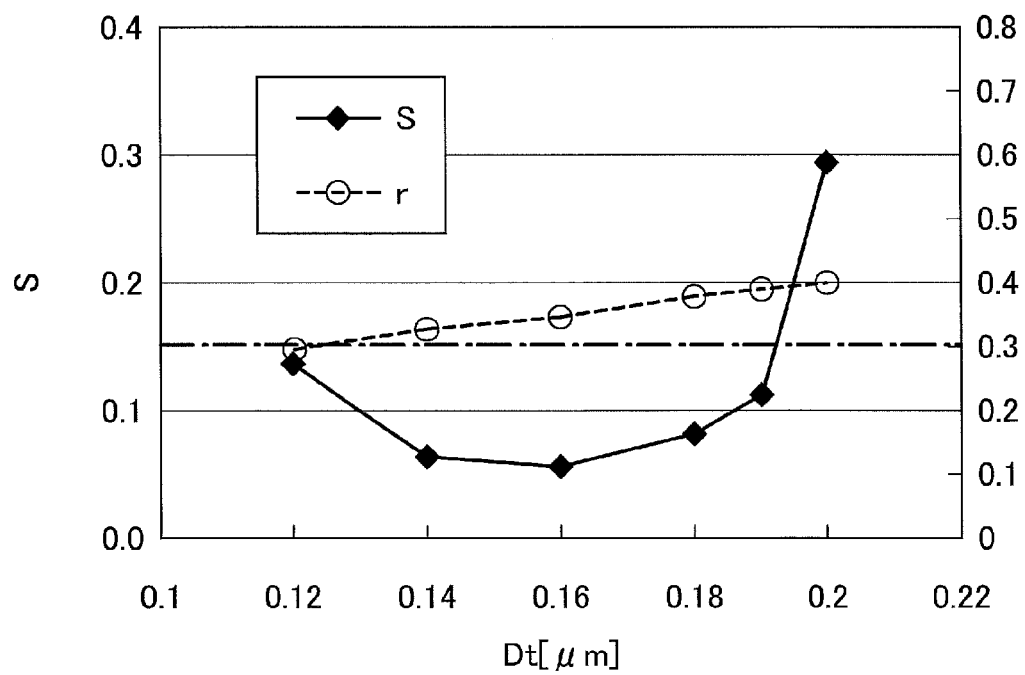

FIGS. 44A-44B illustrate characteristics of the reflection coefficient S where the position Ls2 and the thickness Dt are adjusted.

The position Ls2 of the conductive thin film 204 is changed from 80 mm to 108 mm. When the frequency of the incident wave $E_i$ is 915 MHz, a quarter of the length of the guide wave length $\lambda_g$ is about 98 mm.

Also, the thickness Dt of the conductive thin film 204 is changed in a range of 0.12 μm to 0.20 μm. In this range, the reflectance r takes a value between 0.29 to 0.40.

Note that the other conditions are the same as those used for obtaining the electric field distribution illustrated in FIGS. 43A-43C. Also, it is determined that a favorable traveling wave mode is kept when the reflection coefficient S is 0.15 or less.

As illustrated in FIG. 44A, when the position Ls2 of the conductive thin film 204 is within a range of 80 mm to 106 mm, the reflectance takes a favorable value. A length between 80 mm and 106 mm is close to $\lambda_g/4$.

As illustrated in FIG. 44B, when the thickness Dt of the conductive thin film 204 is within a range of 0.12 μm to 0.19 μm, the reflectance takes a favorable value. In this range, the reflectance r takes a value between 0.29 to 0.39.

Thus, communication performance in the closed space 10A enclosed by the conductive walls 11 can also be improved by placing the conductive thin film 204 made of graphite at a position having the length of $Ls2=\lambda_g \times (2n-1)/4$ from the second conductive wall 11M2.

The wireless communication modules, the wireless communication systems, and the communication methods described above can improve communication performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless communication module comprising:
   an antenna configured to be disposed on a first conductive wall among a plurality of the conductive walls enclosing a closed space;
   a tag reader configured to be connected with the antenna, and to read an RFID tag existing in the closed space via the antenna; and
   a reflective part configured to have a thin film shape or a plate shape, and to be disposed between the first conductive wall and a second conductive wall facing the first conductive wall,
   wherein the closed space is partitioned by the reflective part into a first space on a side of the first conductive wall and a second space on a side of the second conductive wall,
   wherein a radio wave is output by the tag reader, radiated from the antenna, and reflected by the reflective part, to become a first reflected wave propagating in the first space,
   wherein the radio wave radiated from the antenna also transmits through the reflective part, propagates in the second space, is reflected by the second conductive wall, and transmits through the reflective part, to become a second reflected wave propagating in the first space,
   wherein a position of the reflective part between the first conductive wall and the second conductive wall is determined so that the first reflected wave and the second reflected wave are canceled by each other.

2. The wireless communication module as claimed in claim 1, wherein the reflective part is a plate-shaped member made of a dielectric.

3. The wireless communication module as claimed in claim 1, wherein the reflective part is disposed having a distance of $\lambda_g \times n/2$ from the second conductive wall where $\lambda_g$ is a guide wave length of the radio wave propagating in the closed space, and n is a natural number.

4. The wireless communication module as claimed in claim 1, wherein the thickness of the reflective part is less than $\lambda_d/2$ where $\lambda_d$ is a wavelength of the radio wave propagating in the reflective part.

5. The wireless communication module as claimed in claim 1, further comprising:
   a dielectric configured to be disposed at least a part of the second space,
   wherein the radio wave is output by the tag reader, radiated from the antenna, and reflected by the reflective part, to become the first reflected wave propagating in the first space, wherein the radio wave radiated from the antenna also transmits through the reflective part, propagates in the second space and the inside of the dielectric, is reflected by the second conductive wall, and transmits through the reflective part, to become the second reflected wave propagating in the first space, wherein the position of the reflective part between the first conductive wall and the second conductive wall is determined so that the first reflected wave and the second reflected wave are canceled by each other.

6. The wireless communication module as claimed in claim 5, wherein the dielectric is formed of two or more types of dielectrics having permittivity different from each other.

7. The wireless communication module as claimed in claim 1, wherein the radio wave transmitted from the antenna is a vertically polarized wave, a horizontally polarized wave, or a circularly polarized wave.

8. The wireless communication module as claimed in claim 1, the plurality of the conductive walls forms a wave guide tube having a rectangular cross section or a circular cross section.

9. The wireless communication module as claimed in claim 1, wherein the plurality of the conductive walls have a window or a mesh structure, functioning as a wave guide tube to generate a standing wave for the radio wave having a frequency used for communication.

10. The wireless communication module as claimed in claim 1, wherein the reflective part is a conductive thin film.

11. The wireless communication module as claimed in claim 1, wherein reflectance of the conductive thin film is between 0.30 and 0.40.

12. The wireless communication module as claimed in claim 1, wherein the reflective part is disposed having a distance of $\lambda_g \times (2n-1)/4$ from the second conductive wall where $\lambda_g$ is a guide wave length of the radio wave propagating in the closed space, and n is a natural number.

13. The wireless communication module as claimed in claim 10, wherein the conductive thin film is a thin film made of graphite, or a thin film made of zinc oxide having aluminum added.

14. The wireless communication module as claimed in claim 1, wherein the conductive thin film is formed on a resin substrate made of a material including Teflon, phenol, epoxy, and polyimide.

15. A wireless communication system comprising:
an antenna configured to be disposed on a first conductive wall among a plurality of the conductive walls enclosing a closed space;
a tag reader configured to be connected with the antenna;
a reflective part configured
to have a thin film shape or a plate shape,
to be disposed between the first conductive wall and a second conductive wall facing the first conductive wall, and
to partition the closed space into a first space on a side of the first conductive wall and a second space on a side of the second conductive wall; and
an RFID tag configured to be disposed in the first space or the second space,
wherein a radio wave is output by the tag reader, radiated from the antenna, and reflected by the reflective part, to become a first reflected wave propagating in the first space,
wherein the radio wave radiated from the antenna also transmits through the reflective part, propagates in the second space, is reflected by the second conductive wall, and transmits through the reflective part, to become a second reflected wave propagating in the first space,
wherein a position of the reflective part between the first conductive wall and the second conductive wall is determined so that the first reflected wave and the second reflected wave are canceled by each other,
wherein the tag reader reads the RFID tag existing in the closed space via the antenna.

16. A wireless communication system comprising:
an antenna configured to be disposed on a first conductive wall among a plurality of the conductive walls enclosing a closed space;
a read apparatus configured to be connected with the antenna;
a reflective part configured
to have a thin film shape or a plate shape,
to be disposed between the first conductive wall and a second conductive wall facing the first conductive wall, and
to partition the closed space into a first space on a side of the first conductive wall and a second space on a side of the second conductive wall; and
a wireless portable unit configured to be disposed in the first space or the second space,
wherein a radio wave is output by the read apparatus, radiated from the antenna, and reflected by the reflective part, to become a first reflected wave propagating in the first space,
wherein the radio wave radiated from the antenna also transmits through the reflective part, propagates in the second space, is reflected by the second conductive wall, and transmits through the reflective part, to become a second reflected wave propagating in the first space,
wherein a position of the reflective part between the first conductive wall and the second conductive wall is determined so that the first reflected wave and the second reflected wave are canceled by each other,
wherein the read apparatus reads the wireless portable unit existing in the closed space via the antenna.

17. A wireless communication method, in a wireless communication system including
an antenna configured to be disposed on a first conductive wall among a plurality of the conductive walls enclosing a closed space,
a tag reader configured to be connected with the antenna,
a reflective part configured
to have a thin film shape or a plate shape,
to be disposed between the first conductive wall and a second conductive wall facing the first conductive wall, and
to partition the closed space into a first space on a side of the first conductive wall and a second space on a side of the second conductive wall, and
an RFID tag configured to be disposed in the first space or the second space,
wherein a radio wave is output by the tag reader, radiated from the antenna, and reflected by the reflective part, to become a first reflected wave propagating in the first space,
wherein the radio wave radiated from the antenna also transmits through the reflective part, propagates in the second space, is reflected by the second conductive wall, and transmits through the reflective part, to become a second reflected wave propagating in the first space, wherein a position of the reflective part between the first conductive wall and the second conductive wall is determined so that the first reflected wave and the second reflected wave are canceled by each other, wherein the tag reader reads the RFID tag existing in the closed space via the antenna, the method comprising:

radiating the radio wave by the tag reader via the antenna in the first space; and receiving a response signal transmitted from the RFID tag by the tag reader.

\* \* \* \* \*